(12) United States Patent
Sato

(10) Patent No.: US 10,187,647 B2
(45) Date of Patent: Jan. 22, 2019

(54) IMAGE PROCESSING DEVICE AND METHOD

(71) Applicant: SONY CORPORATION, Tokyo (JP)

(72) Inventor: Kazushi Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 311 days.

(21) Appl. No.: 14/647,602

(22) PCT Filed: Dec. 16, 2013

(86) PCT No.: PCT/JP2013/083559
§ 371 (c)(1),
(2) Date: May 27, 2015

(87) PCT Pub. No.: WO2014/103763
PCT Pub. Date: Jul. 3, 2014

(65) Prior Publication Data
US 2015/0312578 A1 Oct. 29, 2015

(30) Foreign Application Priority Data

Dec. 26, 2012 (JP) .................. 2012-283614
Jul. 9, 2013 (JP) .................. 2013-143977
Sep. 4, 2013 (JP) .................. 2013-182993

(51) Int. Cl.
| | |
|---|---|
| *H04N 19/187* | (2014.01) |
| *H04N 19/70* | (2014.01) |
| *H04N 19/30* | (2014.01) |
| *H04N 19/463* | (2014.01) |
| *H04N 19/152* | (2014.01) |
| *H04N 19/162* | (2014.01) |

(52) U.S. Cl.
CPC ......... *H04N 19/187* (2014.11); *H04N 19/152* (2014.11); *H04N 19/30* (2014.11); *H04N 19/463* (2014.11); *H04N 19/70* (2014.11); *H04N 19/162* (2014.11)

(58) Field of Classification Search
CPC ............. H04N 7/26; H04N 7/32; H04N 19/70
See application file for complete search history.

(56) References Cited

FOREIGN PATENT DOCUMENTS

| | | | |
|---|---|---|---|
| CN | 101658040 A | 2/2010 | |
| CN | 101663893 A | 3/2010 | |

(Continued)

OTHER PUBLICATIONS

Jun. 21, 2016, European Search Report for related EP Application No. 13867714.1.

(Continued)

*Primary Examiner* — Jeffery A Williams
*Assistant Examiner* — Patricia I Young
(74) *Attorney, Agent, or Firm* — Paratus Law Group, PLLC

(57) ABSTRACT

Provided is an image processing device including a receiving section configured to receive a bitstream obtained by encoding an image having at least one layer and buffer management parameter information of each layer indicating at least one of that a parameter for managing a decoder buffer is a parameter for performing a decoding process of only a corresponding layer and that the parameter for managing the decoder buffer is a parameter for performing a decoding process of a corresponding layer and a lower layer, and a decoding section configured to decode the bitstream received by the receiving section and generate an image.

13 Claims, 56 Drawing Sheets

(56) References Cited

FOREIGN PATENT DOCUMENTS

| JP | 2010-525661 | 7/2010 |
|----|----|----|
| JP | 2010-525662 | 7/2010 |
| WO | WO 2008/130500 A2 | 10/2008 |
| WO | WO 2008/130528 A2 | 10/2008 |

OTHER PUBLICATIONS

Boyce, "VPS syntax for scalable and 3D extensions", Joint Collaborative Team on Video Coding(JCT-VC) of ITU-T SG16 WP3 and ISO/IEC JTC1/SC29/WG11, Oct. 10-19, 2012, pp. 1-6, 11$^{th}$ Meeting: Shanghai, CN.
Hannuksela, "AHG9: Operation points in VPS and nesting SEI", Joint Collaborative Team on Video Coding(JCT-VC) of ITU-T SG16 WP3 and ISO/IEC JTC1/SC29/WG11, Oct. 10-19, 2012, pp. 1-5, 11$^{th}$ Meeting: Shanghai, CN.
Wang, et al., "HRD parameters in VPS", Joint Collaborative Team on Video Coding(JCT-VC) of ITU-T SG16 WP3 and ISO/IEC JTC1/SC29/WG11, Jul. 11-20, 2012, pp. 1-10, 10$^{th}$ Meeting: Stockholm, SE.
Deshpande, et al., "An Improved Hypothetical Reference Decoder for HEVC", Visual Information Processing and Communication IV, Mar. 28, 2013, pp. 1-9.
Sullivan, et al., "Meeting report of the 12$^{th}$ meeting of the Joint Collaborative Team on Video Coding (JCT-VC), Geneva, CH, Jan. 14-23, 2013", Joint Collaborative Team on Video Coding(JCT-VC) of ITU-T SG16 WP3 and ISO/IEC JTC1/SC29/WG11, Jan. 14-23, 2013, pp. 1-190, 12$^{th}$ Meeting: Geneva, CH.
Jill Boyce, et al., NAL unit header and parameter set designs for HEVC extensions, Joint Collaborative Team on Video Coding (JCT-VC) of ITU-T SG16 WP3 and ISO/IEC JTC1/SC29/WG11, Oct. 10-19, 2012, pp. 1-8, 11$^{th}$ Meeting: Shanghai, CN.
Benjamin Bross, et al., High Efficiency Video Coding (HEVC) text specification draft 9, Joint Collaborative Team on Video Coding (JCT-VC) of ITU-T SG16 WP3 and ISO/IEC JTC1/SC29/WG11, Oct. 10-19, 2012, pp. i-270, 11$^{th}$ Meeting: Shanghai, CN.
Kazushi Sato, On hrd_parameters(), Joint Collaborative Team on Video Coding (JCT-VC) of ITU-T SG16 WP3 and ISO/IEC JTC1/SC29/WG11, Jan. 14-23, 2013, pp. 1-4, 12$^{th}$ Meeting: Geneva, CH.
Sachin Deshpande, On Sub-picture Based HRD Buffering, Joint Collaborative Team on Video Coding (JCT-VC) of ITU-T SG16 WP3 and ISO/IEC JTC1/SC29/WG11, Oct. 10-19, 2012, pp. 1-10, 11$^{th}$ Meeting: Shanghai, CN.
Oct. 10, 2017, Chinese Office Action issued for related CN application No. 201380067249.8.
Dec. 5, 2017, Japanese Office Action issued for related JP application No. 2014-554323.
Boyce et al., NAL unit header and parameter set designs for HEVC extensions, Joint Collaborative Team on 3D Video Coding Extension Development of ITU-T SG 16 WP 3 and ISO/IEC JTC 1/SC 29/WG 11, Oct. 13-19, 2012, pp. 1-8, 2nd Meeting, Shanghai, CN.
Hannuksela et al., AHG9: Operation points in VPS and nesting SEI, Joint Collaborative Team on Video Coding (JCT-VC) of ITU-T SG 16 WP 3 and ISO/IEC JTC 1/SC 29/WG 11, Oct. 10-19, 2012, pp. 1-5, 11th Meeting, Shanghai, CN.
Dec. 5, 2017, Japanese Office Action issued for related JP application No. 2016-215943.
Dec. 5, 2017, Chinese Office Action issued for related CN application No. 201510959303.0.

FIG. 5

| | | Descriptor |
|---|---|---|
| 1 | hrd_parameters(commonInfPresentFlag, MaxNumSubLayersMinus1) { | |
| 2 | if(commonInfPresentFlag) { | |
| 3 | timing_info_present_flag | u(1) |
| 4 | if(timing_info_present_flag) { | |
| 5 | num_units_in_tick | u(32) |
| 6 | time_scale | u(32) |
| 7 | } | |
| 8 | nal_hrd_parameters_present_flag | u(1) |
| 9 | vcl_hrd_parameters_present_flag | u(1) |
| 10 | if(nal_hrd_parameters_present_flag||vcl_hrd_parameters_present_flag) { | |
| 11 | sub_pic_cpb_params_present_flag | u(1) |
| 12 | if(sub_pic_cpb_params_present_flag) { | |
| 13 | tick_divisor_minus2 | u(8) |
| 14 | du_cpb_removal_delay_length_minus1 | u(5) |
| 15 | } | |
| 16 | bit_rate_scale | u(4) |
| 17 | cpb_size_scale | u(4) |
| 18 | initial_cpb_removal_delay_length_minus1 | u(5) |
| 19 | cpb_removal_delay_length_minus1 | u(5) |
| 20 | dpb_output_delay_length_minus1 | u(5) |
| 21 | } | |
| 22 | } | |
| 23 | for(i=0; i<=MaxNumSubLayersMinus1; i++) { | |
| 24 | fixed_pic_rate_flag[i] | u(1) |
| 25 | if(fixed_pic_rate_flag[i]) | |
| 26 | pic_duration_in_tc_minus1[i] | ue(v) |
| 27 | low_delay_hrd_flag[i] | u(1) |
| 28 | cpb_cnt_minus1[i] | ue(v) |
| 29 | if(nal_hrd_parameters_present_flag) | |
| 30 | sub_layer_hrd_parameters(i) | |
| 31 | if(vcl_hrd_parameters_present_flag) | |
| 32 | sub_layer_hrd_parameters(i) | |
| 33 | } | |
| 34 | } | |

FIG. 7

| # | | Descriptor |
|---|---|---|
| 1 | hrd_parameters(commonInfPresentFlag, MaxNumSubLayersMinus1) { | |
| 2 |   if(commonInfPresentFlag) { | |
| 3 |     timing_info_present_flag | u(1) |
| 4 |     if(timing_info_present_flag) { | |
| 5 |       num_units_in_tick | u(32) |
| 6 |       time_scale | u(32) |
| 7 |     } | |
| 8 |     nal_hrd_parameters_present_flag | u(1) |
| 9 |     vcl_hrd_parameters_present_flag | u(1) |
| 10 |     hrd_parameters_type_flag | u(1) |
| 11 |     if(nal_hrd_parameters_present_flag||vcl_hrd_parameters_present_flag) { | |
| 12 |       sub_pic_cpb_params_present_flag | u(1) |
| 13 |       if(sub_pic_cpb_params_present_flag) { | |
| 14 |         tick_divisor_minus2 | u(8) |
| 15 |         du_cpb_removal_delay_length_minus1 | u(5) |
| 16 |       } | |
| 17 |       bit_rate_scale | u(4) |
| 18 |       cpb_size_scale | u(4) |
| 19 |       initial_cpb_removal_delay_length_minus1 | u(5) |
| 20 |       cpb_removal_delay_length_minus1 | u(5) |
| 21 |       dpb_output_delay_length_minus1 | u(5) |
| 22 |     } | |
| 23 |   } | |
| 24 |   for(i=0; i<=MaxNumSubLayersMinus1; i++) { | |
| 25 |     sub_hrd_parameters_type_flag[i] | u(1) |
| 26 |     fixed_pic_rate_flag[i] | u(1) |
| 27 |     if(fixed_pic_rate_flag[i]) | |
| 28 |       pic_duration_in_tc_minus1[i] | ue(v) |
| 29 |     low_delay_hrd_flag[i] | u(1) |
| 30 |     cpb_cnt_minus1[i] | ue(v) |
| 31 |     if(nal_hrd_parameters_present_flag) | |
| 32 |       sub_layer_hrd_parameters(i) | |
| 33 |     if(vcl_hrd_parameters_present_flag) | |
| 34 |       sub_layer_hrd_parameters(i) | |
| 35 |   } | |
| 36 | } | |

FIG. 8

| | | Descriptor |
|---|---|---|
| 1 | hrd_parameters(commonInfPresentFlag, MaxNumSubLayersMinus1) { | |
| 2 | if(commonInfPresentFlag) { | |
| 3 | timing_info_present_flag | u(1) |
| 4 | if(timing_info_present_flag) { | |
| 5 | num_units_in_tick | u(32) |
| 6 | time_scale | u(32) |
| 7 | } | |
| 8 | nal_hrd_parameters_present_flag | u(1) |
| 9 | vcl_hrd_parameters_present_flag | u(1) |
| 10 | if(nal_hrd_parameters_present_flag||vcl_hrd_parameters_present_flag) { | |
| 11 | hrd_parameters_type1_present_flag | u(1) |
| 12 | hrd_parameters_type2_present_flag | u(1) |
| 13 | if(hrd_parameters_type1_present_flag) { | |
| 14 | type1_sub_pic_cpb_params_present_flag | u(1) |
| 15 | if(type1_sub_pic_cpb_params_present_flag) { | |
| 16 | type1_tick_divisor_minus2 | u(8) |
| 17 | type1_du_cpb_removal_delay_length_minus1 | u(5) |
| 18 | } | |
| 19 | type1_bit_rate_scale | u(4) |
| 20 | type1_cpb_size_scale | u(4) |
| 21 | type1_initial_cpb_removal_delay_length_minus1 | u(5) |
| 22 | type1_cpb_removal_delay_length_minus1 | u(5) |
| 23 | type1_dpb_output_delay_length_minus1 | u(5) |
| 24 | } | |
| 25 | if(hrd_parameters_type2_present_flag) { | |
| 26 | type2_sub_pic_cpb_params_present_flag | u(1) |
| 27 | if(type2_sub_pic_cpb_params_present_flag) { | |
| 28 | type2_tick_divisor_minus2 | u(8) |
| 29 | type2_du_cpb_removal_delay_length_minus1 | u(5) |
| 30 | } | |
| 31 | type2_bit_rate_scale | u(4) |
| 32 | type2_cpb_size_scale | u(4) |
| 33 | type2_initial_cpb_removal_delay_length_minus1 | u(5) |
| 34 | type2_cpb_removal_delay_length_minus1 | u(5) |
| 35 | type2_dpb_output_delay_length_minus1 | u(5) |
| 36 | } | |
| 37 | } | |
| 38 | } | |
| 39 | for (i=0; i<=MaxNumSubLayersMinus1; i++) { | |
| 40 | sub_hrd_parameters_type1_present_flag[i] | u(1) |
| 41 | sub_hrd_parameters_type2_present_flag[i] | u(1) |
| 42 | fixed_pic_rate_flag[i] | u(1) |
| 43 | if(fixed_pic_rate_flag[i]) | |
| 44 | pic_duration_in_tc_minus1[i] | ue(v) |
| 45 | if(sub_hrd_parameters_type1_present_flag[i]) { | |
| 46 | type1_low_delay_hrd_flag[i] | u(1) |
| 47 | type1_cpb_cnt_minus1[i] | ue(v) |

FIG. 9

| 48 | if(nal_hrd_parameters_present_flag) | |
|---|---|---|
| 49 | sub_layer_hrd_parameters(i) | |
| 50 | if(vcl_hrd_parameters_present_flag) | |
| 51 | sub_layer_hrd_parameters(i) | |
| 52 | } | |
| 53 | if(sub_hrd_parameters_type2_present_flag[i]) { | |
| 54 | type2_low_delay_hrd_flag[i] | u(1) |
| 55 | type2_cpb_cnt_minus1[i] | ue(v) |
| 56 | if(nal_hrd_parameters_present_flag) | |
| 57 | sub_layer_hrd_parameters(i) | |
| 58 | if(vcl_hrd_parameters_present_flag) | |
| 59 | sub_layer_hrd_parameters(i) | |
| 60 | } | |
| 61 | } | |
| 62 | } | |

FIG. 27

| | Descriptor |
|---|---|
| vps_extension() { | |
| ... | |
| for(i=0;i<=vps_num_layer_sets_minus1;i++) | |
|   for(j=1;j<=vps_max_layer_id; j++) | |
|     if(layer_id_included_flag[i][j]) { | |
|     layer_set_hrd_layer_info_present_flag[i][j] | u(1) |
|     if(layer_set_hrd_layer_info_present_flag[i][j]){ | |
|       hrd_parameters(cprm_present_flag[i], vps_max_sub_layers_minus1) | |
|     } | |
| ... | |
| } | |

FIG. 28

| sps_extension() { | Descriptor |
|---|---|
| ... | |
| layer_set_hrd_layer_info_present_flag | u(1) |
| if(layer_set_hrd_layer_info_present_flag) { | |
| hrd_parameters(1, sps_max_sub_layers_minus1) | |
| } | |
| ... | |
| } | |

FIG. 29

| 1 | video_parameter_set_rbsp() { | Descriptor |
|---|---|---|
| 2 |    vps_video_parameter_set_id | u(4) |
| 3 |    vps_reserved_three_2bits | u(2) |
| 4 |    vps_max_layers_minus1 | u(6) |
| 5 |    vps_max_sub_layers_minus1 | u(3) |
| 6 |    vps_temporal_id_nesting_flag | u(1) |
| 7 |    vps_reserved_0xffff_16bits | u(16) |
| 8 |    profile_tier_level(vps_max_sub_layers_minus1) | |
| 9 |    vps_sub_layer_ordering_info_present_flag | u(1) |
| 10 |    for (i=(vps_sub_layer_ordering_info_present_flag ? 0:vps_max_sub_layers_minus1); i <= vps_max_sub_layers_minus1; i++) { | |
| 11 |      vps_max_dec_pic_buffering_minus1[i] | ue(v) |
| 12 |      vps_max_num_reorder_pics[i] | ue(v) |
| 13 |      vps_max_latency_increase_plus1[i] | ue(v) |
| 14 |    } | |
| 15 |    vps_max_layer_id | u(6) |
| 16 |    vps_num_layer_sets_minus1 | ue(v) |
| 17 |    for (i=1; i <= vps_num_layer_sets_minus1; i++) | |
| 18 |      for (j=0; j <= vps_max_layer_id; j++) | |
| 19 |         layer_id_included_flag[i][j] | u(1) |
| 20 |    vps_timing_info_present_flag | u(1) |
| 21 |    if(vps_timing_info_present_flag) { | |
| 22 |      vps_num_units_in_tick | u(32) |
| 23 |      vps_time_scale | u(32) |
| 24 |      vps_poc_proportional_to_timing_flag | u(1) |
| 25 |      if(vps_poc_proportional_to_timing_flag) | |
| 26 |         vps_num_ticks_poc_diff_one_minus1 | ue(v) |
| 27 |      vps_num_hrd_parameters | ue(v) |
| 28 |      for (i=0; i<vps_num_hrd_parameters; i++) { | |
| 29 |         hrd_layer_set_idx[i] | ue(v) |
| 30 |         if(i>0) | |
| 31 |            cprms_present_flag[i] | u(1) |
| 32 |         hrd_parameters(cprms_present_flag[i], vps_max_sub_layers_minus1) | |
| 33 |      } | |
| 34 |    } | |
| 35 |    vps_extension_flag | u(1) |
| 36 |    if(vps_extension_flag) | |
| 37 |      while(more_rbsp_data()) | |
| 38 |         vps_extension_data_flag | u(1) |
| 39 |    rbsp_trailing_bits() | |
| 40 | } | |

FIG. 30 layer_id_included_flag[i][j] equal to 1 specifies that the value of nuh_layer_id equal to j is included in the layer identifier list layerSetLayerIdList[i]. layer_id_included_flag[i][j] equal to 0 specifies that the value of nuh_layer_id equal to j is not included in the layer identifier list layerSetLayerIdList[i].

The value of numLayersInIdList[0] is set equal to 1 and the value of layerSetLayerIdList[0][0] is set equal to 0.

For each value of i in the range of 1 to vps_num_layer_sets_minus1, inclusive, the variable numLayersInIdList[ i ] and the layer identifier list layerSetLayerIdList[i] are derived as follows:

```
n=0
for (m=0;m <= vps_max_layer_id;m++)
    if(layer_id_included_flag[i][m])
        layerSetLayerIdList[i][n++]=m
numLayersInIdList[i]=n
```

For each value of i in the range of 1 to vps_num_layer_sets_minus1, inclusive, numLayersInIdList[i] shall be in the range of 1 to vps_max_layers_minus1 + 1, inclusive.

When numLayersInIdList[iA] is equal to numLayersInIdList[iB] for any iA and iB in the range of 0 to vps_num_layer_sets_minus1, inclusive, with iA not equal to iB, the value of layerSetLayerIdList[iA][n] shall not be equal to layerSetLayerIdList[iB][n] for at least one value of n in the range of 0 to numLayersInIdList[iA], inclusive.

A layer set is identified by the associated layer identifier list. The i-th layer set specified by the VPS is associated with the layer identifier list layerSetLayerIdList[i], for i in the range of 0 to vps_num_layer_sets_minus1, inclusive.

A layer set consists of all operation points that are associated with the same layer identifier list.

Each operation point is identified by the associated layer identifier list, denoted as OpLayerIdList, which consists of the list of nuh_layer_id values of all NAL units included in the operation point, in increasing order of nuh_layer_id values, and a variable OpTid, which is equal to the highest TemporalId of all NAL units included in the operation point. The bitstream subset associated with the operation point identified by OpLayerIdList and OpTid is the output of the sub-bitstream extraction process as specified in clause 10 with the bitstream, the target highest TemporalId equal to OpTid, and the target layer identifier list equal to OpLayerIdList as inputs. The OpLayerIdList and OpTid that identify an operation point are also referred to as the OpLayerIdList and OpTid associated with the operation point, respectively.

FIG. 31

```
LayerSet[1]={0, 1, 2}
LayerSet[2]={0, 2}
   ↓
layer_id_included_flag[1][0]=1    // 0 IS INCLUDED IN LayerSet[1]
layer_id_included_flag[1][1]=1    // 1 IS INCLUDED IN LayerSet[1]
layer_id_included_flag[1][2]=1    // 2 IS INCLUDED IN LayerSet[1]

layer_id_included_flag[2][0]=1    // 0 IS INCLUDED IN LayerSet[2]
layer_id_included_flag[2][1]=0    // 1 IS NOT INCLUDED IN LayerSet[1]
layer_id_included_flag[2][2]=1    // 2 IS INCLUDED IN LayerSet[2]
```

FIG. 32

| 1 | buffering_period(payloadSize) { | Descriptor |
|---|---|---|
| 2 | bp_seq_parameter_set_id | ue(v) |
| 3 | if(!sub_pic_hrd_params_present_flag) | |
| 4 | irap_cpb_params_present_flag | u(1) |
| 5 | if(irap_cpb_params_present_flag) { | |
| 6 | cpb_delay_offset | u(v) |
| 7 | dpb_delay_offset | u(v) |
| 8 | } | |
| 9 | concatenation_flag | u(1) |
| 10 | au_cpb_removal_delay_delta_minus1 | u(v) |
| 11 | if(NalHrdBpPresentFlag) { | |
| 12 | for(i= 0; i <= CpbCnt; i++) { | |
| 13 | nal_initial_cpb_removal_delay[i] | u(v) |
| 14 | nal_initial_cpb_removal_offset[i] | u(v) |
| 15 | if(sub_pic_hrd_params_present_flag || irap_cpb_params_present_flag) { | |
| 16 | nal_initial_alt_cpb_removal_delay[i] | u(v) |
| 17 | nal_initial_alt_cpb_removal_offset[i] | u(v) |
| 18 | } | |
| 19 | } | |
| 20 | } | |
| 21 | if(VclHrdBpPresentFlag) { | |
| 22 | for(i=0; i <= CpbCnt; i++) { | |
| 23 | vcl_initial_cpb_removal_delay[i] | u(v) |
| 24 | vcl_initial_cpb_removal_offset[i] | u(v) |
| 25 | if(sub_pic_hrd_params_present_flag || irap_cpb_params_present_flag) { | |
| 26 | vcl_initial_alt_cpb_removal_delay[i] | u(v) |
| 27 | vcl_initial_alt_cpb_removal_offset[i] | u(v) |
| 28 | } | |
| 29 | } | |
| 30 | } | |
| 31 | } | |

FIG. 33

| | | Descriptor |
|---|---|---|
| 1 | buffering_period(payloadSize) { | |
| 2 | associated_parameter_set_flag | u(1) |
| 3 | if(associated_parameter_set_flag == 0) { | |
| 4 | bp_video_parameter_set_id | ue(v) |
| 5 | vps_num_bp_parameters | ue(v) |
| 6 | for(i=0; i < vps_num_bp_parameters; i++) { | |
| 7 | bp_layer_set_idx[i] | ue(v) |
| 8 | if(i > 0) | |
| 9 | cprms_present_flag[i] | u(1) |
| 10 | layer_buffering_period(payloadSize) | |
| 11 | } | |
| 12 | } else { | |
| 13 | bp_seq_parameter_set_id | ue(v) |
| 14 | layer_buffering_period(payloadSize) | |
| 15 | } | |
| 16 | } | |

FIG. 34

| 1 | layer_buffering_period(payloadSize) { | Descriptor |
|---|---|---|
| 2 | if(!sub_pic_hrd_params_present_flag) | |
| 3 | irap_cpb_params_present_flag | u(1) |
| 4 | if(irap_cpb_params_present_flag) { | |
| 5 | cpb_delay_offset | u(v) |
| 6 | dpb_delay_offset | u(v) |
| 7 | } | |
| 8 | concatenation_flag | u(1) |
| 9 | au_cpb_removal_delay_delta_minus1 | u(v) |
| 10 | if(NalHrdBpPresentFlag) { | |
| 11 | for(i=0;i <= CpbCnt;i++) { | |
| 12 | nal_initial_cpb_removal_delay[i] | u(v) |
| 13 | nal_initial_cpb_removal_offset[i] | u(v) |
| 14 | if(sub_pic_hrd_params_present_flag || irap_cpb_params_present_flag) { | |
| 15 | nal_initial_alt_cpb_removal_delay[i] | u(v) |
| 16 | nal_initial_alt_cpb_removal_offset[i] | u(v) |
| 17 | } | |
| 18 | layer_specific_parameters_present_flag | u(1) |
| 19 | if(layer_specific_parameters_present_flag) { | |
| 20 | for(i=0;i <= CpbCnt;i++) { | |
| 21 | layer_nal_initial_cpb_removal_delay[i] | u(v) |
| 22 | layer_nal_initial_cpb_removal_offset[i] | u(v) |
| 23 | if(sub_pic_hrd_params_present_flag || irap_cpb_params_present_flag) { | |
| 24 | layer_nal_initial_alt_cpb_removal_delay[i] | u(v) |
| 25 | layer_nal_initial_alt_cpb_removal_offset[i] | u(v) |
| 26 | } | |
| 27 | } | |
| 28 | } | |
| 29 | } | |
| 30 | if(VclHrdBpPresentFlag) { | |
| 31 | for(i=0;i <= CpbCnt;i++) { | |
| 32 | vcl_initial_cpb_removal_delay[i] | u(v) |
| 33 | vcl_initial_cpb_removal_offset[i] | u(v) |
| 34 | if(sub_pic_hrd_params_present_flag || irap_cpb_params_present_flag) { | |
| 35 | vcl_initial_alt_cpb_removal_delay[i] | u(v) |
| 36 | vcl_initial_alt_cpb_removal_offset[i] | u(v) |
| 37 | } | |
| 38 | layer_specific_parameters_present_flag | u(1) |
| 39 | if(layer_specific_parameters_present_flag) { | |
| 40 | for(i=0;i <= CpbCnt;i++) { | |

FIG. 35

| 41 | layer_vcl_initial_cpb_removal_delay[i] | u(v) |
|---|---|---|
| 42 | layer_vcl_initial_cpb_removal_offset[i] | u(v) |
| 43 | if( sub_pic_hrd_params_present_flag \|\| irap_cpb_params_present_flag) { | |
| 44 | layer_vcl_initial_alt_cpb_removal_delay[i] | u(v) |
| 45 | layer_vcl_initial_alt_cpb_removal_offset[i] | u(v) |
| 46 | } | |
| 47 | } | |
| 48 | } | |
| 49 | } | |
| 50 | } | |

IMAGE PROCESSING DEVICE AND METHOD

CROSS REFERENCE TO PRIOR APPLICATION

This application is a National Stage Patent Application of PCT International Patent Application No. PCT/JP2013/083559 (filed on Dec. 16, 2013) under 35 U.S.C. § 371, which claims priority to Japanese Patent Application Nos. 2013-182993 (filed on Sep. 4, 2013), 2013-143977 (filed on Jul. 9, 2013), and 2012-283614 (filed on Dec. 26, 2012), which are all hereby incorporated by reference in their entirety.

TECHNICAL FIELD

The present disclosure relates to an image processing device and method, and more particularly, to an image processing device and method which are capable of performing a decoding process at a proper timing in scalable video coding.

BACKGROUND ART

Recently, devices for compressing and encoding an image by adopting a encoding scheme of handling image information digitally and performing compression by an orthogonal transform such as a discrete cosine transform and motion compensation using image information-specific redundancy for the purpose of information transmission and accumulation with high efficiency when the image information is handled digitally have become widespread. Moving Picture Experts Group (MPEG), H.264, MPEG-4 Part 10 (Advanced Video Coding) (hereinafter referred to as H.264/AVC), and the like are examples of such encoding schemes.

Therefore, for the purpose of improving encoding efficiency compared to H.264/AVC, standardization of a encoding scheme referred to as high efficiency video coding (HEVC) by Joint Collaboration Team-Video Coding (JCTVC), which is a joint standardizing organization of International Telecommunication Union Telecommunication Standardization Sector (ITU-T) and International Organization for Standardization (ISO)/International Electrotechnical Commission (IEC), is currently in progress, and Non-Patent Literature 1 has been issued as a draft of the scheme.

Meanwhile, the existing image encoding schemes such as MPEG-2 and AVC have a scalability function of dividing an image into a plurality of layers and encoding the plurality of layers.

In other words, for example, for a terminal having a low processing capability such as a mobile phone, image compression information of only a base layer is transmitted, and a moving image of low spatial and temporal resolutions or a low quality is reproduced, and for a terminal having a high processing capability such as a television or a personal computer, image compression information of an enhancement layer as well as a base layer is transmitted, and a moving image of high spatial and temporal resolutions or a high quality is reproduced. That is, image compression information according to a capability of a terminal or a network can be transmitted from a server without performing the transcoding process.

In the HEVC, it is possible to designate a hypothetical reference decoder (HRD) parameter so that an overflow or an underflow of a buffer does not occur when a decoding process for image compression information is performed. Particularly, it is possible to designate an HRD parameter for each layer when scalable video coding is performed (see Non-Patent Literature 2).

CITATION LIST

Non-Patent Literature

Non-Patent Literature 1: Benjamin Bross, Woo-Jin Han, Jens-Rainer Ohm, Gary J. Sullivan, Thomas Wiegand, "High efficiency video coding (HEVC) text specification draft 9," JCTVC-K 1003, 2012, 10, 21

Non-Patent Literature 2: Jill Boyce, Ye-Kui Wang, "NAL unit header and parameter set designs for HEVC extensions," JCTVC-K 1007, 2012, 10, 19

SUMMARY OF INVENTION

Technical Problem

However, when the HRD parameter is designated for each layer or a time layer serving as one of sublayers, it is difficult to detect whether the decoding process is performed by a single decoding device or a plurality of decoding devices.

The present disclosure was made in light of the foregoing, and it is desirable to perform a decoding process at a proper timing.

Solution to Problem

According to one aspect of the present disclosure, there is provided an image processing device including a receiving section configured to receive a bitstream obtained by encoding an image having at least one layer and buffer management parameter information of each layer indicating at least one of that a parameter for managing a decoder buffer is a parameter for performing a decoding process of only a corresponding layer and that the parameter for managing the decoder buffer is a parameter for performing a decoding process of a corresponding layer and a lower layer, and a decoding section configured to decode the bitstream received by the receiving section and generate an image.

The layer can include a layer and a sublayer.

The layer is a view of multi-view coding.

The layer is a layer of scalable video coding.

The buffer management parameter information is described in supplemental enhancement information (SEI).

The buffer management parameter information is described in buffering_period_SEI.

Parameter presence/absence information indicating a presence or absence of the parameter for managing the decoder buffer serving as the parameter for performing the decoding process of only the corresponding layer is described in a vps (video parameter set)_extension.

The receiving section can receive an AVC flag indicating that a layer lower than the corresponding layer is encoded by MPEG-4 Part10 Advanced Video Coding (AVC) and the buffer management parameter information of each layer indicating that the parameter for managing the decoder buffer is the parameter for performing the decoding process of only the corresponding layer.

According to one aspect of the present disclosure, there is provided an image processing method including receiving, by an image processing device, a bitstream obtained by encoding an image having at least one layer and buffer management parameter information of each layer indicating at least one of that a parameter for managing a decoder buffer is a parameter for performing a decoding process of only a corresponding layer and that the parameter for managing the decoder buffer is a parameter for performing a decoding process of a corresponding layer and a lower layer, receiving, by the image processing device, a bitstream obtained by encoding an image including at least one layer using a parameter corresponding to the buffer management parameter information, and decoding, by the image processing device, the received bitstream and generating an image.

According to another aspect of the present disclosure, there is provided an image processing device including a setting section configured to set buffer management parameter information of each layer indicating at least one of that a parameter for managing a decoder buffer is a parameter for performing a decoding process of only a corresponding layer and that the parameter for managing the decoder buffer is a parameter for performing a decoding process of a corresponding layer and a lower layer, an encoding section configured to encode an image having at least one layer and generate a bitstream, and a transmitting section configured to transmit the buffer management parameter information set by the setting section and the bitstream generated by the encoding section.

The layer can include a layer and a sublayer.

The layer is a view of multi-view coding.

The layer is a layer of scalable video coding.

The buffer management parameter information is described in supplemental enhancement information (SEI).

The buffer management parameter information is described in buffering_period_SEI.

Parameter presence/absence information indicating a presence or absence of the parameter for managing the decoder buffer serving as the parameter for performing the decoding process of only the corresponding layer is described in a vps (video parameter set)_extension.

The setting section can set an AVC flag indicating that a layer lower than the corresponding layer is encoded by MPEG-4 Part10 Advanced Video Coding (AVC) and the buffer management parameter information of each layer indicating that the parameter for managing the decoder buffer is the parameter for performing the decoding process of only the corresponding layer.

According to another aspect of the present disclosure, there is provided an image processing method including setting, by an image processing device, buffer management parameter information of each layer indicating at least one of that a parameter for managing a decoder buffer is a parameter for performing a decoding process of only a corresponding layer and that the parameter for managing the decoder buffer is a parameter for performing a decoding process of a corresponding layer and a lower layer, encoding, by the image processing device, an image having at least one layer and generating a bitstream, and transmitting, by the image processing device, the set buffer management parameter information and the generated bitstream.

According to one aspect of the present disclosure, a bitstream obtained by encoding an image having at least one layer and buffer management parameter information of each layer indicating at least one of that a parameter for managing a decoder buffer is a parameter for performing a decoding process of only a corresponding layer and that the parameter for managing the decoder buffer is a parameter for performing a decoding process of a corresponding layer and a lower layer are received. Then, the received bitstream is decoded to generate an image.

According to another aspect of the present disclosure, buffer management parameter information of each layer indicating at least one of that a parameter for managing a decoder buffer is a parameter for performing a decoding process of only a corresponding layer and that the parameter for managing the decoder buffer is a parameter for performing a decoding process of a corresponding layer and a lower layer is set, and an image having at least one layer is encoded to generate a bitstream. Then, the set buffer management parameter information and the generated bitstream are transmitted.

Also, the above-described image processing device may be an independent device or an inner block constituting one image encoding device or image decoding device.

Advantageous Effects of Invention

According to one aspect of the present disclosure, it is possible to decode an image. Particularly, it is possible to perform a decoding process at a proper timing.

According to another aspect of the present disclosure, it is possible to encode an image. Particularly, it is possible to perform a decoding process at a proper timing.

BRIEF DESCRIPTION OF DRAWINGS

FIG. 5 is a diagram illustrating an example of syntax of an HRD parameter of a HEVC.

FIG. 7 is a diagram illustrating an example of syntax of an HRD parameter according to the present technology.

FIG. 8 is a diagram illustrating another example of syntax of an HRD parameter according to the present technology.

FIG. 9 is a diagram illustrating another example of syntax of an HRD parameter according to the present technology.

FIG. 27 is a diagram illustrating an example of syntax of vps_extension.

FIG. 28 is a diagram illustrating an example of syntax of sps_extension.

FIG. 29 is a diagram illustrating an example of syntax of vps.

FIG. 30 is a diagram illustrating an example of semantics of layer_id_included_flag.

FIG. 31 is a diagram for describing a setting example of LayerSet.

FIG. 32 is a diagram illustrating an example of syntax of buffering_period_SEI.

FIG. 33 is a diagram illustrating an example of syntax of buffering_period_SEI.

FIG. 34 is a diagram illustrating an example of syntax of buffering_period_SEI.

FIG. 35 is a diagram illustrating an example of syntax of buffering_period_SEI.

DESCRIPTION OF EMBODIMENTS

Hereinafter, modes (hereinafter referred to as "embodiments") for carrying out the present disclosure will be described. The description will proceed in the following order:

0. Overview
1. First embodiment (image encoding device)
2. Second embodiment (image decoding device)
3. Third embodiment (example of syntax)
4. Fourth embodiment (example of buffering_period_SEI)
5. Fifth embodiment (example of AVC flag)
6. Sixth embodiment (multi-view image encoding device/multi-view image decoding device)
7. Seventh embodiment (computer)
8. Applications
9. Applications of scalable video coding <0. Overview>
<Encoding Scheme>

Hereinafter, the present technology will be described in connection with an application to image encoding and decoding of a High Efficiency Video Coding (HEVC) scheme.

<Coding Unit>

In an Advanced Video Coding (AVC) scheme, a hierarchical structure based on a macroblock and a sub macroblock is defined. However, a macroblock of 16×16 pixels is not optimal for a large image frame such as a Ultra High Definition (UHD) (4000×2000 pixels) serving as a target of a next generation encoding scheme.

Figure 1:
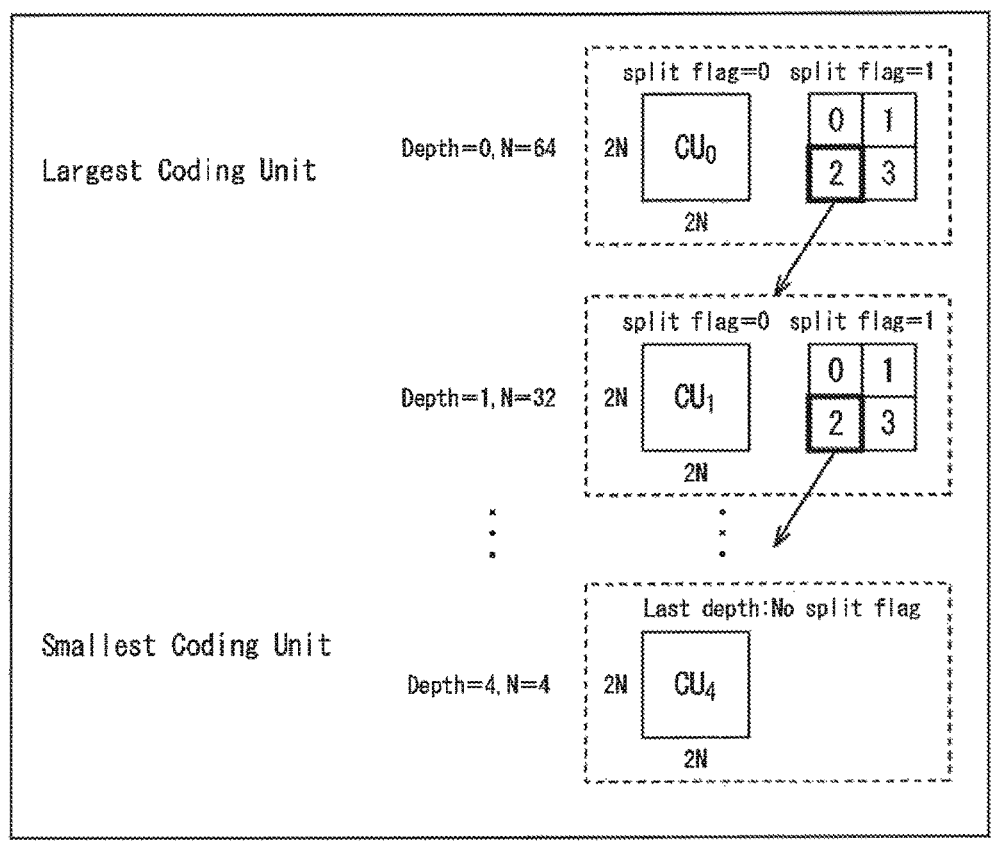
FIG. 1 is a diagram for describing an example of a configuration of a coding unit.

On the other hand, in the HEVC scheme, a coding unit (CU) is defined as illustrated in FIG. 1.

A CU is also referred to as a coding tree block (CTB), and serves as a partial area of an image of a picture unit undertaking the same role of a macroblock in the AVC scheme. The latter is fixed to a size of 16×16 pixels, but the former is not fixed to a certain size but designated in image compression information in each sequence.

For example, a largest coding unit (LCU) and a smallest coding unit (SCU) of a CU are specified in a sequence parameter set (SPS) included in encoded data to be output. As split-flag=1 is set in a range in which each LCU is not smaller than an SCU, a coding unit can be divided into CUs having a smaller size. In the example of FIG. 1, a size of an LCU is 128, and a largest scalable depth is 5. A CU of a size of 2N×2N is divided into CUs having a size of N×N serving as a layer that is one-level lower when a value of split_flag is 1.

Further, a CU is divided in prediction units (PUs) that are areas (partial areas of an image of a picture unit) serving as processing units of intra or inter prediction, and divided into transform units (TUs) that are areas (partial areas of an image of a picture unit) serving as processing units of orthogonal transform. Currently, in the HEVC scheme, in addition to 4×4 and 8×8, orthogonal transform of 16×16 and 32×32 can be used.

As in the HEVC scheme, in the case of an encoding scheme in which a CU is defined and various kinds of processes are performed in units of CUs, in the AVC scheme, a macroblock can be considered to correspond to an LCU, and a block (sub block) can be considered to correspond to a CU. Further, in the AVC scheme, a motion compensation block can be considered to correspond to a PU. Here, since a CU has a hierarchical structure, a size of an LCU of a topmost layer is commonly set to be larger than a macroblock in the AVC scheme, for example, such as 128×128 pixels.

Thus, hereinafter, an LCU is assumed to include a macroblock in the AVC scheme, and a CU is assumed to include a block (sub block) in the AVC scheme. In other words, a "block" used in the following description indicates an arbitrary partial area in a picture, and, for example, a size, a shape, and characteristics thereof are not limited. In other words, a "block" includes an arbitrary area (a processing unit) such as a TU, a PU, an SCU, a CU, an LCU, a sub block, a macroblock, or a slice. Of course, a "block" includes other partial areas (processing units) as well. When it is necessary to limit a size, a processing unit, or the like, it will be appropriately described.

<Mode Selection>

Meanwhile, in the AVC and HEVC encoding schemes, in order to achieve high encoding efficiency, it is important to select an appropriate prediction mode.

As an example of such a selection method, there is a method implemented in reference software (found at http://iphome.hhi.de/suehring/tml/index.htm) of H.264/MPEG-4 AVC called a joint model (JM).

In the JM, as will be described later, it is possible to select two mode determination methods, that is, a high complexity mode and a low complexity mode. In both modes, cost function values related to respective prediction modes are calculated, and a prediction mode having a smaller cost function value is selected as an optimal mode for a corresponding block or macroblock.

A cost function in the high complexity mode is represented as in the following Formula (1):

$$\text{Cost}(\text{Mode} \in \Omega) = D + \lambda * R \quad (1)$$

Here, $\Omega$ indicates a universal set of candidate modes for encoding a corresponding block or macroblock, and D indicates differential energy between a decoded image and an input image when encoding is performed in a corresponding prediction mode. $\lambda$ indicates Lagrange's undetermined multiplier given as a function of a quantization parameter. R indicates a total coding amount including an orthogonal transform coefficient when encoding is performed in a corresponding mode.

In other words, in order to perform encoding in the high complexity mode, it is necessary to perform a temporary encoding process once by all candidate modes in order to calculate the parameters D and R, and thus a large computation amount is required.

A cost function in the low complexity mode is represented by the following Formula (2):

$$\text{Cost}(\text{Mode} \in \Omega) = D + \text{QP2Quant}(\text{QP}) * \text{HeaderBit} \quad (2)$$

Here, D is different from that of the high complexity mode and indicates differential energy between a prediction image and an input image. QP2Quant (QP) is given as a function of a quantization parameter QP, and HeaderBit indicates a coding amount related to information belonging to a header such as a motion vector or a mode including no orthogonal transform coefficient.

In other words, in the low complexity mode, it is necessary to perform a prediction process for respective candidate modes, but since a decoded image is not necessary, it is unnecessary to perform an encoding process. Thus, it is possible to implement a computation amount smaller than that in the high complexity mode.

<Scalable Video Coding>

Figure 2:
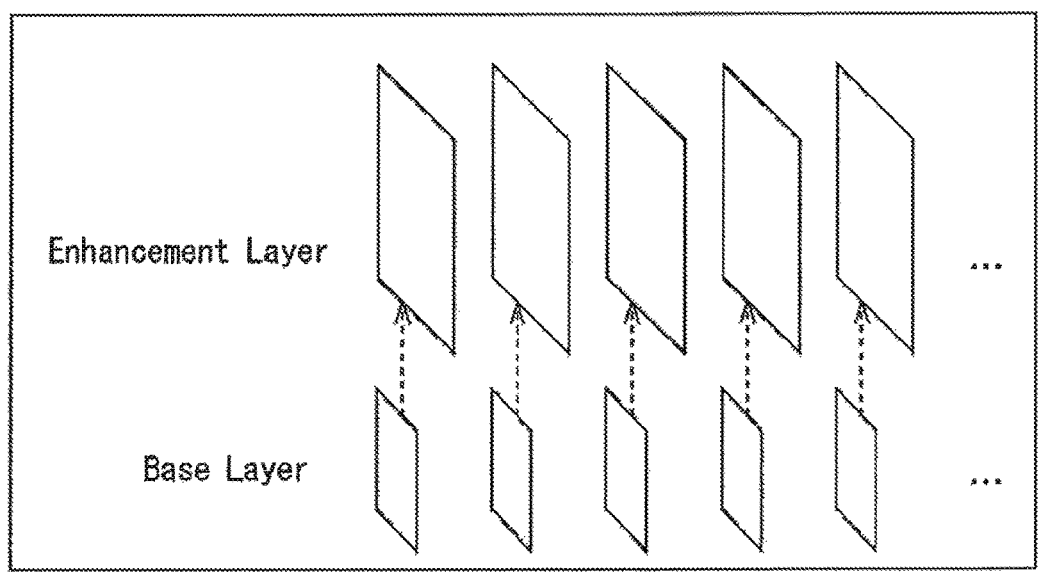
FIG. 2 is a diagram for describing an example of spatial scalable video coding.
Figure 3:
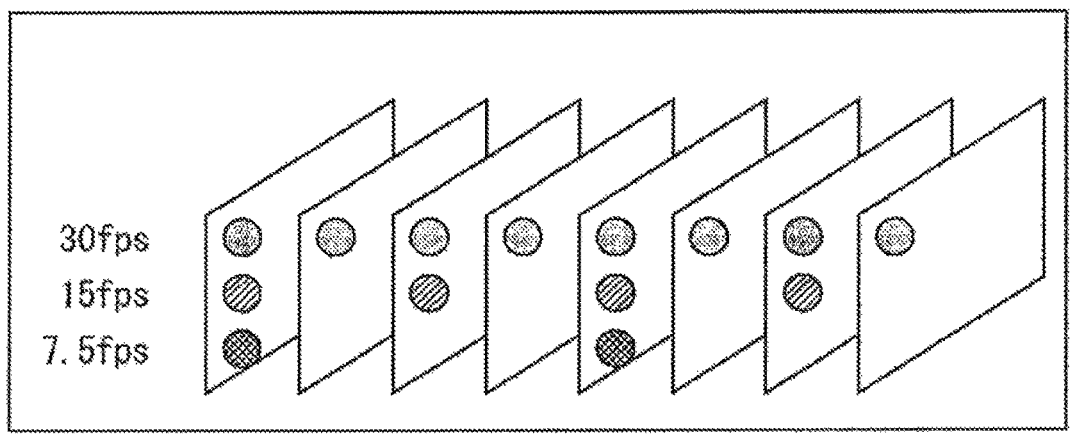
FIG. 3 is a diagram for describing an example of temporal scalable video coding.
Figure 4:
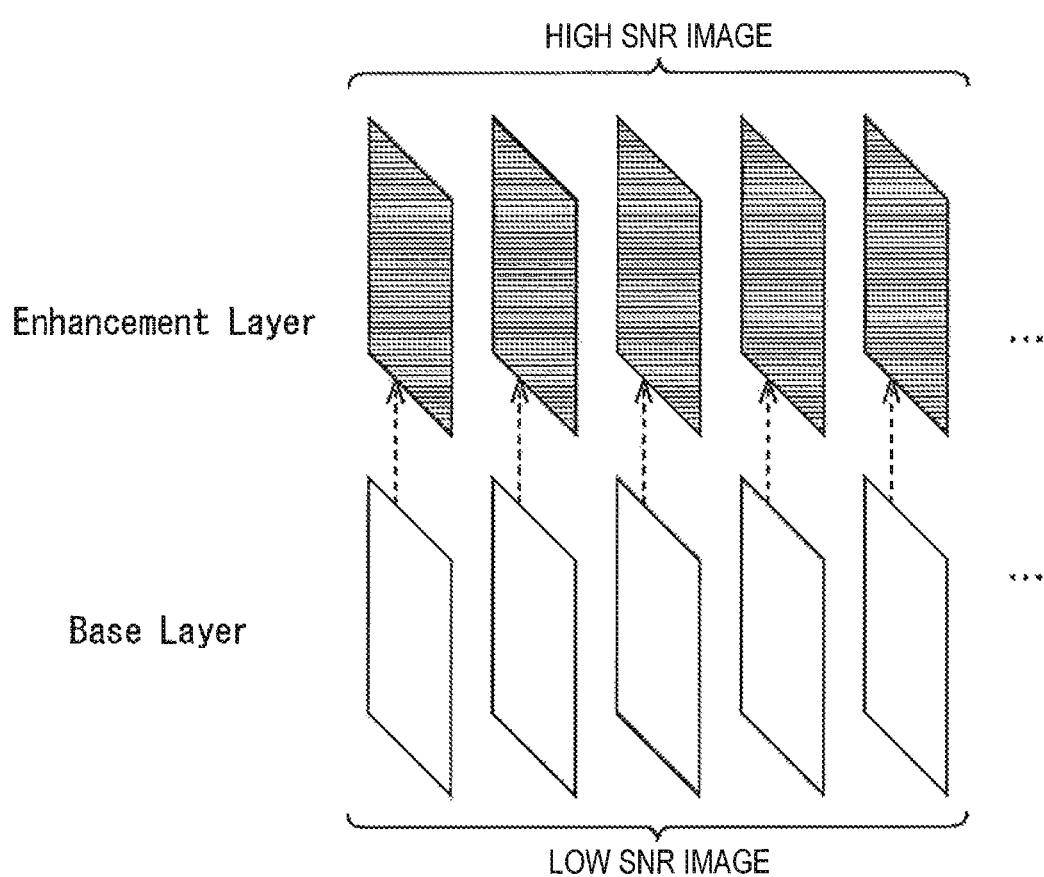
FIG. 4 is a diagram for describing an example of scalable video coding of a signal to noise ratio.

Meanwhile, the existing image encoding schemes such as MPEG2 and AVC have a scalability function as illustrated in FIGS. 2 to 4. Scalable video coding refers to a scheme of dividing (hierarchizing) an image into a plurality of layers and performing encoding for each layer.

In hierarchization of an image, one image is divided into a plurality of images (layers) based on a certain parameter. Basically, each layer is configured with differential data so that redundancy is reduced. For example, when one image is hierarchized into two layers, that is, a base layer and an enhancement layer, an image of a lower quality than an original image is obtained using only data of the base layer, and an original image (that is, a high-quality image) is obtained by combining data of the base layer with data of the enhancement layer.

As an image is hierarchized as described above, it is possible to obtain images of various qualities according to the situation. For example, for a terminal having a low processing capability such as a mobile phone, image compression information of only a base layer is transmitted, and a moving image of low spatial and temporal resolutions or a low quality is reproduced, and for a terminal having a high processing capability such as a television or a personal computer, image compression information of an enhancement layer as well as a base layer is transmitted, and a moving image of high spatial and temporal resolutions or a high quality is reproduced. In other words, image compression information according to a capability of a terminal or a network can be transmitted from a server without performing the transcoding process.

As a parameter having scalability, for example, there is spatial resolution (spatial scalability) as illustrated in FIG. 2. When the spatial scalability differs, respective layers have different resolutions. In other words, each picture is hierarchized into two layers, that is, a base layer of a resolution spatially lower than that of an original image and an enhancement layer that is combined with an image of the base layer to obtain an original image (an original spatial resolution) as illustrated in FIG. 2. Of course, the number of layers is an example, and each picture can be hierarchized into an arbitrary number of layers.

As another parameter having such scalability, for example, there is a temporal resolution (temporal scalability) as illustrated in FIG. 3. In the case of the temporal scalability, respective layers have different frame rates. In other words, in this case, each picture is hierarchized into layers having different frame rates, a moving image of a high frame rate can be obtained by combining a layer of a high frame rate with a layer of a low frame rate, and an original moving image (an original frame rate) can be obtained by combining all the layers as illustrated in FIG. 3. The number of layers is an example, and each picture can be hierarchized into an arbitrary number of layers.

Further, as another parameter having such scalability, for example, there is a signal-to-noise ratio (SNR) (SNR scalability). In the case of the SNR scalability, respective layers having different SNRs. In other words, in this case, each picture is hierarchized into two layers, that is, a base layer of an SNR lower than that of an original image and an enhancement layer that is combined with an image of the base layer to obtain an original SNR as illustrated in FIG. 4. In other words, for base layer image compression information, information related to an image of a low PSNR is transmitted, and a high PSNR image can be reconstructed by combining the information with the enhancement layer image compression information. Of course, the number of layers is an example, and each picture can be hierarchized into an arbitrary number of layers.

A parameter other than the above-described examples may be applied as a parameter having scalability. For example, there is bit-depth scalability in which the base layer includes an 8-bit image, and a 10-bit image can be obtained by adding the enhancement layer to the base layer.

Further, there is chroma scalability in which the base layer includes a component image of a 4:2:0 format, and a component image of a 4:2:2 format can be obtained by adding the enhancement layer to the base layer.

Further, as a parameter having scalability, there is a multi-view. In this case, an image is hierarchized into layers of different views.

For example, layers described in the present embodiment include spatial, temporal, SNR, bit depth, color, and view of scalability video coding described above.

Further, a term "layer" used in this specification includes a layer of scalable video coding and each view when a multi-view of a multi-view is considered.

Further, the term "layer" used in this specification is assumed to include a main layer (corresponding to sub) and a sublayer. As a specific example, a main layer may be a layer of spatial scalability, and a sublayer may be configured with a layer of temporal scalability.

In the present embodiment, a layer (Japanese) and a layer have the same meaning, a layer (Japanese) will be appropriately described as a layer.

<HRD Parameter>

Meanwhile, in the HEVC, when the decoding process of image compression information is performed, it is possible to designate a Hypothetical Reference Decoder (HDR) parameter illustrated in FIG. 5 so that no overflow or underflow of a buffer occurs. In other words, the HRD parameter is a parameter used to manage a decoder buffer. Particularly, when scalable video coding is performed, it is possible to designate the HRD parameter for each layer in a video parameter set (VPS).

<Parallel Process of Scalability Video Coding>

Figure 6:
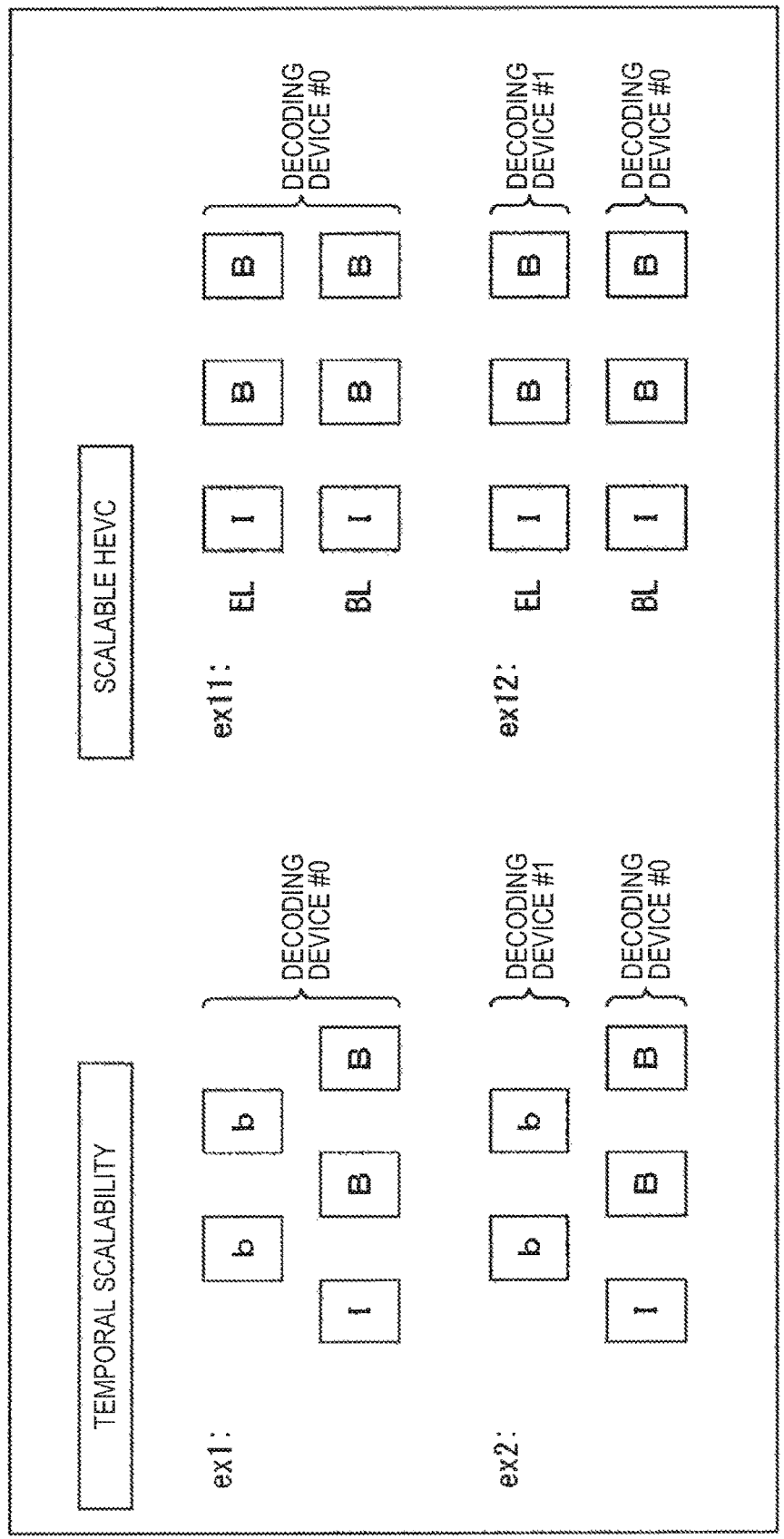
FIG. 6 is a diagram for describing a parallel process of scalability video coding.

In an example of FIG. 6, two examples (ex1 and ex2) using a sequence including an I picture, a b picture, a B picture, a b picture, and a B picture are illustrated on the left side of FIG. 6 as an example of temporal scalability. In this sequence, the I picture, the B picture, and the B picture are a lower time layer, and the b picture and the b picture are an upper time layer.

Here, the B picture indicates a picture that is referred to, and the b picture indicates a picture that is not referred to.

ex1 is an example in which all the pictures are decoded by a decoding device #0. On the other hand, ex2 is an example in which the lower time layer of the I picture, the B picture, and the B picture is decoded by the decoding device #0, and the upper time layer of the b picture and the b picture is decoded by a decoding device #1.

On the right side of FIG. 6, as a scalable HEVC example, two examples (ex11 and ex12) using a sequence including the I picture, the B picture, and the B picture of the EL (enhancement layer) serving as the upper layer and the I picture, the B picture, and the B picture of the BL (base layer) serving as the lower layer are illustrated. The scalable HEVC means scalable video coding defined in the HEVC.

ex11 is an example in which all the pictures are decoded by the decoding device #0. On the other hand, ex12 is an example in which the lower layer of the I picture, the B picture, and the B picture of the BL is decoded by the decoding device #0, and the upper layer of the I picture, the B picture, and the B picture of the EL is decoded by the decoding device #1.

For each layer of the scalable HEVC, each time layer of temporal scalability at the right side is configured as a sublayer.

As described above, in the temporal scalability of the related art, in the scalable HEVC, a process may be performed by a single decoding device, and a parallel process may be performed by a plurality of decoding devices. Further, through the syntax of FIG. 5, it is possible to designate the HRD parameter serving as the parameter used to manage the decoder buffer for each layer or a time layer that is one of sublayers.

However, as illustrated in FIG. 6, it is difficult to detect whether the decoding process is performed by a single decoding device or a plurality of decoding devices.

In this regard, in the present technology, the HRD parameter is transmitted through syntax illustrated in FIG. 7. In other words, in the present technology, information indicating whether the HRD parameter is a parameter for performing a decoding process only in a corresponding layer or a parameter for performing a decoding process of a corresponding layer and a lower layer is set. Thus, as illustrated in FIG. 6, it is clearly defined whether the decoding process is performed by a single decoding device or a plurality of decoding devices, and thus it is possible to perform a decoding process at a proper timing.

<Example of HRD Parameter>

FIG. 7 is a diagram illustrating an example of syntax of the HRD parameter according to the present technology. Numbers on the left of each row are row numbers added for description.

In an example of FIG. 7, hrd_parameters_type_flag is defined in a 10th row. When a value of hrd_parameters type_flag is 1, a value for performing a decoding process of only a corresponding layer is set as an HRD parameter of a subsequent paragraph. When a value of hrd_parameters_type_flag is 0, a value for performing a decoding process of a corresponding layer and a lower layer is set as an HRD parameter of a subsequent paragraph.

Further, hrd_parameters_type_flag may be included in an if statement starting from an 11th row.

sub_hrd_parameters_type[i]_flag is defined in a 25th row. When a value of sub_hrd_parameters_type[i]_flag is 1, a value for performing a decoding process of only a corresponding time layer is set as a sub HRD parameter of a subsequent paragraph. When a value of hrd_parameters_type_flag is 0, a value for performing a decoding process of a corresponding time layer and a lower time layer is set as a sub HRD parameter of a subsequent paragraph.

FIG. 7 illustrates the example in which the designating is performed by any one method (either only a corresponding layer is included or a lower layer is also included) for each layer and each time layer, but the present technology is not limited to this example. For example, the HRD parameter in which the HRD parameter is designated by both methods may be included.

<Other Example of HRD Parameter>

FIG. 8 is a diagram illustrating another example of syntax of the HRD parameter according to the present technology. Numbers on the left of each row are row numbers added for description.

In an example of FIG. 8, hrd_parameters_type1_present_flag is defined in an 11th row. When a value of hrd_parameters_type1_present_flag is 1, a value for performing a decoding process of only a corresponding layer is set as an HRD parameter of type1 set in 13th to 24th rows. When a value of hrd_parameters_type1_present_flag is 0, a value for performing a decoding process of a corresponding layer and a lower layer is set as the HRD parameter of type1.

hrd_parameters_type2_present_flag is defined in a 12th row. When a value of hrd_parameters_type2_present_flag is 1, a value for performing a decoding process of only a corresponding layer is set as an HRD parameter of type2 defined in 25th to 36th rows. When a value of hrd_parameters_type1_present_flag is 0, a value for performing a decoding process of a corresponding layer and a lower layer is set as the HRD parameter of type2.

Similarly to the example described above with reference to FIG. 7, the flags of the 11th and 12th rows may be described before an if statement starting from a 10th row.

sub_hrd_parameters_type1_present_flag is defined in a 40th row. When a value of sub_hrd_parameters_type1_present_flag is 1, a value for performing a decoding process of only a corresponding time layer is set as an HRD parameter of type set in 45th to 52nd rows. When a value of sub_hrd_parameters_type1_present_flag is 0, a value for performing a decoding process of a corresponding time layer and a lower time layer is set as the HRD parameter of type1.

sub_hrd_parameters_type2_present_flag is defined in a 41st row. When a value of sub_hrd_parameters_type2_present_flag is 1, a value for performing a decoding process of only a corresponding time layer is set as an HRD parameter of type2 set in 53rd to 60th rows. When a value of sub_hrd_parameters_type1_present_flag is 0, a value for performing a decoding process of a corresponding time layer and a lower time layer is set as the HRD parameter of type2.

As described above, in the present technology, the parameters of type1 and type2 serving as the HRD parameter for the decoding process of only the corresponding layer and the HRD parameter for the decoding process of the corresponding layer and the lower layer are set at the encoding side. Thus, the decoding side can select the parameter according to a device or a received bitstream.

Further, when the image compression information includes only one layer, that is, a scalability layer or a temporal scalability layer, hrd_parameter_type_flag and sub_hrd_parameter_type_flag may have any value, and the decoding process is not affected.

Next, the present technology will be described in connection with applications to a specific device. For the sake of convenience of description, the following description will proceed with a case of ex12 of the scalable HEVC and ex1 of temporal scalability in FIG. 6. Here, the present technology is not limited to this case. For example, there may be a case of ex12 of the scalable HEVC and ex2 of temporal scalability in FIG. 6, a case of ex11 of the scalable HEVC and ex2 of temporal scalability in FIG. 6, and a case of ex11 of the scalable HEVC and ex1 of temporal scalability in FIG. 6.

<1. First Embodiment>
<Scalable Encoding Device>

Figure 10:
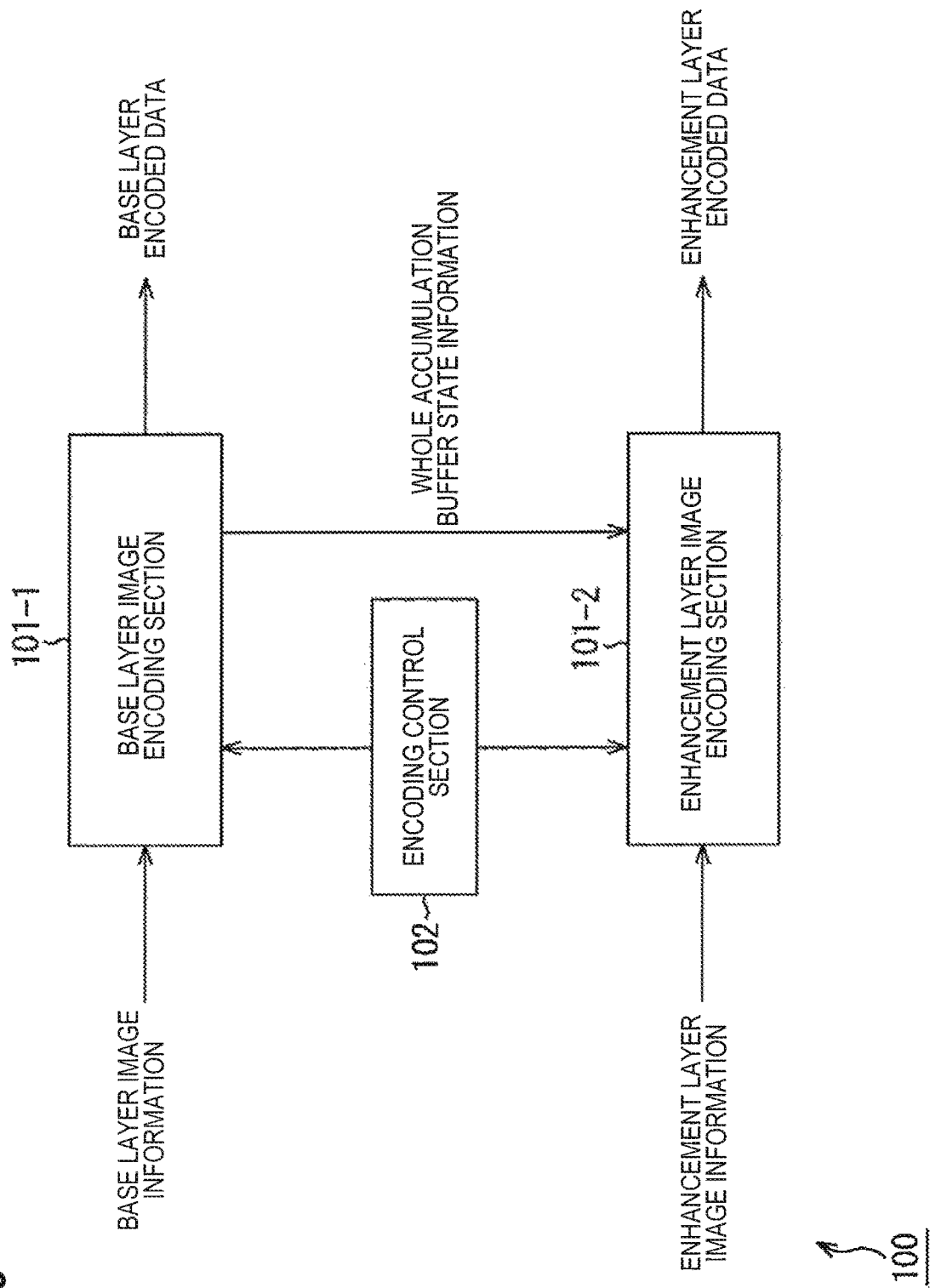
FIG. 10 is a block diagram illustrating an example of a main configuration of a scalable encoding device.

FIG. 10 is a block diagram illustrating an example of a main configuration of a scalable encoding device.

A scalable encoding device 100 illustrated in FIG. 10 encodes each layer of image data hierarchized into a base layer and an enhancement layer.

The scalable encoding device 100 is configured to include a base layer image encoding section 101-1, an enhancement layer image encoding section 101-2, and an encoding control section 102.

The base layer image encoding section 101-1 acquires image information (base layer image information) of the base layer. The base layer image encoding section 101-1 encodes the base layer image information without referring to other layers, generates encoded data (base layer encoded data) of the base layer, and outputs the generated encoded data.

The enhancement layer image encoding section 101-2 acquires image information (enhancement layer image information) of the enhancement layer. The enhancement layer image encoding section 101-2 encodes the enhancement layer image information. At this time, the enhancement layer image encoding section 101-2 performs inter-layer prediction with reference to information related to encoding of the base layer as necessary.

Further, the enhancement layer image encoding section 101-2 sets the HRD parameter type for each layer, and calculates the HRD parameter serving as the parameter used to manage the decoder buffer based on state information of an accumulation buffer according to the set HRD parameter type. The enhancement layer image encoding section 101-2 encodes the calculated HRD parameter.

Specifically, the HRD parameter type indicates whether the HRD parameter is the parameter for decoding only a corresponding layer or the parameter for performing the decoding process of a corresponding layer and a lower layer. This type may set both of the parameters as well as any one of the parameters. The encoding side calculates the HRD parameter according to the flag (information) indicating the set type, and transmits the flag indicating the set type and the calculated HRD parameter to the decoding side. Hereinafter, the flag indicating the HRD parameter type is appropriately referred to as an "HRD parameter type flag."

When the flag indicating the HRD parameter type is 1, the enhancement layer image encoding section 101-2 calculates the HRD parameter based on the state information of its own accumulation buffer. When the flag indicating the HRD parameter type is 0, the enhancement layer image encoding section 101-2 acquires state information of the whole accumulation buffer of the base layer image encoding section 101-1, and calculates the HRD parameter based on the state information of the base layer image encoding section 101-1 and its own accumulation buffer. This process is performed on a layer and a sublayer (time layer). In the base layer image encoding section 101-1, this process is performed only on the sublayer.

The enhancement layer image encoding section 101-2 generates encoded data (enhancement layer encoded data) of the enhancement layer through the above encoding, and outputs the generated encoded data.

The base layer image encoding section 101-1 and the enhancement layer image encoding section 101-2 are appropriately referred to collectively as a "layer image encoding section 101."

The encoding control section 102 controls the encoding process of the layer image encoding sections 101, for example, in view of the reference relation of the layer image encoding sections 101.

In the example of FIG. 10, one enhancement layer image encoding section 101-2 is illustrated, but when there is an upper layer, enhancement layer image encoding sections 101-3, 101-4, . . . that encode the upper layer are provided for each of the upper layers.

<Example of Configuration of Layer Image Encoding Section>

Figure 11:
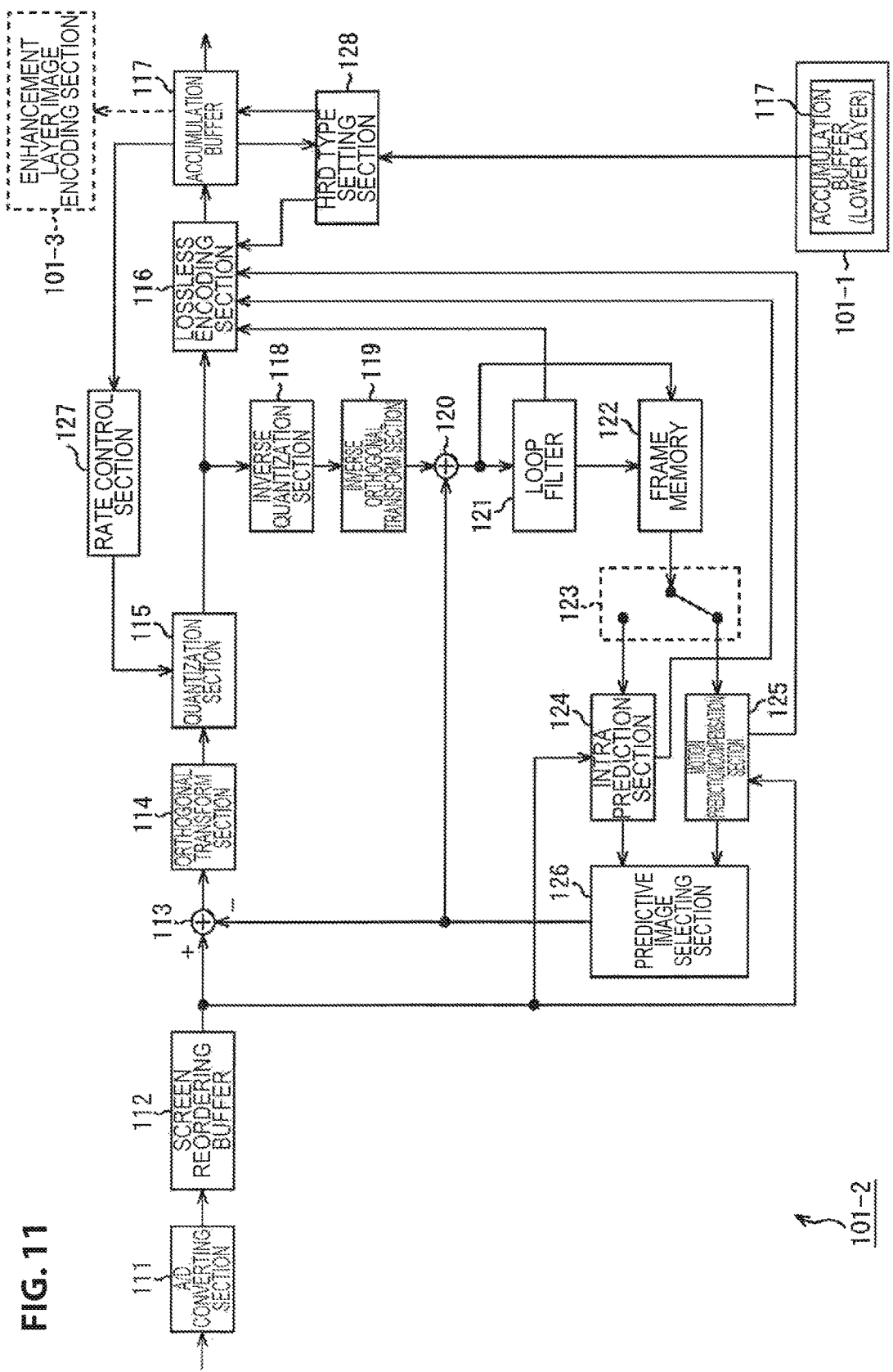
FIG. 11 is a block diagram illustrating an example of a main configuration of an enhancement layer image encoding section.

FIG. 11 is a block diagram illustrating an example of a main configuration of the enhancement layer image encoding section 101-2. The base layer image encoding section 101-1 of FIG. 10 has basically the same configuration as the enhancement layer image encoding section 101-2 of FIG. 11 except that a type of an image serving as a target is different. For the sake of convenience of description, in the example of FIG. 11, a configuration of the enhancement layer image encoding section 101-2 will be described as an example.

As illustrated in FIG. 11, the enhancement layer image encoding section 101-2 includes an A/D converting section 111, a screen reordering buffer 112, an operation section 113, an orthogonal transform section 114, a quantization section 115, a lossless encoding section 116, an accumulation buffer 117, an inverse quantization section 118, and an inverse orthogonal transform section 119. The enhancement layer image encoding section 101-2 further includes an operation section 120, a loop filter 121, a frame memory 122, a selecting section 123, an intra prediction section 124, a motion prediction/compensation section 125, a predictive image selecting section 126, and a rate control section 127. The enhancement layer image encoding section 101-2 further includes an HRD type setting section 128.

The A/D converting section 111 performs A/D conversion on input image data (the enhancement layer image information), and supplies the converted image data (digital data) to be stored in the screen reordering buffer 112. The screen reordering buffer 112 reorders images of frames stored in a display order in a frame order for encoding according to a Group Of Pictures (GOP), and supplies the images in which the frame order is reordered to the operation section 113. The screen reordering buffer 112 also supplies the images in which the frame order is reordered to the intra prediction section 124 and the motion prediction/compensation section 125.

The operation section 113 subtracts a predictive image supplied from the intra prediction section 124 or the motion prediction/compensation section 125 via the predictive image selecting section 126 from an image read from the screen reordering buffer 112, and outputs differential information thereof to the orthogonal transform section 114. For example, in the case of an image that has been subjected to intra coding, the operation section 113 subtracts the predictive image supplied from the intra prediction section 124 from the image read from the screen reordering buffer 112. Further, for example, in the case of an image that has been subjected to inter coding, the operation section 113 subtracts the predictive image supplied from the motion prediction/compensation section 125 from the image read from the screen reordering buffer 112.

The orthogonal transform section 114 performs an orthogonal transform such as a discrete cosine transform or a Karhunen-Loève Transform on the differential information supplied from the operation section 113. The orthogonal transform section 114 supplies transform coefficients to the quantization section 115.

The quantization section 115 quantizes the transform coefficients supplied from the orthogonal transform section 114. The quantization section 115 sets a quantization parameter based on information related to a target value of a coding amount supplied from the rate control section 127, and performs the quantizing. The quantization section 115 supplies the quantized transform coefficients to the lossless encoding section 116.

The lossless encoding section 116 encodes the transform coefficients quantized in the quantization section 115 according to an arbitrary encoding scheme. Since coefficient data is quantized under control of the rate control section 127, the coding amount becomes a target value (or approaches a target value) set by the rate control section 127.

The lossless encoding section 116 acquires information indicating an intra prediction mode or the like from the intra prediction section 124, and acquires information indicating an inter prediction mode, differential motion vector information, or the like from the motion prediction/compensation section 125. Further, the lossless encoding section 116 appropriately generates an NAL unit of the enhancement layer including a sequence parameter set (SPS), a picture parameter set (PPS), and the like.

The lossless encoding section 116 encodes various kinds of information according to an arbitrary encoding scheme, and sets (multiplexes) the encoded information as part of encoded data (also referred to as an "encoded stream"). The lossless encoding section 116 supplies the encoded data obtained by the encoding to be accumulated in the accumulation buffer 117.

Examples of the encoding scheme of the lossless encoding section 116 include variable length coding and arithmetic coding. As the variable length coding, for example, there is Context-Adaptive Variable Length Coding (CAVLC) defined in the H.264/AVC scheme. As the arithmetic coding, for example, there is Context-Adaptive Binary Arithmetic Coding (CABAC).

The accumulation buffer 117 temporarily holds the encoded data (enhancement layer encoded data) supplied from the lossless encoding section 116. The accumulation buffer 117 outputs the held enhancement layer encoded data to a recording device (recording medium), a transmission path, or the like (not illustrated) at a subsequent stage at a certain timing. In other words, the accumulation buffer 117 serves as a transmitting section that transmits the encoded data as well. Further, when there is a request from the HRD type setting section 128, the accumulation buffer 117 supplies information indicating a state of the accumulation buffer 117. Further, for example, when there is an enhancement layer image encoding section 101-3 of an upper layer, and there is a request from its HRD type setting section 128 as indicated by a dotted line, the accumulation buffer 117 supplies the information indicating the state of the accumulation buffer 117 to the enhancement layer image encoding section 101-3 of the upper layer.

The transform coefficients quantized by the quantization section 115 are also supplied to the inverse quantization section 118. The inverse quantization section 118 inversely quantizes the quantized transform coefficients according to a method corresponding to the quantization performed by the quantization section 115. The inverse quantization section 118 supplies the obtained transform coefficients to the inverse orthogonal transform section 119.

The inverse orthogonal transform section 119 performs an inverse orthogonal transform on the transform coefficients supplied from the inverse quantization section 118 according to a method corresponding to the orthogonal transform process performed by the orthogonal transform section 114. An output (restored differential information) that has been subjected to the inverse orthogonal transform is supplied to the operation section 120.

The operation section 120 obtains a locally decoded image (a decoded image) by adding the predictive image supplied from the intra prediction section 124 or the motion prediction/compensation section 125 via the predictive image selecting section 126 to the restored differential information serving as an inverse orthogonal transform result supplied from the inverse orthogonal transform section 119. The decoded image is supplied to the loop filter 121 or the frame memory 122.

The loop filter 121 includes a deblock filter, an adaptive offset filter, an adaptive loop filter, or the like, and appropriately performs a filter process on the reconstructed image supplied from the operation section 120. For example, the loop filter 121 performs the deblock filter process on the reconstructed image, and removes block distortion of the reconstructed image. Further, for example, the loop filter 121 improves the image quality by performing the loop filter process on the deblock filter process result (the reconstructed image from which the block distortion has been removed) using a Wiener filter. The loop filter 121 supplies the filter process result (hereinafter referred to as a "decoded image") to the frame memory 122.

The loop filter 121 may further perform any other arbitrary filter process on the reconstructed image. The loop filter 121 may supply information used in the filter process such as a filter coefficient to the lossless encoding section 116 as necessary so that the information can be encoded.

The frame memory 122 stores the reconstructed image supplied from the operation section 120 and the decoded image supplied from the loop filter 121. The frame memory 122 supplies the stored reconstructed image to the intra prediction section 124 via the selecting section 123 at a certain timing or based on an external request, for example, from the intra prediction section 124. Further, the frame memory 122 supplies the stored decoded image to the motion prediction/compensation section 125 via the selecting section 123 at a certain timing or based on an external request, for example, from the motion prediction/compensation section 125.

The frame memory 122 stores the supplied decoded image, and supplies the stored decoded image to the selecting section 123 as a reference image at a certain timing.

The selecting section 123 selects a supply destination of the reference image supplied from the frame memory 122. For example, in the case of the intra prediction, the selecting section 123 supplies the reference image (a pixel value of a current picture) supplied from the frame memory 122 to the motion prediction/compensation section 125. Further, for example, in the case of the inter prediction, the selecting section 123 supplies the reference image supplied from the frame memory 122 to the motion prediction/compensation section 125.

The intra prediction section 124 performs the intra prediction (intra-screen prediction) for generating the predictive image using the pixel value of the current picture serving as the reference image supplied from the frame memory 122 via the selecting section 123. The intra prediction section 124 performs the intra prediction in a plurality of intra prediction modes that are prepared in advance.

The intra prediction section 124 generates predictive images in all the intra prediction modes serving as the candidates, evaluates cost function values of the predictive images using the input image supplied from the screen reordering buffer 112, and selects an optimal mode. When the optimal intra prediction mode is selected, the intra prediction section 124 supplies the predictive image generated in the optimal mode to the predictive image selecting section 126.

As described above, the intra prediction section 124 appropriately supplies, for example, the intra prediction mode information indicating the employed intra prediction mode to the lossless encoding section 116 so that the information is encoded.

The motion prediction/compensation section 125 performs the motion prediction (the inter prediction) using the input image supplied from the screen reordering buffer 112 and the reference image supplied from the frame memory 122 via the selecting section 123. Although not illustrated, in the motion prediction/compensation section 125, the reference image supplied from the frame memory 122 of the base layer image encoding section 101-1 is also referred to as necessary. The motion prediction/compensation section 125 performs a motion compensation process according to a detected motion vector, and generates a predictive image (inter-predictive image information). The motion prediction/compensation section 125 performs the inter prediction in a plurality of inter prediction modes that are prepared in advance.

The motion prediction/compensation section 125 generates predictive images in all the inter prediction modes serving as a candidate. The motion prediction/compensation section 125 evaluates cost function values of the predictive images using the input image supplied from the screen reordering buffer 112, information of the generated differential motion vector, and the like, and selects an optimal mode. When the optimal inter prediction mode is selected, the motion prediction/compensation section 125 supplies the predictive image generated in the optimal mode to the predictive image selecting section 126.

The motion prediction/compensation section 125 supplies information indicating the employed inter prediction mode, information necessary for performing processing in the inter prediction mode when the encoded data is decoded, and the like to the lossless encoding section 116 so that the information is encoded. For example, as the necessary information, there is information of a generated differential motion vector, and as prediction motion vector information, there is a flag indicating an index of a prediction motion vector.

The predictive image selecting section 126 selects a supply source of the prediction image to be supplied to the operation section 113 and the operation section 120. For example, in the case of the intra coding, the predictive image selecting section 126 selects the intra prediction section 124 as the supply source of the predictive image, and supplies the predictive image supplied from the intra prediction section 124 to the operation section 113 and the operation section 120. For example, in the case of the inter coding, the predictive image selecting section 126 selects the motion prediction/compensation section 125 as the supply source of the predictive image, and supplies the predictive image supplied from the motion prediction/compensation section 125 to the operation section 113 and the operation section 120.

The rate control section 127 controls a rate of a quantization operation of the quantization section 115 based on the coding amount of the encoded data accumulated in the accumulation buffer 117 such that no overflow or underflow occurs.

The HRD type setting section 128 decides the HRD parameter type according to the user's instruction, and acquires information indicating an accumulation state from the accumulation buffer 117 or the accumulation buffer (the lower layer) 117 of the base layer image encoding section 101-1 according to the decided HRD parameter type. The HRD type setting section 128 calculates the HRD parameter based on the acquired information, and causes the lossless encoding section 116 to encode the flag indicating the HRD parameter type and the HRD parameter.

Further, when the image compression information (encoded data) to be output includes one layer, the value of the flag indicating the HRD parameter type is arbitrary, and does not affect the process at the decoding side.

<Example of Configuration of Accumulation Buffer and HRD Type Setting Section>

Figure 12:
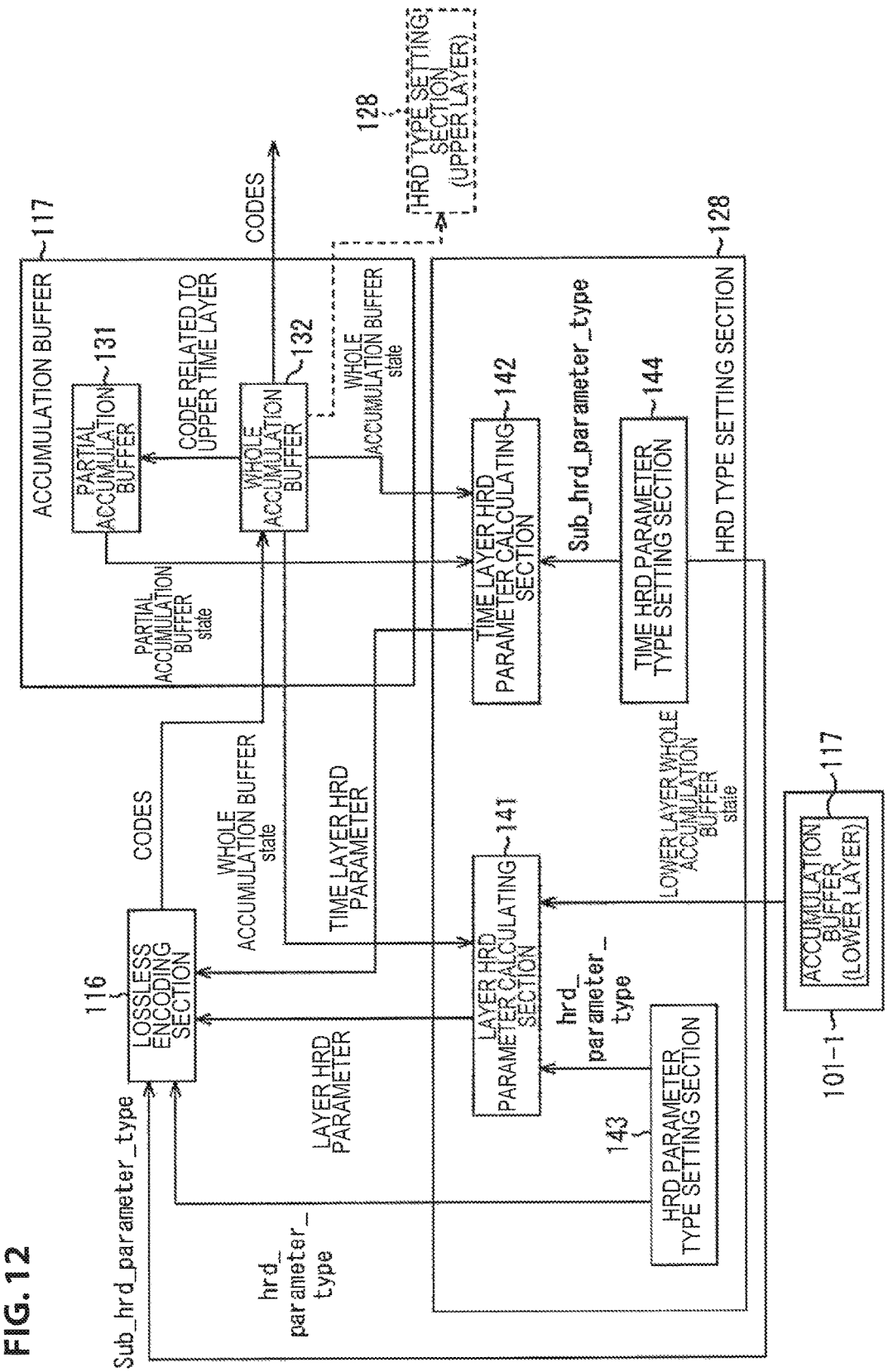
FIG. 12 is a block diagram illustrating an example of a main configuration of an accumulation buffer and an HRD type setting section.

FIG. 12 is a block diagram illustrating an example of a configuration of the accumulation buffer and the HRD type setting section of FIG. 11.

In an example of FIG. 12, the accumulation buffer 117 is configured to include a partial accumulation buffer 131 and a whole accumulation buffer 132.

The HRD type setting section 128 is configured to include a layer HRD parameter calculating section 141, a time layer HRD parameter calculating section 142, an HRD parameter type setting section 143, and a time HRD parameter type setting section 144.

The partial accumulation buffer 131 is configured with each accumulation buffer that accumulates encoded data related to each upper time layer among the encoded data (codes) accumulated in the whole accumulation buffer 132. The information indicating the state of each accumulation buffer is supplied to the time layer HRD parameter calculating section 142 on request.

The whole accumulation buffer 132 accumulates the encoded data (codes) encoded by the lossless encoding section 116. Further, information indicating a state of the whole accumulation buffer of the whole accumulation buffer 132 is supplied to the layer HRD parameter calculating section 141 and the time layer HRD parameter calculating section 142 on request. Further, there are cases in which there is the enhancement layer image encoding section 101-3 of the upper layer as indicated by a dotted line. In this case, the information indicating the state of the whole accumulation buffer of the whole accumulation buffer 132 is also supplied to the HRD type setting section (upper layer) 128 according to the request of the HRD type setting section (upper layer) 128 of the enhancement layer image encoding section 101-3.

The layer HRD parameter calculating section 141 acquires the information indicating the state of the whole accumulation buffer 132 and the information indicating the state of the accumulation buffer (the lower layer) 117 of the base layer image encoding section 101-1 according to the HRD parameter type (flag) supplied from the HRD parameter type setting section 143. Practically, information is acquired from the whole accumulation buffer 132 of the accumulation buffer of the base layer image encoding section 101-1.

When the HRD parameter type flag indicates 1, the information indicating the state of the whole accumulation buffer 132 is acquired. When the HRD parameter type flag indicates 0, the information indicating the state of the whole accumulation buffer 132 and the information indicating the state of the accumulation buffer (the lower layer) 117 of the base layer image encoding section 101-1 are acquired.

The layer HRD parameter calculating section 141 calculates a layer HRD parameter based on the HRD parameter type flag supplied from the HRD parameter type setting section 143 and the acquired information, and supplies the calculated layer HRD parameter to the lossless encoding section 116.

The time layer HRD parameter calculating section 142 acquires the information indicating the state of the whole accumulation buffer 132 and the information indicating the state of the accumulation buffer of the corresponding time layer of the partial accumulation buffer 131 according to the sub HRD parameter type (flag) supplied from the time HRD parameter type setting section 144.

When the sub HRD parameter type flag indicates 1, the information indicating the state of the accumulation buffer of the corresponding time layer of the partial accumulation buffer 131 is acquired. When the sub HRD parameter type flag indicates 0, the information indicating the state of the whole accumulation buffer 132 and the information indicating the state of the accumulation buffer of the corresponding time layer of the partial accumulation buffer 131 are acquired.

The time layer HRD parameter calculating section 142 calculates a time layer HRD parameter based on the sub HRD parameter type supplied from the time HRD parameter type setting section 144 and the acquired information, and supplies the calculated time layer HRD parameter to the lossless encoding section 116.

The HRD parameter type setting section 143 sets the HRD parameter type according to the user's instruction, and supplies the flag indicating the set HRD parameter type to the lossless encoding section 116 and the layer HRD parameter calculating section 141.

The time HRD parameter type setting section 144 sets the sub HRD parameter type according to the user's instruction, and supplies a flag indicating the set sub HRD parameter type to the lossless encoding section 116 and the time layer HRD parameter calculating section 142.

The lossless encoding section 116 encodes the flag indicating the HRD parameter type supplied from the HRD parameter type setting section 143 and the layer HRD parameter supplied from the layer HRD parameter calculating section 141, and sets the encoded information as header information of the encoded data. The lossless encoding section 116 encodes the flag indicating the sub HRD parameter type supplied from the time HRD parameter type setting section 144, and the time layer HRD parameter supplied from the time layer HRD parameter calculating section 142, and sets the encoded information as the header information of the encoded data. The encoded data is output to the whole accumulation buffer 132.

<Layer Structure>

In the scalable video coding, image data is hierarchized into a plurality of layers as described above with reference to FIGS. 2 to 4. In the following, for the sake of description, this layer is referred to as a main layer.

Figure 13:
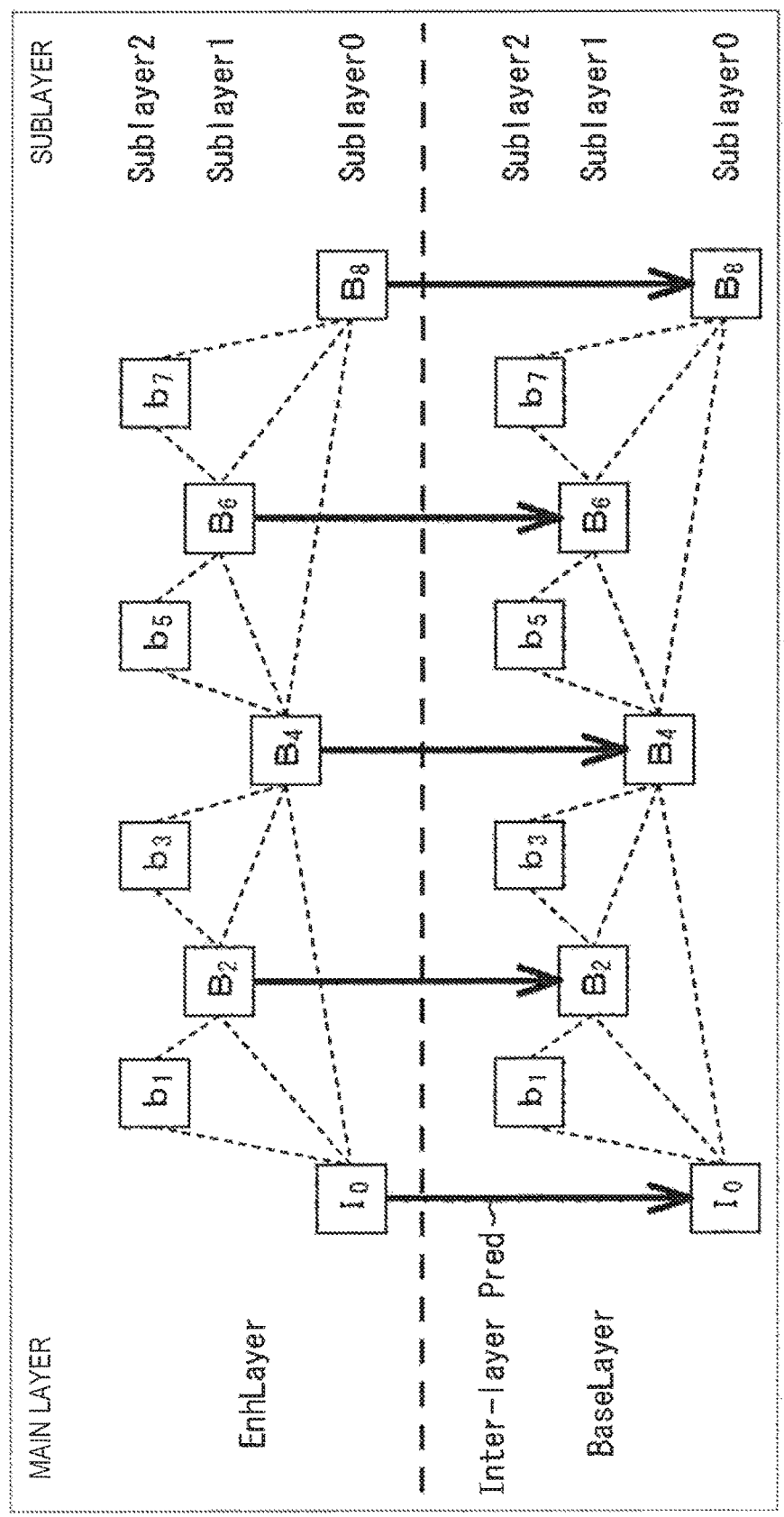
FIG. 13 is a diagram for describing an example of a layer structure.

A picture group of each main layer configures a sequence in the main layer. The pictures in the sequence form a hierarchical structure (a GOP structure) as illustrated in FIG. 13, similarly to moving image data of a single main layer. In the following, for the sake of description, a layer in one main layer is referred to as a sublayer.

In the example of FIG. 13, a main layer is configured with two layers, that is, a base layer (BaseLayer) and an enhancement layer (EnhLayer). The base layer is a layer in which an image is formed by only its own main layer without depending on other main layers. Data of the base layer is encoded and decoded without referring to other main layers. The enhancement layer is a main layer that is combined with data of the base layer to obtain an image. Data of the enhancement layer can be used by a prediction process (an inter-main layer prediction process) (which is also referred to as "inter-layer prediction") with a corresponding base layer.

The number of main layers of encoded data hierarchized by the scalable video coding is arbitrary. In the following, each main layer is assumed to be set as a base layer or an enhancement layer, and in each enhancement layer, any one base layer is assumed to be set as a reference destination.

In the example of FIG. 13, each of the base layer and the enhancement layer has a GOP structure configured with three sublayers, that is, a sublayer 0 (Sublayer0), a sublayer 1 (Sublayer1), and a sublayer 2 (Sublayer2). A square illustrated in FIG. 13 indicates a picture, and a character in the square indicates a type of a picture. For example, a square in which "I" is written indicates an I picture, a square in which "B" is written indicates a B picture that is referable to, and a square in which "b" is written indicates a B picture that is not referred to. Further, a dotted line between squares indicates a dependence relation (a reference relation). As indicated by individual dotted lines, a picture of an upper sublayer depends on a picture of a lower sublayer. In other words, the picture of the sublayer 1 or the picture of the sublayer 0 is referred to by the picture of the sublayer 2 (Sublayer2). Further, the picture of the sublayer 0 is referred to by the picture of the sublayer 1. The picture of the sublayer 0 is appropriately referred to by the picture of the sublayer 0.

The number of sublayers (a sublayer number) is arbitrary. The GOP structure is also arbitrary, and not limited to the example of FIG. 13.

Here, a correspondence relation with the present embodiment will be described. Encoded data of all pictures of the enhancement layer is accumulated in the whole accumulation buffer 132 of FIG. 12.

The partial accumulation buffer 131 of FIG. 12 includes an accumulation buffer of the sublayer 1 and an accumulation buffer of the sublayer 2. In other words, for example, encoded data of the B pictures of the sublayer 1 indicated by B2, B4, and B6 in the enhancement layer of FIG. 13 is accumulated in the accumulation buffer of the sublayer 1. Encoded data of the B pictures of the sublayer 2 indicated by b1, b3, b5, and b7 in the enhancement layer is accumulated in the accumulation buffer of the sublayer 2.

Further, encoded data of all pictures of the base layer of FIG. 13 is accumulated in (the whole accumulation buffer 132 of) the accumulation buffer 117 of the base layer image encoding section 101-1 illustrated in FIG. 12, and information indicating the buffer state is supplied to the layer HRD parameter calculating section 141 as information indicating a state of the lower layer whole accumulation buffer.

Further, although not illustrated, the partial accumulation buffer 131 of the accumulation buffer 117 of the base layer image encoding section 101-1 includes an accumulation buffer of the sublayer 1 and an accumulation buffer of the sublayer 2. In other words, for example, encoded data of the B pictures of the sublayer 1 indicated by B2, B4, and B6 in the base layer of FIG. 13 is accumulated in the accumulation buffer of the sublayer 1. Encoded data of the B pictures of the sublayer 2 indicated by b1, b3, b5, and b7 in the base layer is accumulated in the accumulation buffer of the sublayer 2.

<Flow of Encoding Process>

Next, the flow of the process performed by the scalable encoding device 100 will be described. First, an example of the flow of an encoding process will be described with reference to a flowchart of FIG. 14.

When the encoding process starts, in step S101, the encoding control section 102 of the scalable encoding device 100 decides a layer of a processing target in view of the reference relation of an image or the like.

In step S102, the base layer image encoding section 101-1 performs a layer encoding process under control of the encoding control section 102. The layer encoding process will be described later with reference to FIG. 15. When the process of step S102 ends, the process proceeds to step S103.

In step S103, the encoding control section 102 determines whether or not all the main layers have been processed. When it is determined that there is a non-processed main layer, the process proceeds to step S104.

In step S104, the encoding control section 102 sets a next non-processed main layer as a processing target (current main layer). When the process of step S104 ends, the process returns to step S102. In step S102, the enhancement layer image encoding section 101-2 performs the layer encoding process under control of the encoding control section 102. The process of steps S102 to S104 is repeatedly performed to encode the main layers as described above. The process of step S102 may be processed in parallel by a plurality of layer image encoding sections 101 having no reference relation.

Then, when all the main layers are determined to have been processed in step S103, the encoding process ends.

<Flow of Layer Encoding Process>

Next, the layer encoding process in step S102 of FIG. 14 will be described with reference to a flowchart of FIG. 15. An example of FIG. 15 will be described in connection with an example of the enhancement layer image encoding section 101-2.

In step Sill, the A/D converting section 111 of the enhancement layer image encoding section 101-2 performs A/D conversion on input image information (image data) of the enhancement layer. In step S112, the screen reordering buffer 112 stores image information (digital data) of the enhancement layer that has been subjected to the A/D conversion, and reorders the pictures arranged in the display order in the encoding order.

In step S113, the intra prediction section 124 performs the intra prediction process in the intra prediction mode. In step S114, the motion prediction/compensation section 125 performs an inter motion prediction process in which motion prediction and motion compensation in the inter prediction mode are performed. In step S115, the predictive image selecting section 126 decides an optimal mode based on the cost function values output from the intra prediction section 124 and the motion prediction/compensation section 125. In other words, the predictive image selecting section 126 selects either of the predictive image generated by the intra prediction section 124 and the predictive image generated by the motion prediction/compensation section 125. In step S116, the operation section 113 calculates a difference between the image reordered in the process of step S112 and the predictive image selected in the process of step S115. The differential data is smaller in a data amount than the original image data. Thus, it is possible to compress a data amount to be smaller than when an image is encoded without change.

In step S117, the orthogonal transform section 114 performs the orthogonal transform process on the differential information generated in the process of step S116. In step S118, the quantization section 115 quantizes the orthogonal transform coefficients obtained in the process of step S117 using the quantization parameter calculated by the rate control section 127.

The differential information quantized in the process of step S118 is locally decoded as follows. In other words, in step S119, the inverse quantization section 118 performs inverse quantization on the quantized coefficients (which are also referred to as "quantization coefficients") quantized in the process of step S118 according to characteristics corresponding to characteristics of the quantization section 115. In step S120, the inverse orthogonal transform section 119 performs the inverse orthogonal transform on the orthogonal transform coefficients obtained in the process of step S117. In step S121, the operation section 120 generates a locally decoded image (an image corresponding to an input of the operation section 113) by adding the predictive image to the locally decoded differential information.

In step S122, the loop filter 121 performs filtering on the image generated in the process of step S121. As a result, for example, block distortion is removed. In step S123, the frame memory 122 stores the image in which, for example, the block distortion has been deleted in the process of step S122. The image that is not subjected to the filter process performed by the loop filter 121 is also supplied from the operation section 120 and stored in the frame memory 122. The image stored in the frame memory 122 is used in the process of step S113 or the process of step S114.

In step S124, the HRD type setting section 128 performs an HRD parameter encoding process. The HRD parameter encoding process will be described later with reference to FIG. 16, and through this process, the flag indicating the HRD parameter type and the HRD parameter are supplied to the lossless encoding section 116.

In step S125, the lossless encoding section 116 encodes the coefficients quantized in the process of step S118. In other words, lossless coding such as variable length coding or arithmetic coding is performed on data corresponding to the differential image.

At this time, the lossless encoding section 116 encodes information related to the prediction mode of the predictive image selected in the process of step SI 15, and adds the encoded information to the encoded data obtained by encoding the differential image. In other words, the lossless encoding section 116 also encodes, for example, information according to the optimal intra prediction mode information supplied from the intra prediction section 124 or the optimal inter prediction mode supplied from the motion prediction/compensation section 125, and adds the encoded information to the encoded data. Further, the lossless encoding section 116 also encodes information such as a flag indicating the HRD parameter type and the HRD parameter supplied in the process of step S124, and adds the encoded information to the encoded data.

In step S126, the accumulation buffer 117 accumulates the enhancement layer encoded data obtained in the process of step S125. The enhancement layer encoded data accumulated in the accumulation buffer 117 is appropriately read and transmitted to the decoding side via a transmission path or a recording medium.

In step S127, the rate control section 127 controls the quantization operation of the quantization section 115 based on the coding amount (the generated coding amount) of the encoded data accumulated in the accumulation buffer 117 in the process of step S126 so that no overflow or underflow occurs. Further, the rate control section 127 supplies information related to the quantization parameter to the quantization section 115.

Figure 14:
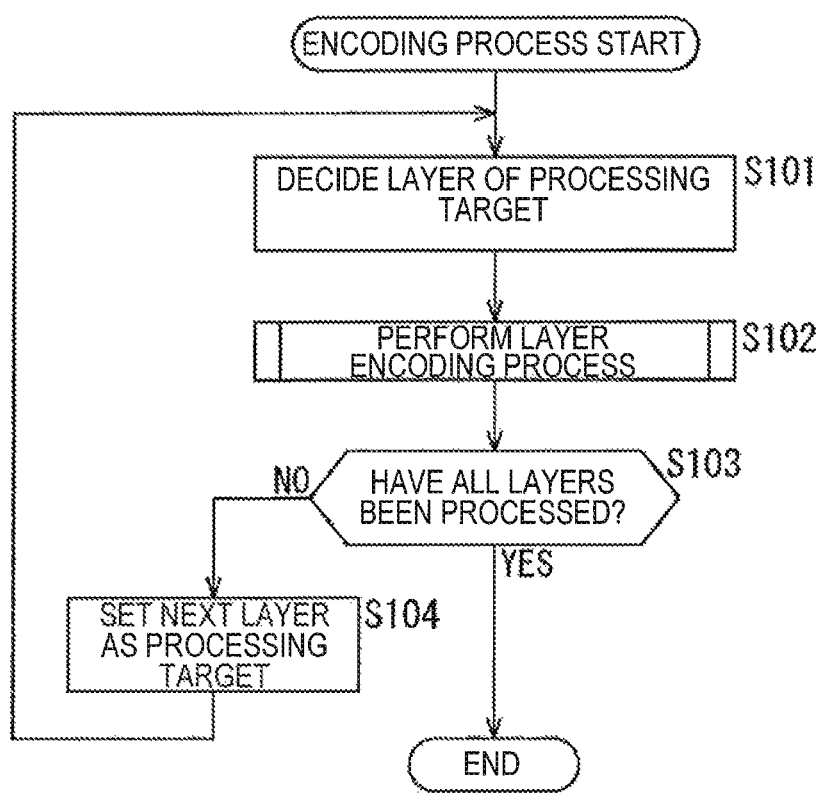
FIG. 14 is a flowchart for describing an example of a flow of an encoding process.

When the process of step S127 ends, the encoding process ends, and the process returns to step S102 of FIG. 14.

<Flow of HRD Parameter Encoding Process>

Next, an example of encoding the HRD parameter illustrated in FIG. 7 will be described with reference to a flowchart of FIG. 16.

In step S131, the HRD parameter type setting section 143 sets the HRD parameter type according to the user's instruction. The HRD parameter type setting section 143 supplies the flag indicating the set HRD parameter type to the lossless encoding section 116 and the layer HRD parameter calculating section 141.

In step S132, the layer HRD parameter calculating section 141 performs a process of calculating the HRD parameter of the corresponding layer according to the flag indicating the HRD parameter type supplied from the HRD parameter type setting section 143. The process of calculating the HRD parameter will be described later with reference to FIG. 17.

In step S133, the layer HRD parameter calculating section 141 supplies the HRD parameter of the corresponding layer calculated in step S132 to the lossless encoding section 116 so that the HRD parameter of the corresponding layer is encoded.

Figure 15:
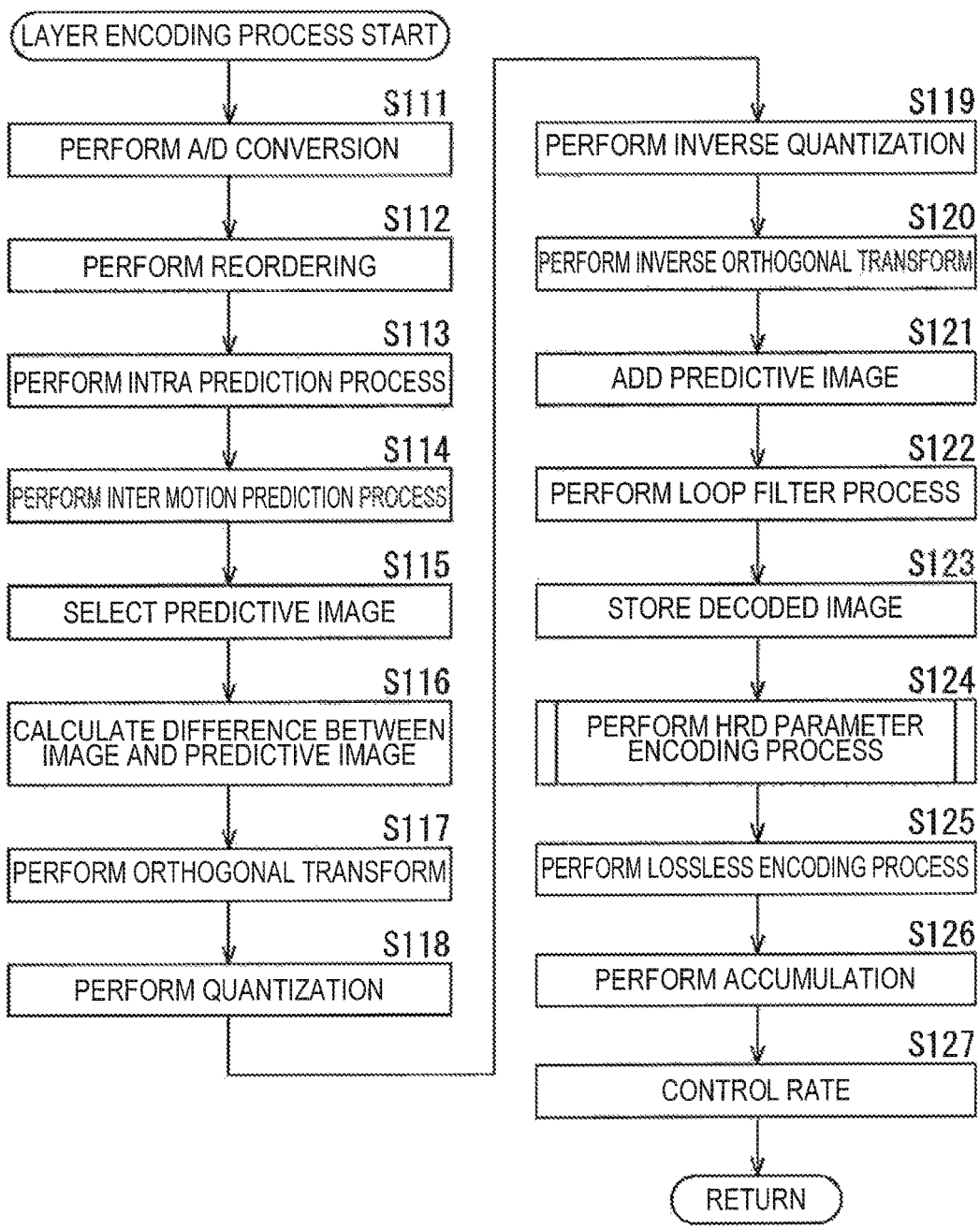
FIG. 15 is a flowchart for describing an example of a layer encoding process.

The flag indicating the HRD parameter type supplied in step S131 and the HRD parameter of the layer supplied in step S133 are encoded in step S125 of FIG. 15.

In step S134, the time HRD parameter type setting section 144 sets the sub HRD parameter type according to the user's instruction. The time HRD parameter type setting section 144 supplies the flag indicating the set sub HRD parameter type to the lossless encoding section 116 and the time layer HRD parameter calculating section 142.

In step S135, the time layer HRD parameter calculating section 142 performs a process of calculating the HRD parameter of the corresponding time layer according to the flag indicating the sub HRD parameter type supplied from the time HRD parameter type setting section 144. The process of calculating the HRD parameter of the time layer will be described later with reference to FIG. 18.

In step S136, the time layer HRD parameter calculating section 142 supplies the HRD parameter of the time layer calculated in step S135 to the lossless encoding section 116 so that the HRD parameter of the time layer is encoded.

The flag indicating the sub HRD parameter type supplied in step S134 and the HRD parameter of the time layer supplied in step S134 are encoded in step S125 of FIG. 15.

In step S137, the time layer HRD parameter calculating section 142 determines whether or not the process has ended on all the time layers. When the process is determined to have ended on all the time layers in step S137, the HRD parameter encoding process ends, and the process returns to step S124 of FIG. 15.

When the process is determined not to have ended on any one of the time layers in step S137, the process returns to step S134, and the subsequent process is repeated.

<Flow of HRD Parameter Calculation Process>

Next, the process of calculating the HRD parameter in step S132 of FIG. 16 will be described with reference to a flowchart of FIG. 17.

Figure 16:
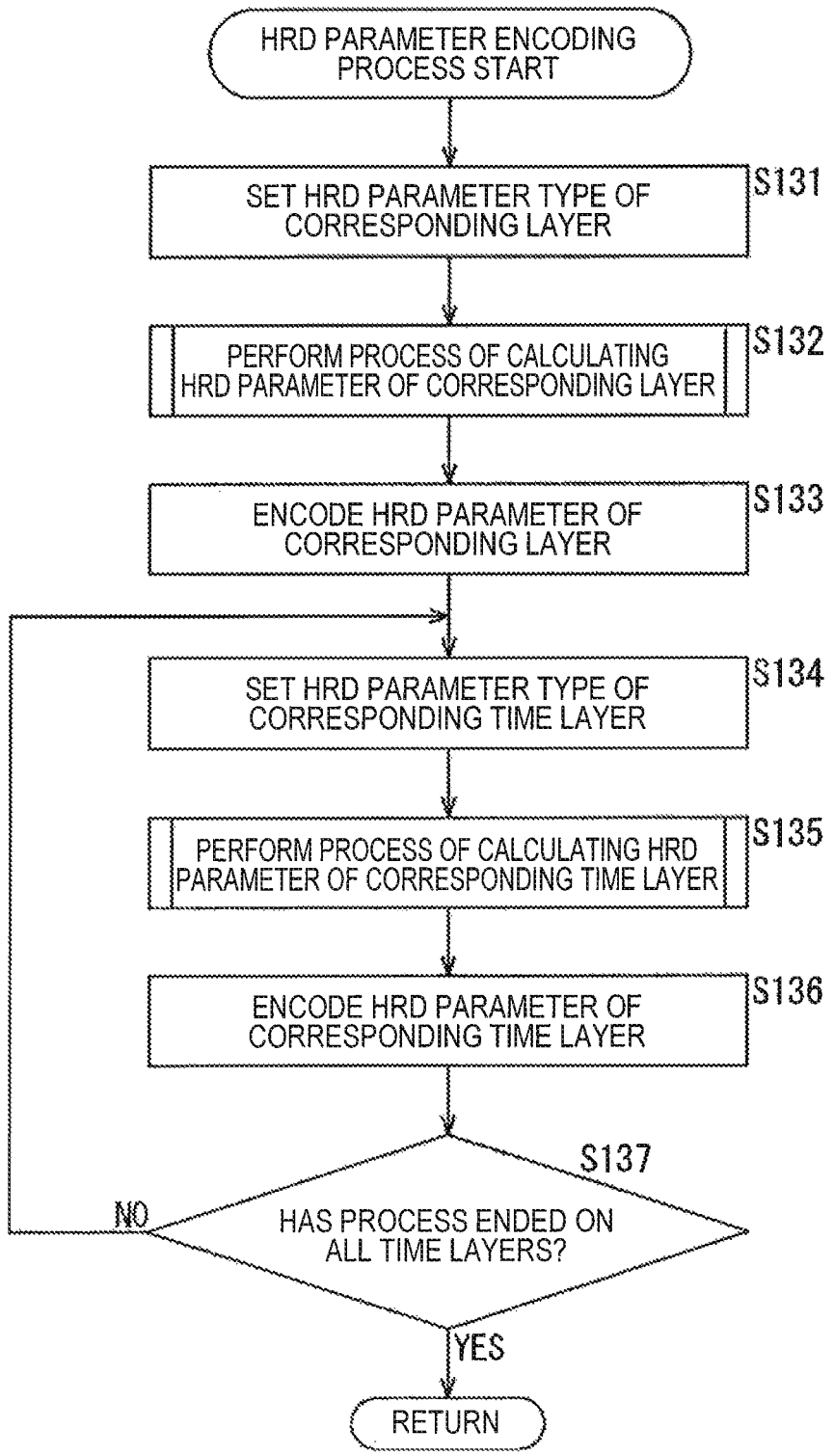
FIG. 16 is a flowchart for describing an HRD parameter encoding process.
Figure 17:
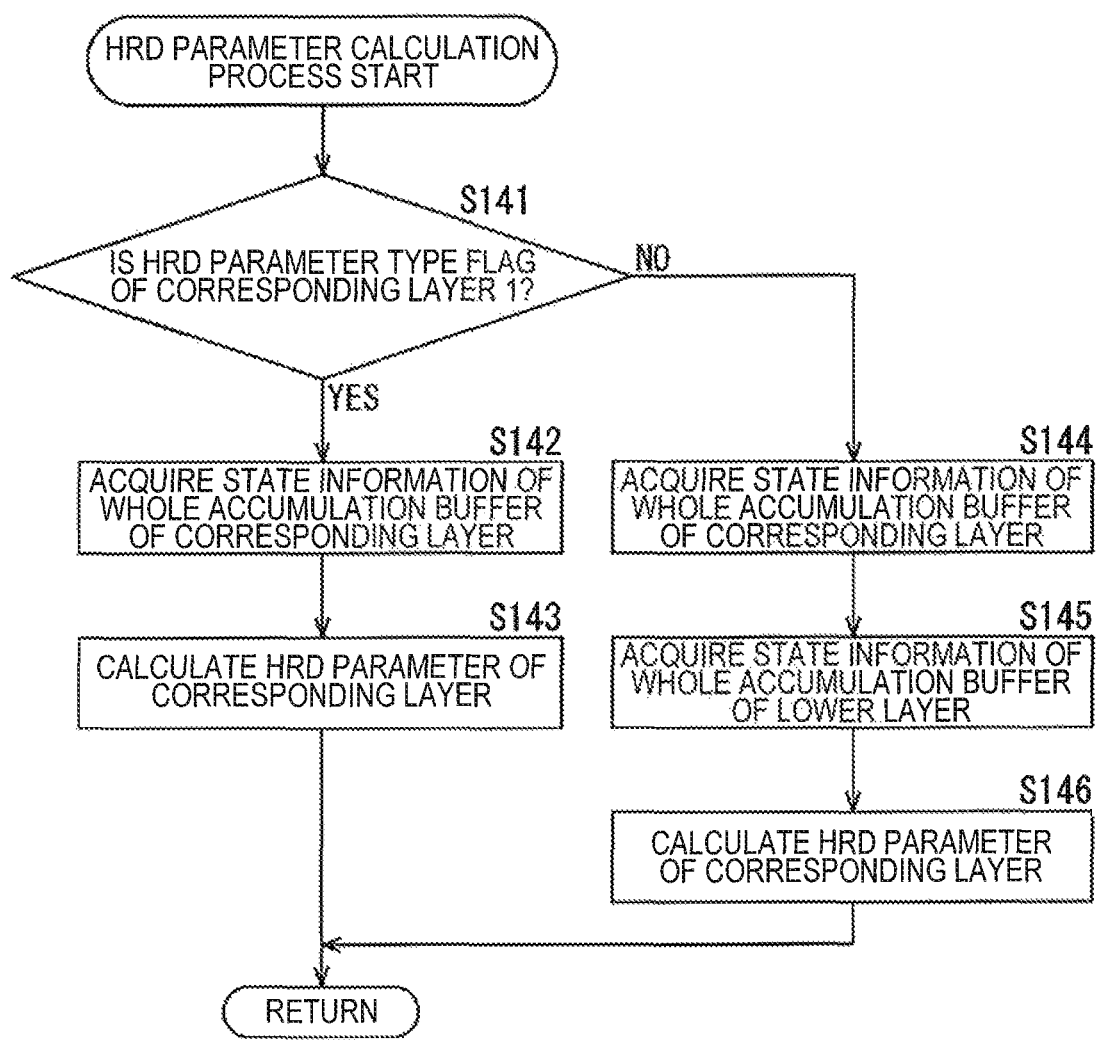
FIG. 17 is a flowchart for describing an HRD parameter calculation process.

The HRD parameter type flag is supplied to the layer HRD parameter calculating section 141 through step S131 of FIG. 16. In step S141, the layer HRD parameter calculating section 141 determines whether or not the HRD parameter type flag supplied from the HRD parameter type setting section 143 is 1.

When the HRD parameter type flag is determined to be 1 in step S141, the process proceeds to step S142.

In step S142, the layer HRD parameter calculating section 141 acquires the information indicating the state of the whole accumulation buffer 132. In step S143, the layer HRD parameter calculating section 141 calculates the HRD parameter of the corresponding layer based on the acquired information indicating the state of the whole accumulation buffer 132.

When the HRD parameter type flag is determined not to be 1 in step S141, the process proceeds to step S144.

In step S144, the layer HRD parameter calculating section 141 acquires the information indicating the state of the whole accumulation buffer 132. In step S145, the layer HRD parameter calculating section 141 acquires the information indicating the state of the accumulation buffer (the lower layer) 117 of the base layer image encoding section 101-1. In step S146, the layer HRD parameter calculating section 141 calculates the HRD parameter of the corresponding layer based on the acquired information.

After step S143 or S146, the HRD parameter calculation process ends, and the process returns to step S132 of FIG. 16.

<Flow of Time Layer HRD Parameter Calculation Process>

Figure 18:
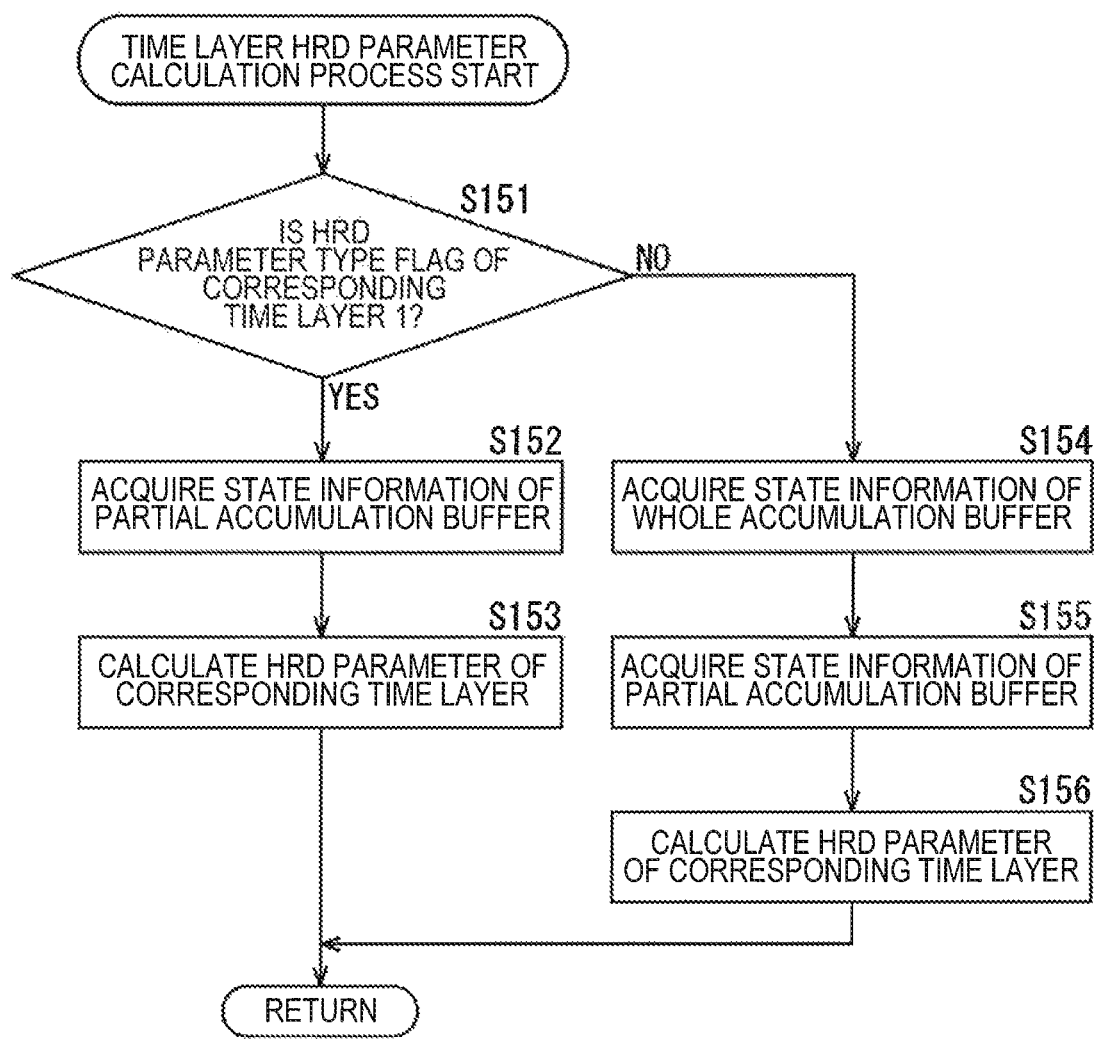
FIG. 18 is a flowchart for describing an HRD parameter of the time layer calculation process.

Next, the process of calculating the HRD parameter of the time layer in step S135 of FIG. 16 will be described with reference to a flowchart of FIG. 18.

The sub HRD parameter type flag is supplied to the time layer HRD parameter calculating section 142 through step S134 of FIG. 16. In step S151, the time layer HRD parameter calculating section 142 determines whether or not the sub HRD parameter type flag supplied from the time HRD parameter type setting section 144 is 1.

When the sub HRD parameter type flag is determined to be 1 in step S151, the process proceeds to step S152.

In step S152, the time layer HRD parameter calculating section 142 acquires the information indicating the state of the accumulation buffer of the corresponding time layer of the partial accumulation buffer 131. In step S153, the time layer HRD parameter calculating section 142 calculates the HRD parameter of the time layer based on the acquired information indicating the state of the partial accumulation buffer 131.

When the sub HRD parameter type flag is determined not to be 1 in step S151, the process proceeds to step S154.

In step S154, the time layer HRD parameter calculating section 142 acquires the information indicating the state of the whole accumulation buffer 132. In step S155, the time layer HRD parameter calculating section 142 acquires the information indicating the state of the accumulation buffer of the corresponding time layer of the partial accumulation buffer 131. In step S156, the time layer HRD parameter calculating section 142 calculates the HRD parameter of the corresponding time layer based on the acquired information.

After step S153 or S156, the time layer HRD parameter calculation process ends, and the process returns to step S135 of FIG. 16.

<Other Flow of HRD Parameter Encoding Process>

Figure 19:
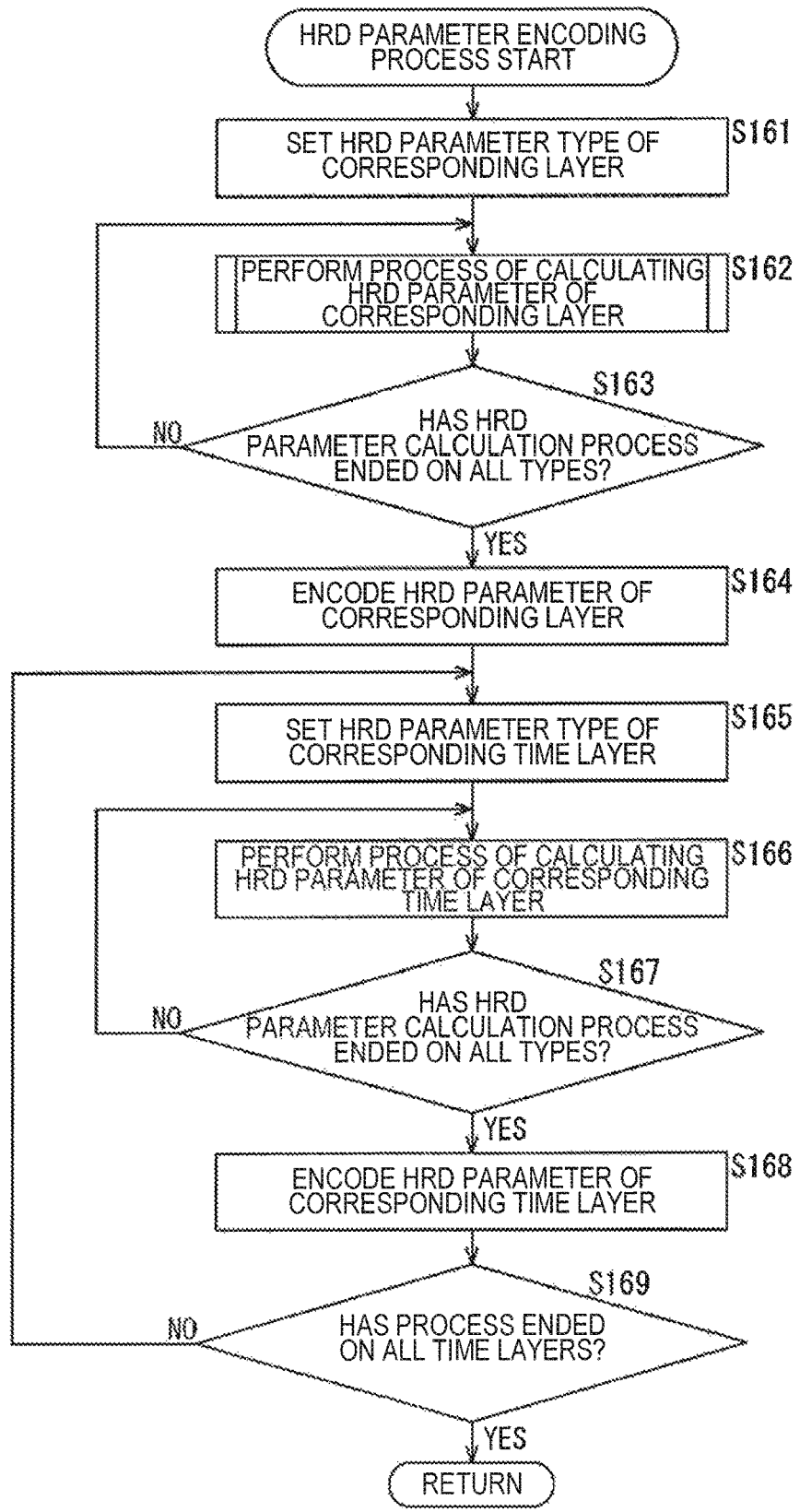
FIG. 19 is a flowchart for describing another example of an HRD parameter encoding process.

Next, the HRD parameter encoding process of step S124 of FIG. 15 will be described with reference to a flowchart of FIG. 19. FIG. 16 illustrates an example of encoding the HRD parameter illustrated in FIGS. 8 and 9.

In step S161, the HRD parameter type setting section 143 sets the HRD parameter type according to the user's instruction. The HRD parameter type setting section 143 supplies the flag indicating the set HRD parameter type to the lossless encoding section 116 and the layer HRD parameter calculating section 141.

In step S162, the layer HRD parameter calculating section 141 performs the process of calculating the HRD parameter of the corresponding layer according to the flag indicating the HRD parameter type supplied from the HRD parameter type setting section 143. Since the process of calculating the HRD parameter is basically the same as the process described with reference to FIG. 17, duplicate description is omitted.

In step S163, the layer HRD parameter calculating section 141 determines whether or not the HRD parameter calculation process has ended on both of type1 and type2. When the HRD parameter calculation process is determined not to have ended on either type in step S163, the process returns to step S162, and the subsequent process is repeated.

Further, when either of type1 and type2 is calculated, the process proceeds to step S163.

When the HRD parameter calculation process is determined to have ended on both type1 and type2 in step S163, the process proceeds to step S164.

In step S164, the layer HRD parameter calculating section 141 supplies the HRD parameter of the corresponding layer calculated in step S162 to the lossless encoding section 116 so that the HRD parameter of the corresponding layer is encoded.

The flag indicating the HRD parameter type supplied in step S161 and the HRD parameter of the layer supplied in step S164 are encoded in step S125 of FIG. 15.

In step S165, the time HRD parameter type setting section 144 sets the sub HRD parameter type according to the user's instruction. The time HRD parameter type setting section 144 supplies the flag indicating the set sub HRD parameter type to the lossless encoding section 116 and the time layer HRD parameter calculating section 142.

In step S166, the time layer HRD parameter calculating section 142 performs the process of calculating the HRD parameter of the corresponding time layer according to the flag indicating the sub HRD parameter type supplied from the time HRD parameter type setting section 144. Since the process of calculating the HRD parameter of the time layer is basically the same as the process described with reference to FIG. 18, duplicate description is omitted.

In step S167, the layer HRD parameter calculating section 141 determines whether or not the HRD parameter calculation process has ended on both of type1 and type2. When the HRD parameter calculation process is determined not to have ended on either type in step S163, the process returns to step S166, and the subsequent process is repeated.

Further, when either of type1 and type2 is calculated, the process proceeds to step S168.

When the HRD parameter calculation process is determined to have ended on both type1 and type2 in step S167, the process proceeds to step S168.

In step S168, the time layer HRD parameter calculating section 142 supplies the HRD parameter of the corresponding time layer calculated in step S166 to the lossless encoding section 116 so that the HRD parameter of the time layer is encoded.

The flag indicating the sub HRD parameter type supplied in step S165 and the HRD parameter of the time layer supplied in step S168 are encoded in step S125 of FIG. 15.

In step S169, the time layer HRD parameter calculating section 142 determines whether or not the process has ended on all the time layers. When the process is determined to have ended on all the time layers in step S169, the HRD parameter encoding process ends, and the process returns to step S124 of FIG. 15.

When the process is determined not to have ended on any one of the time layers in step S169, the process returns to step S165, and the subsequent process is repeated.

As described above, the HRD parameter type flag indicating whether the HRD parameter is the parameter for performing the decoding process of only a corresponding layer or the parameter for performing the decoding process of the corresponding layer and the lower layer is set at the encoding side. Thus, it is possible to perform a decoding process at a proper timing.

<2. Second Embodiment>

<Scalable Decoding Device>

Figure 20:
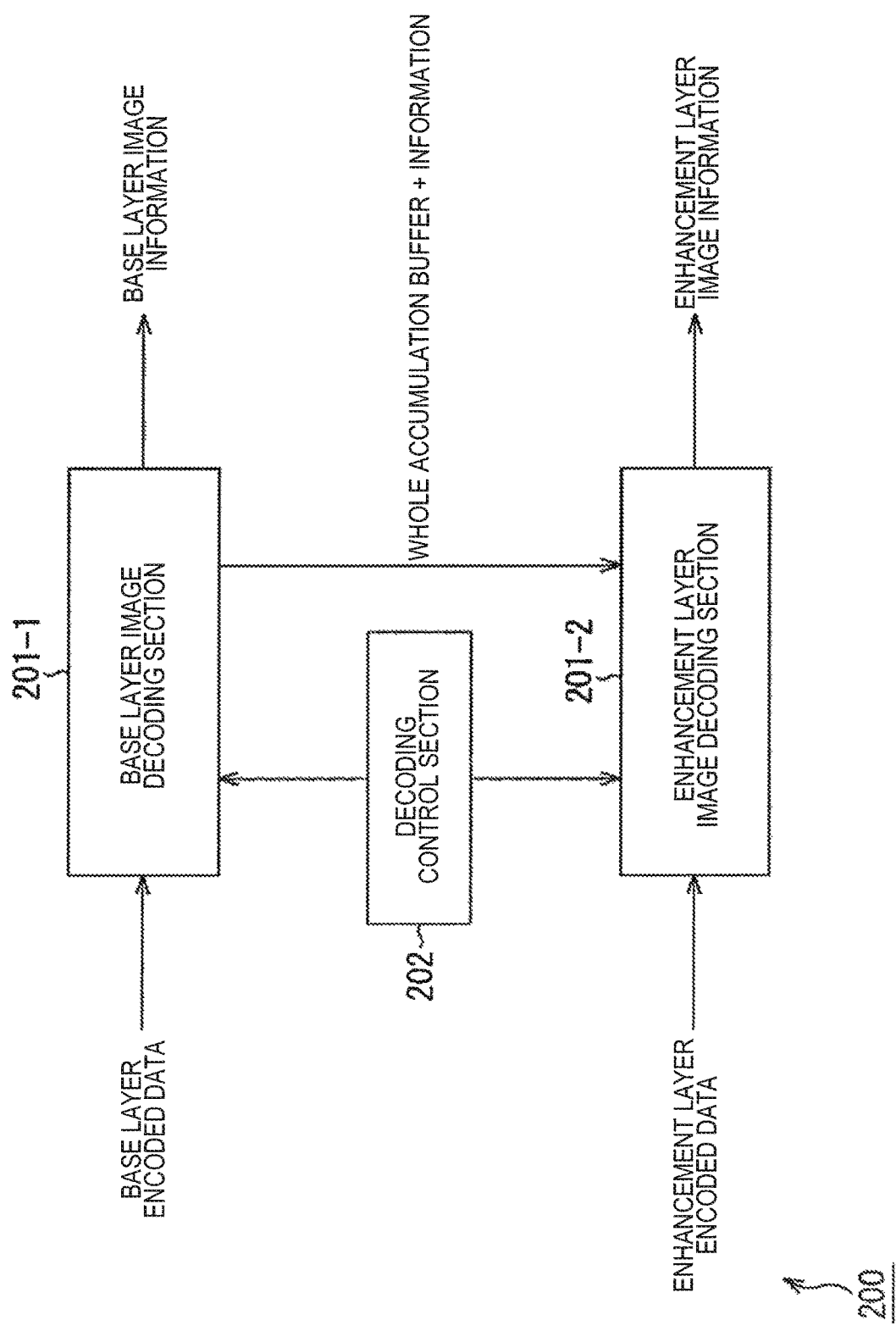
FIG. 20 is a block diagram illustrating an example of a main configuration of a scalable decoding device.

Next, decoding of the encoded data (bitstream) that has been subjected to the scalable video coding as described above will be described. FIG. 20 is a block diagram illustrating an example of a main configuration of a scalable decoding device corresponding to the scalable encoding device 100 of FIG. 10. For example, a scalable decoding device 200 illustrated in FIG. 20 performs scalable decoding on the encoded data obtained by performing the scalable encoding on the image data through the scalable encoding device 100 according to a method corresponding to the encoding method.

The scalable decoding device 200 is configured to include a base layer image decoding section 201-1, an enhancement layer image decoding section 201-2, and a decoding control section 202.

The base layer image decoding section 201-1 is an image decoding section corresponding to the base layer image encoding section 101-1 of FIG. 10, and acquires, for example, the base layer encoded data obtained by encoding the base layer image information through the base layer image encoding section 101-1. The base layer image decoding section 201-1 decodes the base layer encoded data without referring to other layers, reconstructs the base layer image information, and outputs the base layer image information.

The enhancement layer image decoding section 201-2 is an image decoding section corresponding to the enhancement layer image encoding section 101-2, and acquires, for example, the enhancement layer encoded data obtained by encoding the enhancement layer image information through the enhancement layer image encoding section 101-2. The enhancement layer image decoding section 201-2 decodes the enhancement layer encoded data. At this time, the enhancement layer image decoding section 201-2 performs the inter-layer prediction with reference to information related to decoding of the base layer as necessary.

Further, the flag indicating the HRD parameter type and the HRD parameter are added to each piece of encoded data (bitstream) and transmitted. The enhancement layer image decoding section 201-2 receives the flag indicating the HRD parameter type, acquires the state information of the accumulation buffer according to the received flag indicating the HRD parameter type, and monitors the accumulation buffer.

When the flag indicating the HRD parameter type is 1, the enhancement layer image decoding section 201-2 recognizes the HRD parameter as a parameter used to decode only a corresponding layer, acquires the state information of its own accumulation buffer, and monitors the accumulation buffer. When the flag indicating the HRD parameter type is 0, the enhancement layer image decoding section 201-2 recognizes the HRD parameter as a parameter used to perform a decoding process of a corresponding layer and a lower layer, acquires the state information of the accumulation buffer of the base layer image decoding section 201-1, and monitors the accumulation buffer. This process is performed on a layer and a sublayer (time layer). In the base layer image decoding section 201-1, this process is performed on only a sublayer.

Through the decoding, the enhancement layer image decoding section 201-2 decodes the encoded data of the enhancement layer, reconstructs the enhancement layer image information, and outputs the enhancement layer image information.

The base layer image decoding section 201-1 and the enhancement layer image decoding section 201-2 are appropriately referred to collectively as a "layer image decoding section 201."

The decoding control section 202 controls the decoding process of the layer image decoding sections 201, for example, in view of the reference relation of the layer image decoding sections 201.

In the example of FIG. 20, one enhancement layer image decoding section 201-2 is illustrated, but when there is an upper layer, enhancement layer image decoding sections 201-3, 4, . . . that encode the upper layer are provided for each of the upper layers.

<Example of Configuration of Layer Image Decoding Section>

Figure 21:
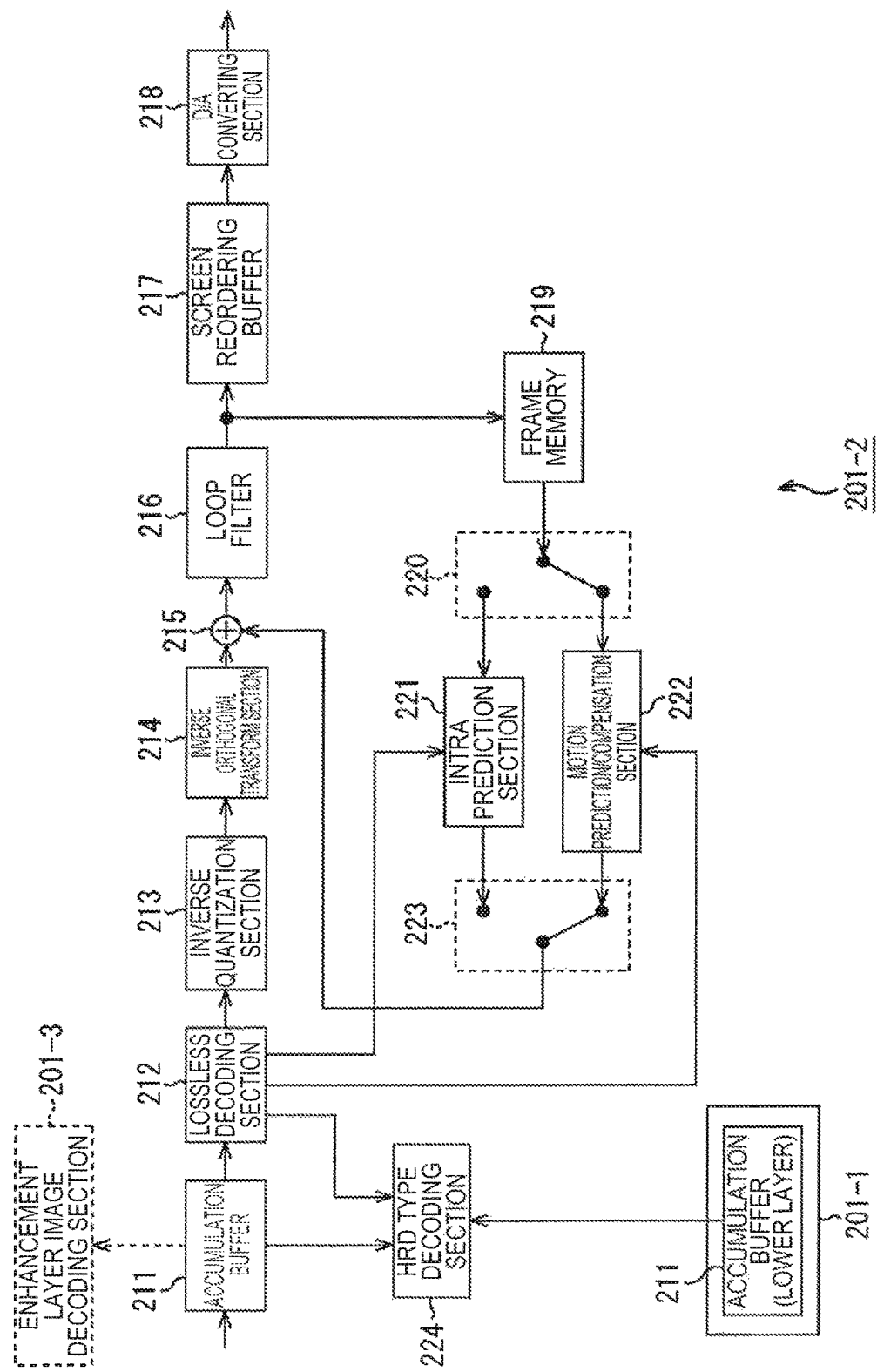
FIG. 21 is a block diagram illustrating an example of a main configuration of an enhancement layer image decoding section.

FIG. 21 is a block diagram illustrating an example of a main configuration of the enhancement layer image decoding section 201-2 of FIG. 20. The base layer image decoding section 201-1 of FIG. 20 has basically the same configuration as the enhancement layer image decoding section 201-2 of FIG. 21 except that a type of an image serving as a target is different. For the sake of description, in the example of FIG. 21, a configuration of the enhancement layer image decoding section 201-2 will be described as an example.

As illustrated in FIG. 21, the enhancement layer image decoding section 201-2 includes an accumulation buffer 211, a lossless decoding section 212, an inverse quantization section 213, an inverse orthogonal transform section 214, an operation section 215, a loop filter 216, a screen reordering buffer 217, and a D/A converting section 218. The enhancement layer image decoding section 201-2 further includes a frame memory 219, a selecting section 220, an intra prediction section 221, a motion prediction/compensation section 222, and a selecting section 223. The enhancement layer image decoding section 201-2 further includes an HRD type decoding section 224.

The accumulation buffer 211 is a receiving section that receives the transmitted enhancement layer encoded data. The accumulation buffer 211 receives and accumulates the transmitted enhancement layer encoded data, and supplies the encoded data to the lossless decoding section 212 at a certain timing. Information necessary for decoding of the prediction mode information or the like is added to the enhancement layer encoded data. The flag indicating the HRD parameter type and the HRD parameter are added to the enhancement layer encoded data as well.

When there is a request from the HRD type decoding section 224, the accumulation buffer 211 supplies information indicating a state of the accumulation buffer 211. Further, for example, when there is an enhancement layer image decoding section 201-3 of an upper layer as indicated by a dotted line, and there is a request from its HRD type decoding section 224, the accumulation buffer 211 supplies the information indicating the state of the accumulation buffer 211.

The lossless decoding section 212 decodes the information that has been encoded by the lossless encoding section 116 and supplied from the accumulation buffer 211 according to a scheme corresponding to the encoding scheme of the lossless encoding section 116. The lossless decoding section 212 supplies quantized coefficient data of a differential image obtained by the decoding to the inverse quantization section 213.

Further, the lossless decoding section 212 appropriately extracts and acquires the NAL unit including the video parameter set (VPS), the sequence parameter set (SPS), the picture parameter set (PPS), and the like which are included in the enhancement layer encoded data. The lossless decoding section 212 extracts the information related to the optimal prediction mode from the information, determines which of the intra prediction mode and the inter prediction mode has been selected as the optimal prediction mode based on the information, and supplies the information related to the optimal prediction mode to one of the intra prediction section 221 and the motion prediction/compensation section 222 that corresponds to the mode determined to have been selected.

In other words, for example, in the enhancement layer image decoding section 201-2, when the intra prediction mode is selected as the optimal prediction mode, the information related to the optimal prediction mode is supplied to the intra prediction section 221. Further, for example, in the enhancement layer image decoding section 201-2, when the inter prediction mode is selected as the optimal prediction mode, the information related to the optimal prediction mode is supplied to the motion prediction/compensation section 222.

Further, the lossless decoding section 212 extracts information necessary for inverse quantization such as the quantization matrix or the quantization parameter from the NAL unit, and supplies the extracted information to the inverse quantization section 213. Further, the lossless decoding section 212 extracts the flag indicating the HRD parameter type and the HRD parameter, for example, from the VPS, and supplies the extracted flag indicating the HRD parameter type and the HRD parameter to the HRD type decoding section 224.

The inverse quantization section 213 inversely quantizes the quantized coefficient data obtained through the decoding performed by the lossless decoding section 212 according to a scheme corresponding to the quantization scheme of the quantization section 115. The inverse quantization section 213 is the same processing section as the inverse quantization section 118. In other words, the description of the inverse quantization section 213 can be applied to the inverse quantization section 118 as well. Here, it is necessary to appropriately change and read a data input/output destination or the like according to a device. The inverse quantization section 213 supplies the obtained coefficient data to the inverse orthogonal transform section 214.

The inverse orthogonal transform section 214 performs the inverse orthogonal transform on the coefficient data supplied from the inverse quantization section 213 according to a scheme corresponding to the orthogonal transform scheme of the orthogonal transform section 114. The inverse orthogonal transform section 214 is the same processing section as the inverse orthogonal transform section 119. In other words, the description of the inverse orthogonal transform section 214 can be applied to the inverse orthogonal transform section 119 as well. Here, it is necessary to appropriately change and read a data input/output destination or the like according to a device The inverse orthogonal transform section 214 obtains decoded residual data corresponding to residual data that is not subjected to the orthogonal transform in the orthogonal transform section 114 through the inverse orthogonal transform process. The decoded residual data obtained through the inverse orthogonal transform is supplied to the operation section 215. Further, the predictive image is supplied from the intra prediction section 221 or the motion prediction/compensation section 222 to the operation section 215 via the selecting section 223.

The operation section 215 adds the decoded residual data and the predictive image, and obtains decoded image data corresponding to the image data from which the predictive image is not subtracted by the operation section 113. The operation section 215 supplies the decoded image data to the loop filter 216.

The loop filter 216 appropriately performs the filter process such as the deblock filter, the adaptive offset filter, or the adaptive loop filter on the supplied decoded image, and supplies the resultant image to the screen reordering buffer 217 and the frame memory 219. For example, the loop filter 216 removes the block distortion of the decoded image by performing the deblock filter process on the decoded image. Further, for example, the loop filter 216 improves the image quality by performing the loop filter process on the deblock filter process result (the decoded image from which the block distortion has been removed) using the Wiener filter. The loop filter 216 is the same processing section as the loop filter 121.

Further, the decoded image output from the operation section 215 can be supplied to the screen reordering buffer 217 or the frame memory 219 without intervention of the loop filter 216. In other words, part or all of the filter process performed by the loop filter 216 can be omitted.

The screen reordering buffer 217 reorders the decoded image. In other words, the order of the frames reordered in the encoding order by the screen reordering buffer 112 is reordered in the original display order. The D/A converting section 218 performs D/A conversion on the image supplied from the screen reordering buffer 217, and outputs the converted image to be displayed on a display (not illustrated).

The frame memory 219 stores the supplied decoded image, and supplies the stored decoded image to the selecting section 220 as the reference image at a certain timing or based on an external request, for example, from the intra prediction section 221, the motion prediction/compensation section 222, or the like.

The frame memory 219 sets the stored decoded image as information related to decoding of the enhancement layer, and supplies the information to the enhancement layer image decoding section 201-2 of an upper layer.

The selecting section 220 selects the supply destination of the reference image supplied from the frame memory 219. When an image encoded by the intra coding is decoded, the selecting section 220 supplies the reference image supplied from the frame memory 219 to the intra prediction section 221. Further, when an image encoded by the inter coding is decoded, the selecting section 220 supplies the reference image supplied from the frame memory 219 to the motion prediction/compensation section 222.

For example, the information indicating the intra prediction mode obtained by decoding the header information is appropriately supplied from the lossless decoding section 212 to the intra prediction section 221. The intra prediction section 221 generates the predictive image by performing the intra prediction using the reference image acquired from the frame memory 219 in the intra prediction mode used in the intra prediction section 124. The intra prediction section 221 supplies the generated predictive image to the selecting section 223.

The motion prediction/compensation section 222 acquires information (optimal prediction mode information, reference image information, and the like) obtained by decoding the header information from the lossless decoding section 212.

The motion prediction/compensation section 222 generates the predictive image by performing the inter prediction using the reference image acquired from the frame memory 219 in the inter prediction mode indicated by the optimal prediction mode information acquired from the lossless decoding section 212. Although not illustrated, in the motion prediction/compensation section 222, the reference image supplied from the frame memory 219 of the base layer image decoding section 201-1 is also referred to as necessary.

The selecting section 223 supplies the predictive image supplied from the intra prediction section 221 or the predictive image supplied from the motion prediction/compensation section 222 to the operation section 215. Then, the operation section 215 adds the predictive image generated using the motion vector to the decoded residual data (the differential image information) supplied from the inverse orthogonal transform section 214 to decode the original image.

The HRD type decoding section 224 acquires the information indicating the accumulation state from the accumulation buffer 211 or the accumulation buffer (the lower layer) 211 of the base layer image decoding section 201-1 according to the flag indicating the HRD parameter type supplied from the lossless decoding section 212. The HRD type decoding section 224 monitors the accumulation buffer 211 based on the acquired information according to the HRD parameter corresponding to the flag indicating the HRD parameter type.

<Example of Configuration of Accumulation Buffer and HRD Type Decoding Section>

Figure 22:
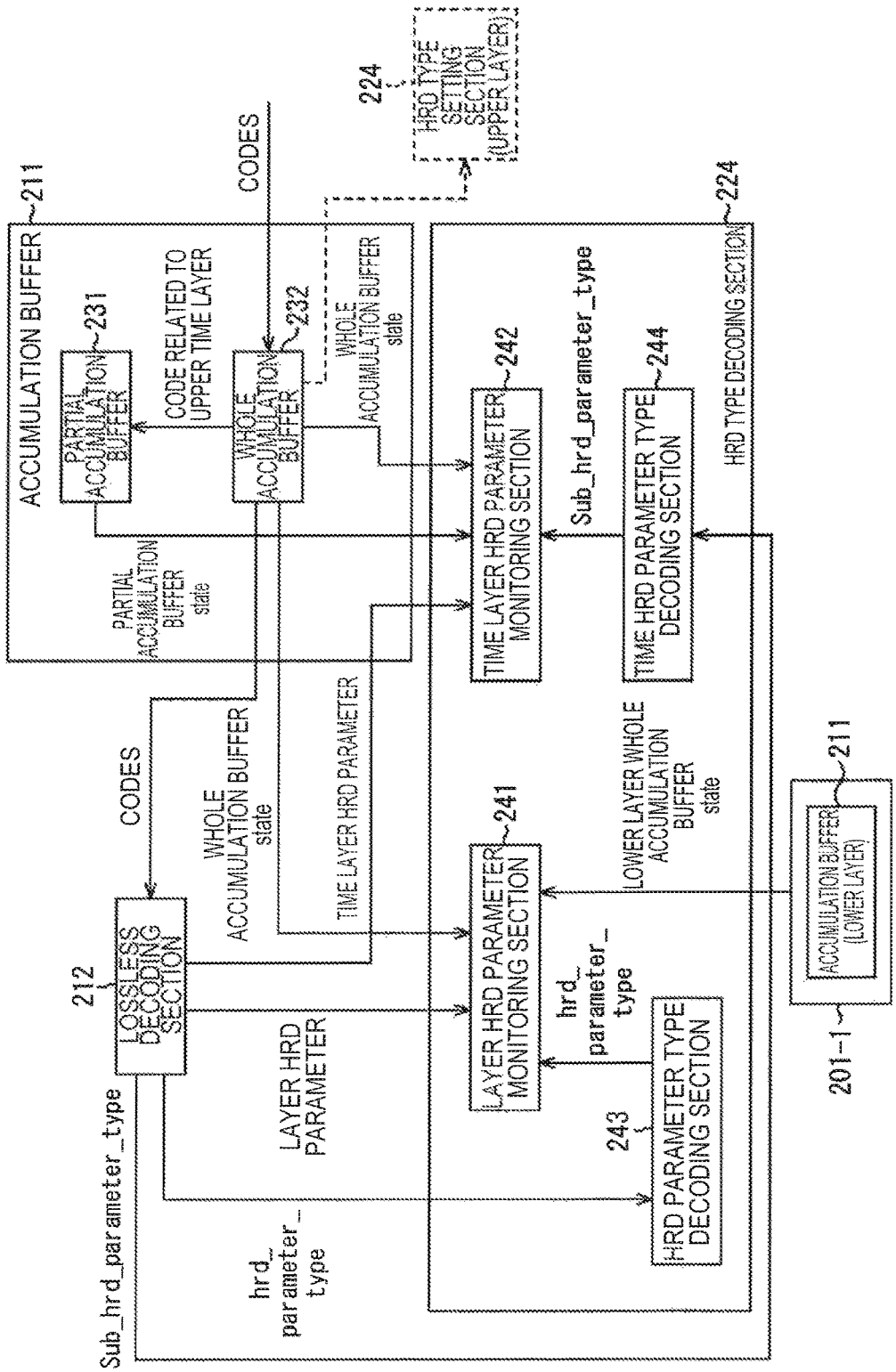
FIG. 22 is a block diagram illustrating an example of a main configuration of an accumulation buffer and an HRD type decoding section.

FIG. 22 is a block diagram illustrating an example of a configuration of the accumulation buffer and the HRD type decoding section of FIG. 21.

In an example of FIG. 22, the accumulation buffer 211 is configured to include a partial accumulation buffer 231 and a whole accumulation buffer 232.

The HRD type decoding section 224 is configured to include a layer HRD parameter monitoring section 241, a time layer HRD parameter monitoring section 242, a HRD parameter type decoding section 243, and a time HRD parameter type decoding section 244.

The partial accumulation buffer 231 is configured with accumulation buffers that accumulate encoded data related to each upper time layer among the encoded data (codes) accumulated in the whole accumulation buffer 232. The information indicating the state of each accumulation buffer is supplied to the time layer HRD parameter monitoring section 242 on request.

The whole accumulation buffer 232 accumulates the encoded data (codes) encoded by the enhancement layer image encoding section 101-2. The information indicating the state of the whole accumulation buffer of the whole accumulation buffer 232 is supplied to the layer HRD parameter monitoring section 241 and the time layer HRD parameter monitoring section 242 on request. Further, there are cases in which there is an enhancement layer image decoding section 201-3 of an upper layer as indicated by a dotted line. In this case, when there is a request from the HRD type decoding section (upper layer) 224 of the enhancement layer image decoding section 201-3, the information indicating the state of the whole accumulation buffer of the whole accumulation buffer 232 is also supplied to the HRD type decoding section (upper layer) 224.

The layer HRD parameter monitoring section 241 receives the HRD parameter supplied from the lossless decoding section 212, and acquires the HRD parameter corresponding to the flag indicating the HRD parameter type supplied from the HRD parameter type decoding section 243. The layer HRD parameter monitoring section 241 monitors the accumulation buffer 211 based on the acquired HRD parameter.

In other words, the layer HRD parameter monitoring section 241 acquires information indicating the state of the whole accumulation buffer 232 and information indicating the state of the accumulation buffer (the lower layer) 211 of the base layer image decoding section 201-1 according to the flag indicating the HRD parameter type supplied from the HRD parameter type decoding section 243.

In the case of the HRD parameter type in which the flag indicates 1, the information indicating the state of the whole accumulation buffer 232 is acquired. In the case of the HRD parameter type in which the flag indicates 0, the information indicating the state of the whole accumulation buffer 232 and the information indicating the state of the accumulation buffer (the lower layer) 211 of the base layer image decoding section 201-1 are acquired. Practically, information is acquired from the whole accumulation buffer 232 of the accumulation buffer of the base layer image decoding section 201-1.

The time layer HRD parameter monitoring section 242 receives the time layer HRD parameter supplied from the lossless decoding section 212, and acquires the time layer HRD parameter corresponding to the flag indicating the sub HRD parameter type supplied from the time HRD parameter type decoding section 244. The layer HRD parameter monitoring section 241 monitors the accumulation buffer 211 based on the acquired time layer HRD parameter.

In other words, the time layer HRD parameter monitoring section 242 acquires the information indicating the state of the whole accumulation buffer 232 and information indicating the state of the accumulation buffer of the corresponding time layer of the partial accumulation buffer 231 according to the flag indicating the sub HRD parameter type supplied from the time HRD parameter type decoding section 244.

When the flag indicating the sub HRD parameter type is 1, the information indicating the state of the accumulation buffer of the corresponding time layer of the partial accumulation buffer 231 is acquired. When the flag indicating the sub HRD parameter type is 0, the information indicating the state of the whole accumulation buffer 232 and the information indicating the state of the accumulation buffer of the corresponding time layer of the partial accumulation buffer 231 are acquired.

The HRD parameter type decoding section 243 receives the HRD parameter type flag supplied from the lossless decoding section 212. Then, the HRD parameter type decoding section 243 selects a flag indicating an HRD parameter type corresponding to a layer configuration of an actual stream or a configuration or a function of a device among the received flags, and supplies the selected flag to the layer HRD parameter monitoring section 241.

The time HRD parameter type decoding section 244 receives the sub HRD parameter type flag supplied from the lossless decoding section 212. Then, the time HRD parameter type decoding section 244 selects a flag indicating a sub HRD parameter type corresponding to a layer configuration of an actual stream or a configuration or a function of a device among the received flags, and supplies the selected flag to the layer HRD parameter monitoring section 241.

In the case of the HRD parameter described above with reference to FIGS. 8 and 9, two types (a type of only a corresponding layer and a type of a corresponding layer and a lower layer) are described, and thus any one type can be selected by a configuration or a function of an actual stream or device. On the other hand, in the case of the HRD parameter described above with reference to FIG. 7, only one type is described, and thus the HRD parameter is ignored when a type of a configuration or a function of an actual stream or device is different from a described type.

<Flow of Decoding Process>

Next, the flow of the process performed by the scalable decoding device 200 will be described. First, an example of the flow of the decoding process will be described with reference to a flowchart of FIG. 23.

When the decoding process starts, in step S201, the decoding control section 202 of the scalable decoding device 200 decides a layer of a processing target, for example, in view of the reference relation of an image.

In step S202, the base layer image decoding section 201-1 performs a layer decoding process under control of the decoding control section 202. The layer decoding process will be described later with reference to FIG. 24. When the process of step S202 ends, the process proceeds to step S203.

In step S203, the decoding control section 202 determines whether or not all the main layers have been processed. When it is determined that there is a non-processed main layer, the process proceeds to step S204.

In step S204, the decoding control section 202 sets a next non-processed main layer as a processing target (current main layer). When the process of step S204 ends, the process returns to step S202. In step S202, the enhancement layer image decoding section 201-2 performs the layer decoding process under control of the decoding control section 202. The process of steps S202 to S204 is repeatedly performed to encode the main layers as described above. The process of step S202 may be processed in parallel by a plurality of layer image decoding sections 201 having no reference relation.

Then, when all the main layers are determined to have been processed in step S203, the decoding process ends.

<Flow of Layer Decoding Process>

Next, an example of the flow of the layer decoding process performed in step S202 of FIG. 23 will be described with reference to a flowchart of FIG. 24. An example of FIG. 24 will be described in connection with an example of the enhancement layer image decoding section 201-2.

When the layer decoding process starts, in step S211, the accumulation buffer 211 of the enhancement layer image decoding section 201-2 accumulates the bitstreams of the enhancement layer transmitted from the encoding side.

In step S212, the lossless decoding section 212 decodes the bitstream (the encoded differential image information) of the enhancement layer supplied from the accumulation buffer 211. In other words, the I picture, the P picture, and the B picture encoded by the lossless encoding section 116 are decoded. At this time, various kinds of information other than the differential image information included in the bitstream, such as the header information, are also decoded. The flag indicating the HRD parameter type supplied from the lossless decoding section 212 and the HRD parameter are supplied to the HRD type decoding section 224.

In step S213, the HRD type decoding section 224 performs an HRD parameter decoding process. The HRD parameter decoding process will be described later with reference to FIG. 26.

The HRD parameter is decoded in step S213, and the accumulation buffer 211 is monitored based on the decoded HRD parameter so that no overflow or underflow occurs.

In step S214, the inverse quantization section 213 inversely quantizes the quantized coefficients obtained in the process of step S212.

In step S215, the inverse orthogonal transform section 214 performs the inverse orthogonal transform on a current block (a current TU).

In step S216, the intra prediction section 221 or the motion prediction/compensation section 222 performs the prediction process, and generates the predictive image. In other words, the prediction process is performed in the prediction mode that is determined to have been applied at the time of encoding in the lossless decoding section 212. More specifically, for example, when the intra prediction is applied at the time of encoding, the intra prediction section 221 generates the predictive image in the intra prediction mode recognized to be optimal at the time of encoding. Further, for example, when the inter prediction is applied at the time of encoding, the motion prediction/compensation section 222 generates the predictive image in the inter prediction mode recognized to be optimal at the time of encoding.

In step S217, the operation section 215 adds the predictive image generated in step S216 to the differential image information generated by the inverse orthogonal transform process of step S215. As a result, the original image is decoded.

In step S218, the loop filter 216 appropriately performs the loop filter process on the decoded image obtained in step S217.

In step S219, the screen reordering buffer 217 reorders the image that has been subjected to the filter process in step S218. In other words, the order of the frames reordered for encoding through the screen reordering buffer 112 is reordered in the original display order.

In step S220, the D/A converting section 218 performs D/A conversion on the image in which the order of the frames is reordered in step S219. The image is output to a display (not illustrated), and the image is displayed.

In step S221, the frame memory 219 stores the image that has been subjected to the loop filter process in step S218.

Figure 23:
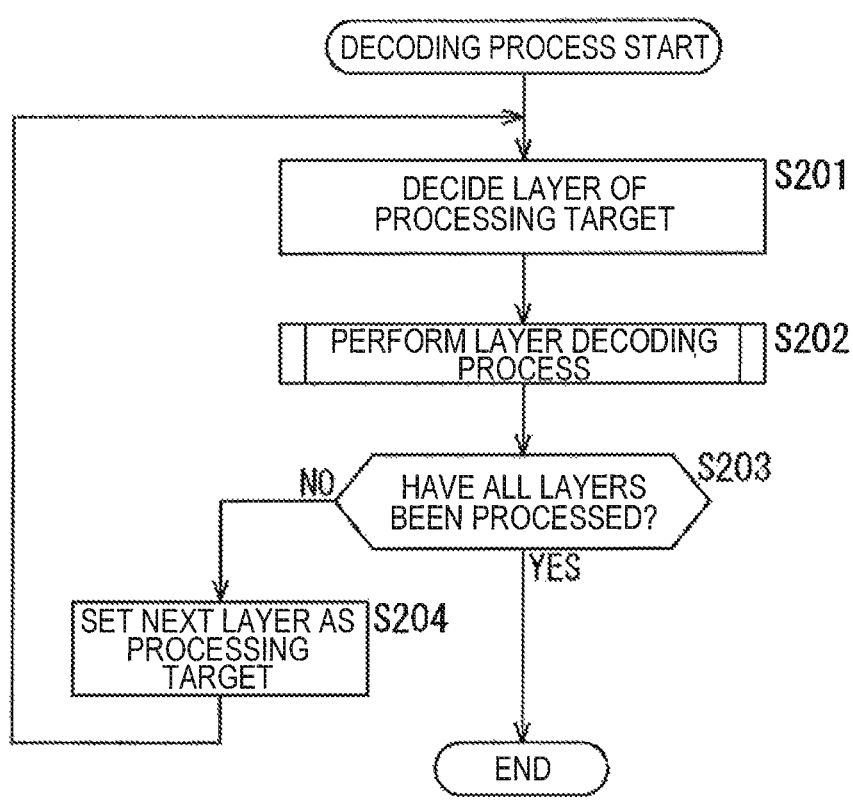
FIG. 23 is a flowchart for describing an example of a flow of a decoding process.
Figure 24:
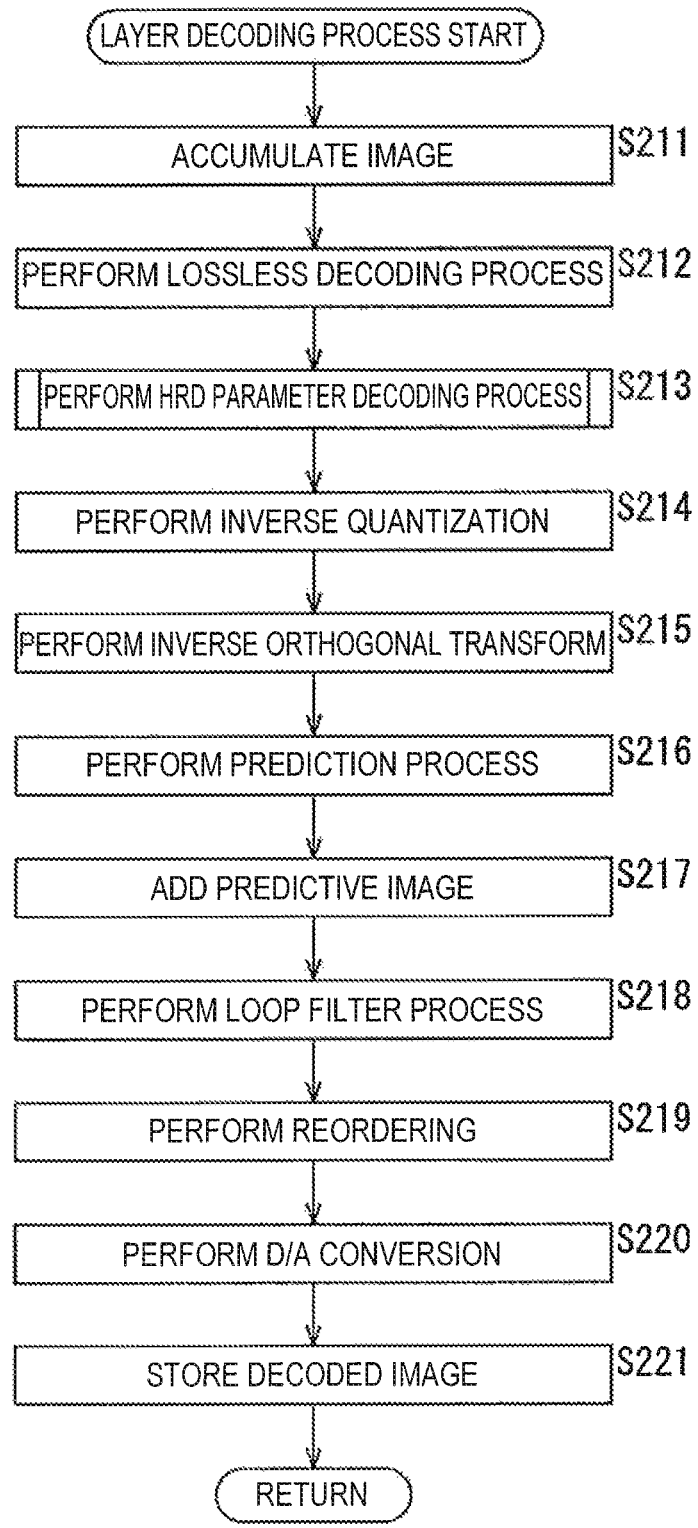
FIG. 24 is a flowchart for describing an example of a flow of a layer decoding process.

When the process of step S221 ends, the base layer decoding process ends, and the process returns to FIG. 23.

<Flow of HRD Parameter Decoding Process>

Figure 25:
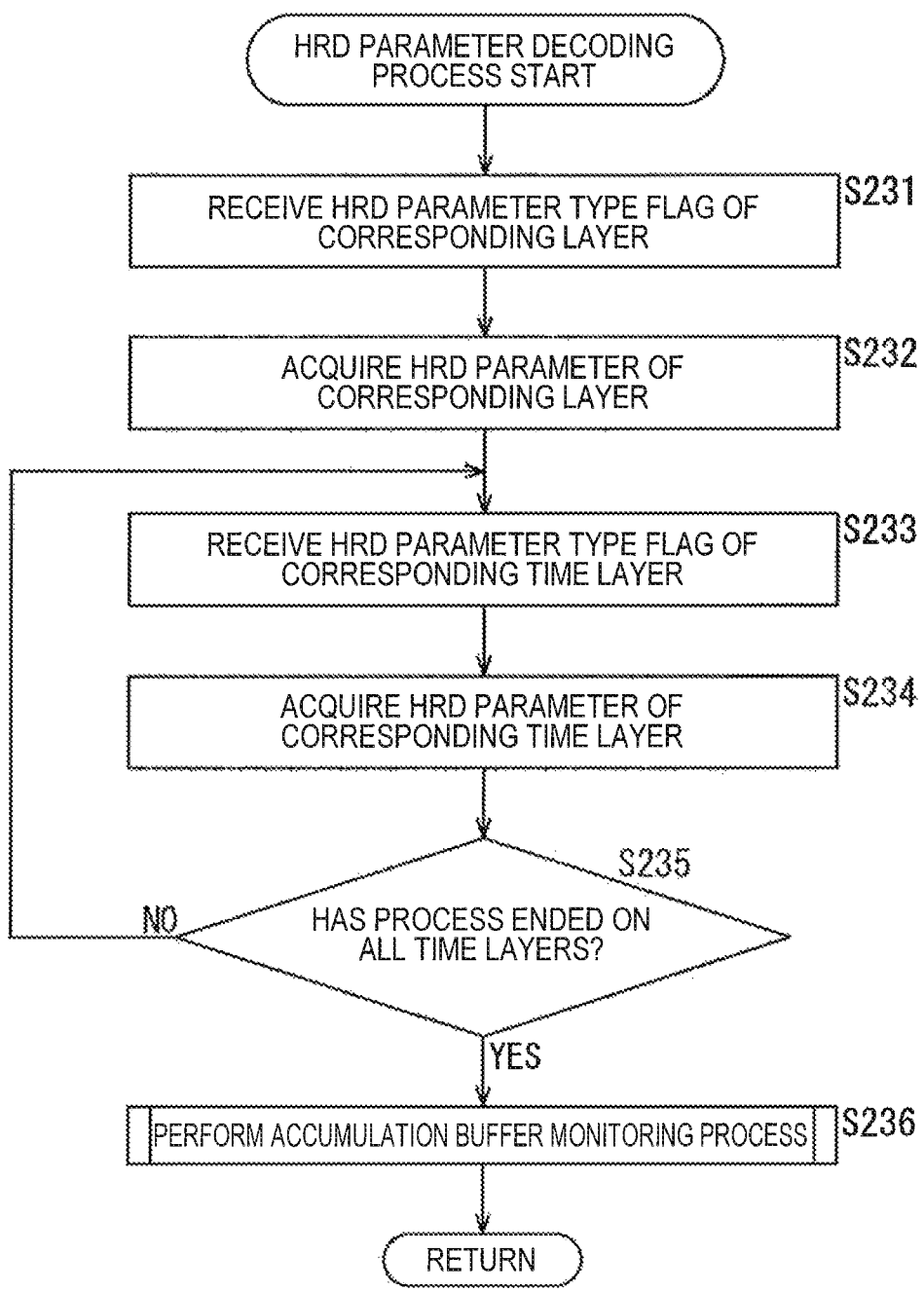
FIG. 25 is a flowchart for describing another example of a flow of an HRD parameter decoding process.

Next, an example of the flow of the HRD parameter decoding process performed in step S213 of FIG. 24 will be described with reference to a flowchart of FIG. 25.

The HRD parameter type decoding section 243 receives the flag indicating the HRD parameter type of the corresponding layer in step S231. Then, the HRD parameter type decoding section 243 supplies, for example, a flag indicating an HRD parameter type corresponding to a layer configuration of an actual stream among the received flags to the layer HRD parameter monitoring section 241.

In step S232, the layer HRD parameter monitoring section 241 receives the HRD parameter supplied from the lossless decoding section 212, and acquires the HRD parameter corresponding to the flag indicating the HRD parameter type supplied from the HRD parameter type decoding section 243.

In step S233, the time HRD parameter type decoding section 244 receives the flag indicating the HRD parameter type supplied from the lossless decoding section 212. Then, the time HRD parameter type decoding section 244 supplies, for example, a flag indicating a sub HRD parameter type corresponding to a layer configuration of an actual stream among the received flags to the layer HRD parameter monitoring section 241.

In step S234, the time layer HRD parameter monitoring section 242 receives the time layer HRD parameter supplied from the lossless decoding section 212, and acquires the time layer HRD parameter corresponding to the sub HRD parameter type flag supplied from the time HRD parameter type decoding section 244.

In step S235, the time layer HRD parameter monitoring section 242 determines whether or not the process has ended on all the time layers. When the process is determined not to have ended on any one of the time layers in step S235, the process returns to step S233, and the subsequent process is repeated.

When the process is determined to have ended on all the time layers in step S235, the process proceeds to step S236. In step S236, the layer HRD parameter monitoring section 241 and the time layer HRD parameter monitoring section 242 perform an accumulation buffer monitoring process which will be described below.

<Flow of Accumulation Buffer Monitoring Process>

Figure 26:
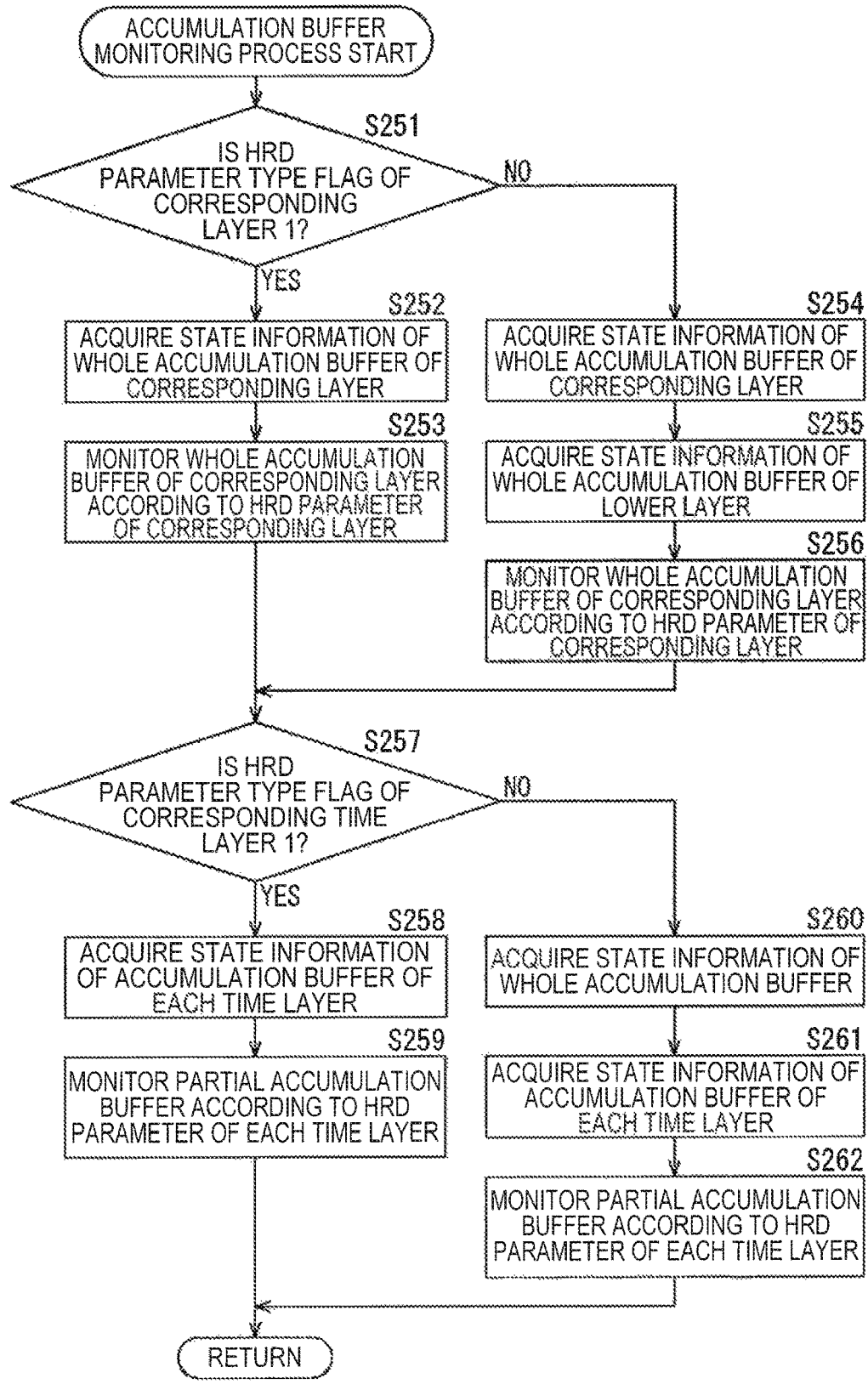
FIG. 26 is a flowchart for describing another example of a flow of an accumulation buffer monitoring process.

Next, the accumulation buffer monitoring process will be described with reference to a flowchart of FIG. 26. The accumulation buffer monitoring process is an example using the HRD parameter type flag according to the present technology, and the present technology is not limited to this example. For the sake of description, a timing at which this process is performed is described as being within the HRD parameter decoding process, but the present technology is not limited to this example, and this process may be performed, for example, at any timing within the layer decoding process of FIG. 24.

In step S251, the layer HRD parameter monitoring section 241 determines whether or not the flag indicating the HRD parameter type of the corresponding layer is 1. When the flag indicating the HRD parameter type of the corresponding layer is determined to be 1 in step S251, the process proceeds to step S252.

In step S252, the layer HRD parameter monitoring section 241 acquires the information indicating the state of the whole accumulation buffer 232, and in step S253, the layer HRD parameter monitoring section 241 monitors the whole accumulation buffer 232 of the corresponding layer according to the HRD parameter of the corresponding layer using the acquired information.

When the flag indicating the HRD parameter type of the corresponding layer is determined to be 0 in step S251, the process proceeds to step S254.

In step S254, the layer HRD parameter monitoring section 241 acquires the information indicating the state of the whole accumulation buffer 232, and in step S255, the layer HRD parameter monitoring section 241 acquires the information indicating the state of the whole accumulation buffer 232 of the lower layer.

Then, in step S256, the layer HRD parameter monitoring section 241 monitors the whole accumulation buffer 232 of the corresponding layer using the information acquired in steps S254 and S255 according to the HRD parameter of the corresponding layer.

In step S257, the time layer HRD parameter monitoring section 242 determines whether or not the flag indicating the HRD parameter type of the corresponding time layer is 1. When the flag indicating the HRD parameter type of the corresponding time layer is determined to be 1 in step S257, the process proceeds to step S258.

In step S258, the time layer HRD parameter monitoring section 242 acquires information indicating the state of the accumulation buffer of each corresponding time layer of the partial accumulation buffer 231.

In step S259, the time layer HRD parameter monitoring section 242 monitors (each buffer of) the partial accumulation buffer 231 using the information acquired in step S258 according to the HRD parameter of each time layer.

When the flag indicating the HRD parameter type of the corresponding time layer is determined to be 0 in step S257, the process proceeds to step S260.

In step S260, the time layer HRD parameter monitoring section 242 acquires the information indicating the state of the whole accumulation buffer 232.

In step S261, the time layer HRD parameter monitoring section 242 acquires the information indicating the state of the accumulation buffer of each corresponding time layer of the partial accumulation buffer 231.

In step S259, the time layer HRD parameter monitoring section 242 monitors (each buffer of) the partial accumulation buffer 231 using the information acquired in steps S260 and S261 according to the HRD parameter of each time layer.

As described above, at least one flag is set to indicate whether the HRD parameter is the parameter for performing decoding of only a corresponding layer or the parameter for performing the decoding process of a corresponding layer and a lower layer, and thus it is possible to perform a decoding process at a proper timing.

This flag may be transmitted to the decoding side as supplemental enhancement information (SEI).

Here, it is difficult to detect whether the decoding process is performed by a single decoding device or a plurality of decoding devices as described above with reference to FIG. 6. In this regard, the example of setting the information indicating whether the HRD parameter is the parameter for performing the decoding process of only a corresponding layer or the parameter for performing the decoding process of a corresponding layer and a lower layer has been described above.

However, the current HEVC supports only the HRD parameter of the example (that is, the example in which the decoding process of the multiple layers is performed by a single decoding device) of ex11 illustrated in FIG. 6. In other words, in the current HEVC, the HRD parameter of the example of ex11 is set to the video parameter set (VPS) and transmitted to the decoding side.

In this regard, in the present technology, a technique of transmitting an HRD parameter of the example (that is, the example in which the decoding process of the multiple layers is performed by a plurality of decoding devices) of ex12 illustrated in FIG. 6 to the decoding side through vps_extension in the scalable HEVC is proposed as a third embodiment.

<3. Third Embodiment>

<Example of Syntax of Vps_Extension

FIG. 27 is a diagram illustrating an example of syntax of vps_extension. In an example of FIG. 27, i indicates the number of layer_sets, and j indicates the number of layer ids. Further, starting from j=1 indicates that there is only a base layer when j=0, and in this case, the processing methods of ex11 and ex12 are not different but all the same.

In an example of FIG. 27, layer_set_hrd_layer_info_present_flag[i][j] is set for each layer_id_included_flag[i][j]. When layer_set_hrd_layer_info_present_flag[i][j] is 1, it indicates that the HRD parameter corresponding to the example of ex12 is present (in vps_extension), and in this case, the HRD parameter corresponding to the example of ex12 is defined in next and subsequent rows.

Further, the HRD parameter corresponding to the example of ex12 may be set in sps (sequence parameter set)_extension as illustrated in FIG. 28.

<Example of Syntax of Sps_Extension>

FIG. 28 is a diagram illustrating an example of syntax of sps_extension.

In an example of FIG. 28, layer_set_hrd_layer_info_present_flag is set. When this flag is 1, it indicates that the HRD parameter corresponding to the example of ex12 is present (in sps_extension), and in this case, the HRD parameter corresponding to the example of ex12 is defined in the next row.

In the example of FIGS. 27 and 28, the HRD parameter is set for each layer_set. layer_set is set in the VPS as illustrated in FIG. 29.

<Example of Syntax of VPS>

FIG. 29 is a diagram illustrating an example of syntax of a VPS. Numbers on the left of each row are row numbers added for description.

In a 16th row of FIG. 29, the number of layer_sets is set as vps_num_layer_sets_minus1.

In 17th to 19th rows, it is described whether or not a layer of id[j] is included in layer_set of [i] as layer_id_included_flag[i][j]. layer_id_included_flag[i][j] will be described in detail in semantics illustrated in FIG. 30.

In a 27th row, the number of hrd parameters is set in a vps as vps_num_hrd_parameters. In a 29th row, hrd_parameters is associated with layer_set as hrd_layer_set_idx[i]. In a 32nd row, the HRD parameter of the example of ex11 is described as described above.

In a 35th row, vps_extension_flag indicating the presence or absence of vps_extension is described.

<Example of Semantics of Layer_Id_Included_Flag[i][j]>

FIG. 30 illustrates an example of semantics of layer_id_included_flag[i]j[j].

layer_id_included_flag[i][j] equal to 1 specifies that the value of nuh_layer_id equal to j is included in the layer identifier list layerSetLayeridList[i]. layer_id_included_flag[i][j] equal to 0 specifies that the value of nuh_layer_id equal to j is not included in the layer identifier list layerSetLayerIdList[i].

The value of numLayersInIdList[0] is set equal to 1 and the value of layerSetLayerIdList[0][0] is set equal to 0.

For each value of i in the range of 1 to vps_num_layer_sets_minus1, inclusive, the variable numLayersInIdList[i] and the layer identifier list layerSetLayerIdList[i] are derived as follows:
  n=0
  for (m=0; m<=vps_max_layer_id; m++)
  if (layer_id_included_flag[i][m])
    layerSetLayerIdList[i][n++]=m
  numLayersInIdList[i]=n For each value of i in the range of 1 to vps_num_layer_sets_minus1, inclusive, numLayersInIdList[i] shall be in the range of 1 to vps_max_layers_minus1+1, inclusive.

When numLayersInIdList[iA] is equal to numLayersInIdList[iB] for any iA and iB in the range of 0 to vps_num_layer_sets_minus1, inclusive, with iA not equal to iB, the value of layerSetLayerIdList[iA][n] shall not be equal to layerSetLayerIdList[iB][n] for at least one value of n in the range of 0 to numLayersInIdList[iA], inclusive.

A layer set is identified by the associated layer identifier list. The i-th layer set specified by the VPS is associated with the layer identifier list layerSetLayerIdList[i], for i in the range of 0 to vps_num_layer_sets_minus1, inclusive.

A layer set consists of all operation points that are associated with the same layer identifier list.

Each operation point is identified by the associated layer identifier list, denoted as OpLayerIdList, which consists of the list of nuh_layer_id values of all NAL units included in the operation point, in increasing order of nuh_layer_id values, and a variable OpTid, which is equal to the highest TemporalId of all NAL units included in the operation point. The bitstream subset associated with the operation point identified by OpLayerIdList and OpTid is the output of the sub-bitstream extraction process as specified in clause 10 with the bitstream, the target highest TemporalId equal to OpTid, and the target layer identifier list equal to OpLayerIdList as inputs. The OpLayerIdList and OpTid that identify an operation point are also referred to as the OpLayerIdList and OpTid associated with the operation point, respectively.

Particularly, as surrounded by a frame in FIG. 30, it is described that layer_set consists of all operation points that are associated with the same layer identifier list, and some bitstreams that can be extracted among bitstreams are associated with operation points identified by OplayerIdList.

Specifically, layer_set is set, for example, as illustrated in FIG. 31.

For example, when layers 0, 1, and 2 are included in LayerSet[1], and the layers 0 and 2 are included in LayerSet[2], layer_id_included_flag is set as follows.

layer_id_included_flag[1][0]=1 is set, which indicates that the layer 0 is included in LayerSet[1]. Further, layer_id_included_flag[1][1]=1 is set, which indicates that the layer 1 is included in LayerSet[1], and layer_id_included_flag[1][2]=1 is set, which indicates that the layer 2 is included in LayerSet[1].

layer_id_included_flag[2][0]=1 is set, which indicates that the layer 0 is included in LayerSet[2]. Further, layer_id_included_flag[2][1]=0 is set, which indicates that the layer 1 is not included in LayerSet[2], and layer_id_included_flag[2][2]=1 is set, which indicates that the layer 2 is included in LayerSet[2].

As described above, the flag indicating that there is the HRD parameter corresponding to the example of ex11 of FIG. 6 and the HRD parameter corresponding to the example of ex11 are transmitted to the decoding side through the vps. On the other hand, the flag indicating that there is the HRD parameter corresponding to the example of ex12 of FIG. 6 and the HRD parameter corresponding to the example of ex12 are transmitted to the decoding side through vps_extension. Thus, the decoding side can perform a decoding process at a proper timing.

Further, the flag indicating that there is the HRD parameter corresponding to the example of ex12 may also be transmitted to the decoding side as an SEI message.

<4. Fourth Embodiment>

<Another Example of Buffer Schedule Management Method>

Meanwhile, in order to prevent overflow or underflow of a buffer, it is necessary to apply any one of the following methods to a buffer schedule management.

A first method is a method using the parameter transmitted in the HRD parameter syntax in the first to third embodiments.

A second method is a method using buffering_period_SEI and picture_timing_SEI.

A third method is a method using a parameter transmitted in a layer higher than a video layer such as a time stamp (for example, a PTS or a DTS) in a system layer.

Of these methods, the method using buffering_period_SEI according to the second method will be described below.

<Syntax of Buffering_Period_SEI>

FIG. 32 is a diagram illustrating an example of syntax of buffering_period_SEI. Numbers on the left of each row are row numbers added for description.

In a 2nd row of FIG. 32, a parameter of buffering_period is set as bp_seq_parameter_set_id, and can be associated with an SPS.

In subsequent rows, a schedule management parameter of an accumulation buffer by accumulation from a lower layer is set.

Meanwhile, a technique of defining a parameter for the case of ex12 for performing a decoding process of decoding respective layers including a layer to be referred to through separate decoding devices in addition to the case of ex11 of performing a decoding process by a single decoding device as a parameter for buffer management by hdr_parameters( ) in image compression information or sub image compression information as described above with reference to FIG. 6 has been proposed.

hdr_parameters( ) according to the first method can be transmitted in association with a VPS or an SPS, and in the case of the former, hdr_parameters( ) can be transmitted for a layer set associated with a VPS as well as a single layer.

However, buffering_period_SEI illustrated in FIG. 32 can be associated with only an SPS. Thus, it is difficult to transmit a parameter associated with a plurality of layer sets as in hdr_parameters( ) in a VPS.

In this regard, in the present technology, a schedule management of an accumulation buffer by buffering_period_SEI is performed by syntax illustrated in FIGS. 33 to 35.

buffering_period_SEI according to the present technology differs from buffering_period_SEI illustrated in FIG. 32 in the following points.

In other words, a first difference lies in that buffering_period_SEI according to the present technology can be associated with a VPS as well as an SPS. A second difference lies in that a parameter can be set for each layer set defined in a VPS when associated with a VPS. A third difference lies in that it is possible to set a parameter when all layers included in a layer set are decoded by a single decoding device and a parameter when respective layers are decoded by separate decoding devices as illustrated in FIG. 6.

FIGS. 33 to 35 are diagrams illustrating an example of syntax of buffering_period_SEI. Numbers on the left of each row are row numbers added for description.

In an example of FIG. 33, associated_parameter_set_flag is set in a 2nd row. associated_parameter_set_flag is a flag designating which of a VPS and an SPS is associated with buffering_period_SEI. When associated_parameter_set_flag is 0, it indicates an association with a VPS, and when associated_parameter_set_flag is 1, it indicates an association with an SPS.

A parameter when associated_parameter_set_flag is 0 (VPS) is described in 3rd to 11th rows. bp_video_parameter_set_id in a 4th row indicates a corresponding VPS, and vps_num_bp_parameters in a 5th row indicates the number of transmitted bp_parameters.

bp_layer_set_idx in a 7th row indicates a layer set corresponding to each bp_parameter, and syntax of layer_buffering_period of FIGS. 34 and 35 is read with layer_buffering_period in a 10th row.

A parameter when associated_parameter_set_flag is 1 (SPS) is described as indicated by else in 12th to 15th rows.

bp_seq_parameter_set_id in a 13th row indicates a corresponding SPS, and syntax of layer_buffering_period of FIGS. 34 and 35 is read with layer_buffering_period in a 14th row.

In other words, according to the syntax of FIG. 33, in the case of the VPS, the syntax of FIG. 34 is read by the number of layer sets, and in the case of the SPS, the syntax of FIGS. 34 and 35 is read once.

As described above, when associated_parameter_set_flag is 0 (VPS), it is possible to transmit the parameter for buffer management for the layer set designated by the VPS according to layer_buffering_period_SET syntax of FIGS. 34 and 35.

In the transmission of the parameter related to the NAL and the VCL of FIGS. 34 and 35, layer_specific_parameters_present_flag serving as a flag indicating whether or not a parameter of only a corresponding layer is transmitted is set as illustrated in 18th and 38th rows. When this flag is 1, it indicates that a parameter of only a corresponding layer described in 19th to 27th rows and 39th to 47th rows is transmitted. In other words, when layer_specific_parameters_present_flag is 1, it is possible to transmit a parameter for performing a decoding process as in ex12 in addition to ex11 of FIG. 6.

In the example of FIGS. 34 and 35, buffering_period_SEI is basically the same as buffering_period_SEI described above with reference to FIG. 32 except for the above-described points, and in the other rows, a schedule management parameter of an accumulation buffer by accumulation from a lower layer is set.

Thus, when schedule management of an accumulation buffer by buffering_period_SET is performed, it is possible to manage a layer set as well as a single layer. Further, it is possible to perform a schedule management both when all layers included in a layer set are decoded by a single decoding device and when respective layers are decoded by separate decoding devices.

<Scalable Encoding Device>

A scalable encoding device in the case of buffering_period_SEI has basically the same configuration as in the case of the HRD parameter. Thus, an example of a configuration of a scalable encoding device in the case of buffering_period_SEI will be described with reference to FIG. 10.

In other words, as in the case of the HRD parameter, the base layer image encoding section 101-1 acquires image information (base layer image information) of the base layer. The base layer image encoding section 101-1 encodes the base layer image information without referring to other layers, generates encoded data (base layer encoded data) of the base layer, and outputs the generated encoded data.

As in the case of the HRD parameter, the enhancement layer image encoding section 101-2 acquires image information (enhancement layer image information) of the enhancement layer. The enhancement layer image encoding section 101-2 encodes the enhancement layer image information. At this time, the enhancement layer image encoding section 101-2 performs inter-layer prediction with reference to information related to encoding of the base layer as necessary.

Further, buffer management information is supplied from the base layer image encoding section 101-1 to the enhancement layer image encoding section 101-2 as necessary. Unlike the case of the HRD parameter, the enhancement layer image encoding section 101-2 designates an associated parameter set, and designates a parameter of each layer set or a parameter for a sequence according to the designated parameter set. Then, the enhancement layer image encoding section 101-2 sets the designated parameter with reference to the buffer management information supplied from the base layer image encoding section 101-1.

Further, unlike the case of the HRD parameter, the enhancement layer image encoding section 101-2 sets layer_specific_parameters_present_flag, and sets a parameter of each layer according to a value of layer_specific_parameters_present_flag. Then, the enhancement layer image encoding section 101-2 encodes buffering_period_SEI and layer_buffering_period_SEI including the set parameters, and supplies the encoded information to a lossless encoding section 301.

The enhancement layer image encoding section 101-2 generates encoded data (enhancement layer encoded data) of the enhancement layer through the above encoding, and outputs the generated encoded data.

As in the case of the HRD parameter, the encoding control section 102 controls the encoding process of the layer image encoding sections 101, for example, in view of the reference relation of the layer image encoding sections 101.

<Example of Configuration of Layer Image Encoding Section>

Figure 36:
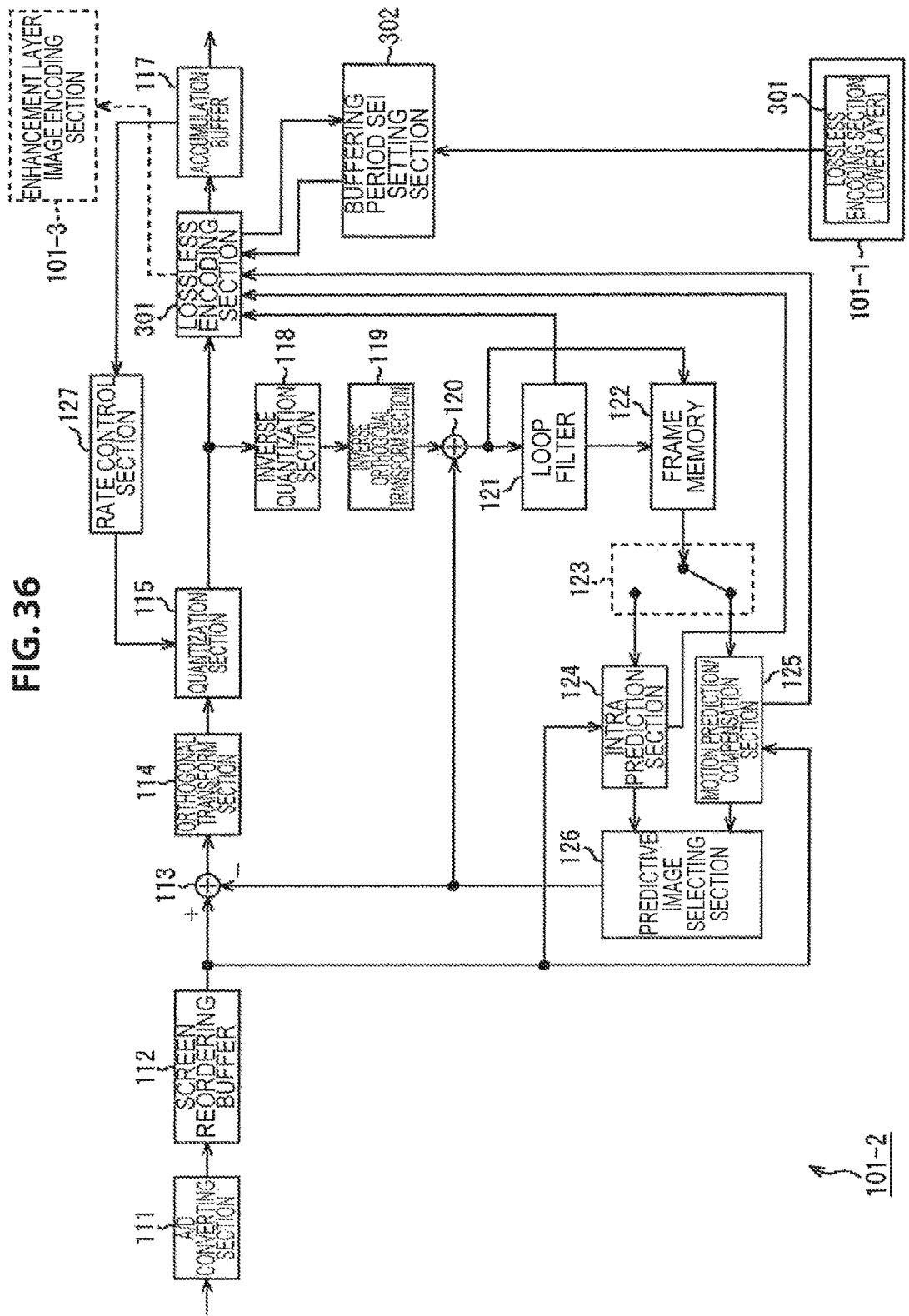
FIG. 36 is a block diagram illustrating another example of a main configuration of an enhancement layer image encoding section.

FIG. 36 is a block diagram illustrating an example of a main configuration of the enhancement layer image encoding section 101-2 in the case of buffering_period_SEI.

Further, the base layer image encoding section 101-1 in the case of buffering_period_SEI has basically the same configuration as the enhancement layer image encoding section 101-2 of FIG. 36 except that a type of an image serving as a target is different. For the sake of description, in the example of FIG. 36, a configuration of the enhancement layer image encoding section 101-2 will be described as an example.

The enhancement layer image encoding section 101-2 of FIG. 36 differs from the enhancement layer image encoding section 101-2 of FIG. 11 in that the lossless encoding section 116 is replaced with the lossless encoding section 301, the HRD type setting section 128 is not provided, and a buffering period SEI setting section 302 is added.

In other words, the enhancement layer image encoding section 101-2 of FIG. 36 includes an A/D converting section 111, a screen reordering buffer 112, an operation section 113, an orthogonal transform section 114, a quantization section 115, a lossless encoding section 301, an accumulation buffer 117, an inverse quantization section 118, and an inverse orthogonal transform section 119. The enhancement layer image encoding section 101-2 further includes an operation section 120, a loop filter 121, a frame memory 122, a selecting section 123, an intra prediction section 124, a motion prediction/compensation section 125, a predictive image selecting section 126, and a rate control section 127. The enhancement layer image encoding section 101-2 further includes the buffering period SEI setting section 302.

like the lossless encoding section 116 of FIG. 11, the lossless encoding section 301 encodes the transform coefficients quantized in the quantization section 115 according to an arbitrary encoding scheme. Since coefficient data is quantized under control of the rate control section 127, the coding amount becomes a target value (or approaches a target value) set by the rate control section 127.

Like the lossless encoding section 116, the lossless encoding section 301 acquires information indicating an intra prediction mode or the like from the intra prediction section 124, and acquires information indicating an inter prediction mode, differential motion vector information, or the like from the motion prediction/compensation section 125.

Further, unlike the lossless encoding section 116, the lossless encoding section 301 acquires encoded information (syntax) of layer_buffering_period_SEI from the buffering period SEI setting section 302 in addition to buffering_period_SEI.

Further, like the lossless encoding section 116, the lossless encoding section 301 appropriately generates an NAL unit of the enhancement layer including a sequence parameter set (SPS), a picture parameter set (PPS), and the like. Like the lossless encoding section 116, the lossless encoding section 301 encodes various kinds of information according to an arbitrary encoding scheme, and sets (multiplexes) the encoded information as part of encoded data (also referred to as an "encoded stream"). The lossless encoding section 301 supplies the encoded data obtained by the encoding to be accumulated in the accumulation buffer 117.

Further, unlike the lossless encoding section 116, for example, when there is an enhancement layer image encoding section 101-3 of an upper layer as indicated by a dotted line, and there is a request from its buffering period SEI setting section 302, the lossless encoding section 301 supplies management information of the accumulation buffer 117 to the enhancement layer image encoding section 101-3 of the upper layer.

The accumulation buffer 117 temporarily holds the encoded data (enhancement layer encoded data) supplied from the lossless encoding section 301. The accumulation buffer 117 outputs the held enhancement layer encoded data to a recording device (recording medium), a transmission path, or the like (not illustrated) at a subsequent stage at a certain timing. In other words, the accumulation buffer 117 serves as a transmitting section that transmits the encoded data as well.

The buffering period SEI setting section 302 designates an associated parameter set, and designates a parameter of each layer set or a parameter for a sequence according to the designated parameter set. Further, the buffering period SEI setting section 302 sets the designated parameter with reference to the buffer management information supplied from the lossless encoding section 301 (the lower layer) of the base layer image encoding section 101-1. For example, this parameter is a parameter of accumulation from a lower layer. Further, the buffering period SEI setting section 302 sets layer_specific_parameters_present_flag, and sets a parameter of each layer according to the set value of layer_specific_parameters_present_flag.

The buffering period SEI setting section 302 encodes buffering_period_SEI and layer_buffering_period_SEI including the parameters set as described above, and supplies the encoded information to the lossless encoding section 301.

<Example of Configuration of Buffering Period SEI Setting Section>

Figure 37:
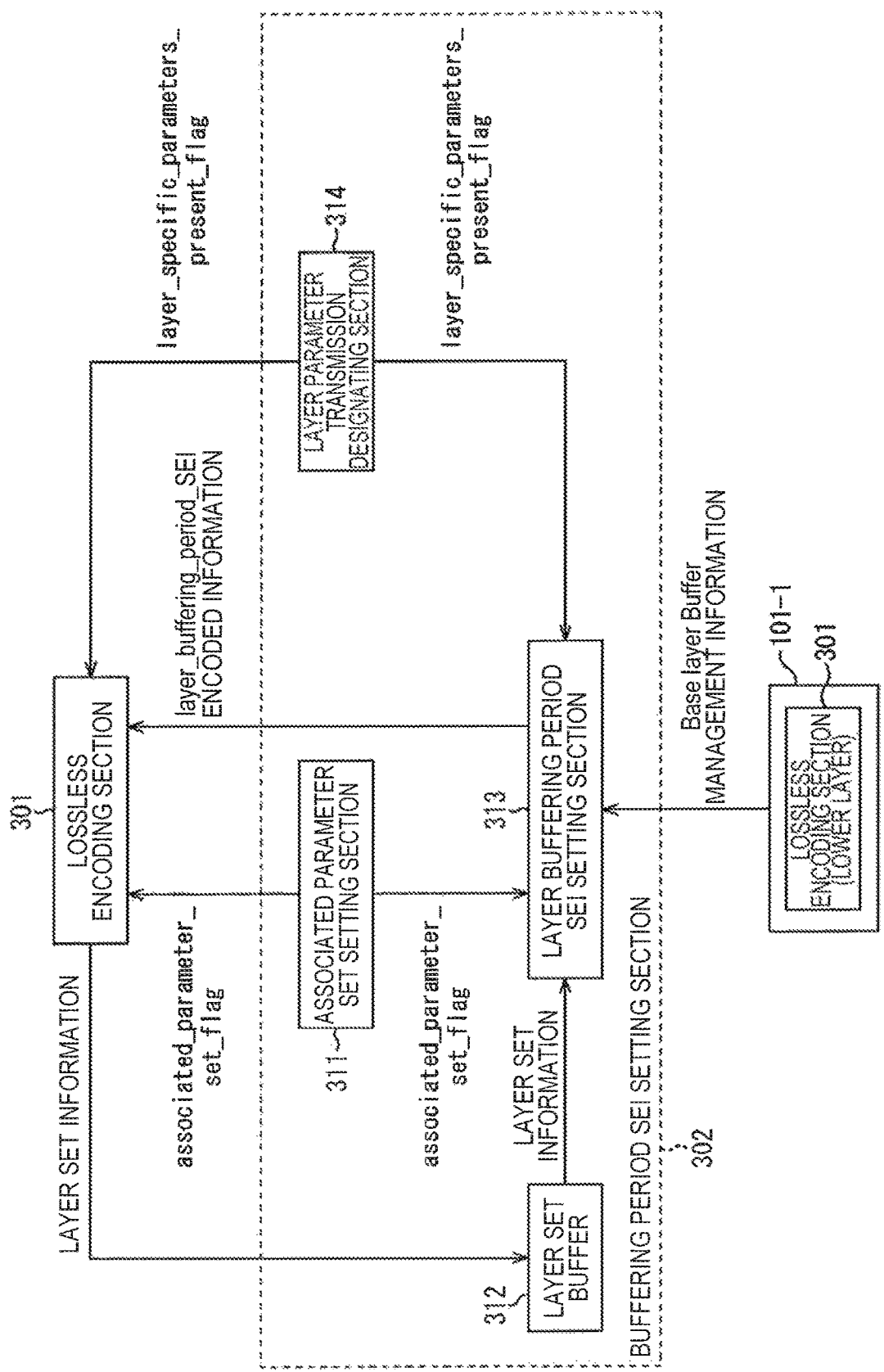
FIG. 37 is a block diagram illustrating an example of a configuration of a buffering period SEI setting section.

FIG. 37 is a block diagram illustrating an example of a configuration of the buffering period SEI setting section of FIG. 36.

In an example of FIG. 37, the buffering period SEI setting section 302 is configured to include an associated parameter set setting section 311, a layer set buffer 312, a layer buffering period SEI setting section 313, and a layer parameter transmission designating section 314.

The associated parameter set setting section 311 performs a designation related to associated_parameter_set_flag according to the user's operation. In other words, the user designates which of a VPS (flag=0) and an SPS (flag=1) is associated with buffering_period_SEI. The associated parameter set setting section 311 designates a value of associated_parameter_set_flag, and supplies the designated value to the lossless encoding section 301 and the layer buffering period SEI setting section 313.

In the case of associated_parameter_set_flag=0, that is, when buffering_period_SEI is associated with a VPS, information related to a layer set stored in a VPS of enhancement layer image compression information is supplied and accumulated in the layer set buffer 312 through the lossless encoding section 301. The layer set buffer 312 accumulates the information related to the layer set, and supplies the information related to the layer set to the layer buffering period SEI setting section 313 at a certain timing.

Further, the buffer management information in the base layer is supplied from the lossless encoding section 301 of the base layer image encoding section 101-1 to the layer buffering period SEI setting section 313.

The layer parameter transmission designating section 314 designates layer_specific_parameters_present_flag according to the user's operation. In other words, the user designates a value of layer_specific_parameters_present_flag indicating whether or not a parameter setting of each layer is performed. The layer parameter transmission designating section 314 designates a value of layer_specific_parameters_present_flag, and supplies the designated value to the lossless encoding section 301 and the layer buffering period SEI setting section 313.

The layer buffering period SEI setting section 313 performs the encoding process of buffering_period_SEI and layer_buffering_period_SE, and supplies encoded information thereof to the lossless encoding section 301.

Specifically, the layer buffering period SEI setting section 313 sets the designated parameter according to associated_parameter_set_flag supplied from the associated parameter set setting section 311 with reference to the buffer management information supplied from the lossless encoding section 301 (the lower layer) of the base layer image encoding section 101-1. In other words, when a value of associated_parameter_set_flag is 1 (=VPS), the layer buffering period SEI setting section 313 sets a parameter for each layer set based on the information related to the layer set supplied from the layer set buffer 312. Further, when a value of associated_parameter_set_flag is 0 (=SPS), the layer buffering period SEI setting section 313 sets a parameter for a sequence.

Further, the layer buffering period SEI setting section 313 sets a parameter of each layer according to a value of layer_specific_parameters_present_flag, that is, when a value of layer_specific_parameters_present_flag is 1. Further, the layer buffering period SEI setting section 313 encodes buffering_period_SEI and layer_buffering_period_SEI including the set parameter, and supplies the encoded information to the lossless encoding section 301.

<Flow of Encoding Process>

Next, the flow of the process performed by the scalable encoding device 100 in the case of buffering_period_SEI will be described. The flow of the encoding process is basically the same as the flow of the encoding process described above with reference to FIG. 14, and a description thereof is omitted.

<Flow of Layer Encoding Process>

Figure 38:
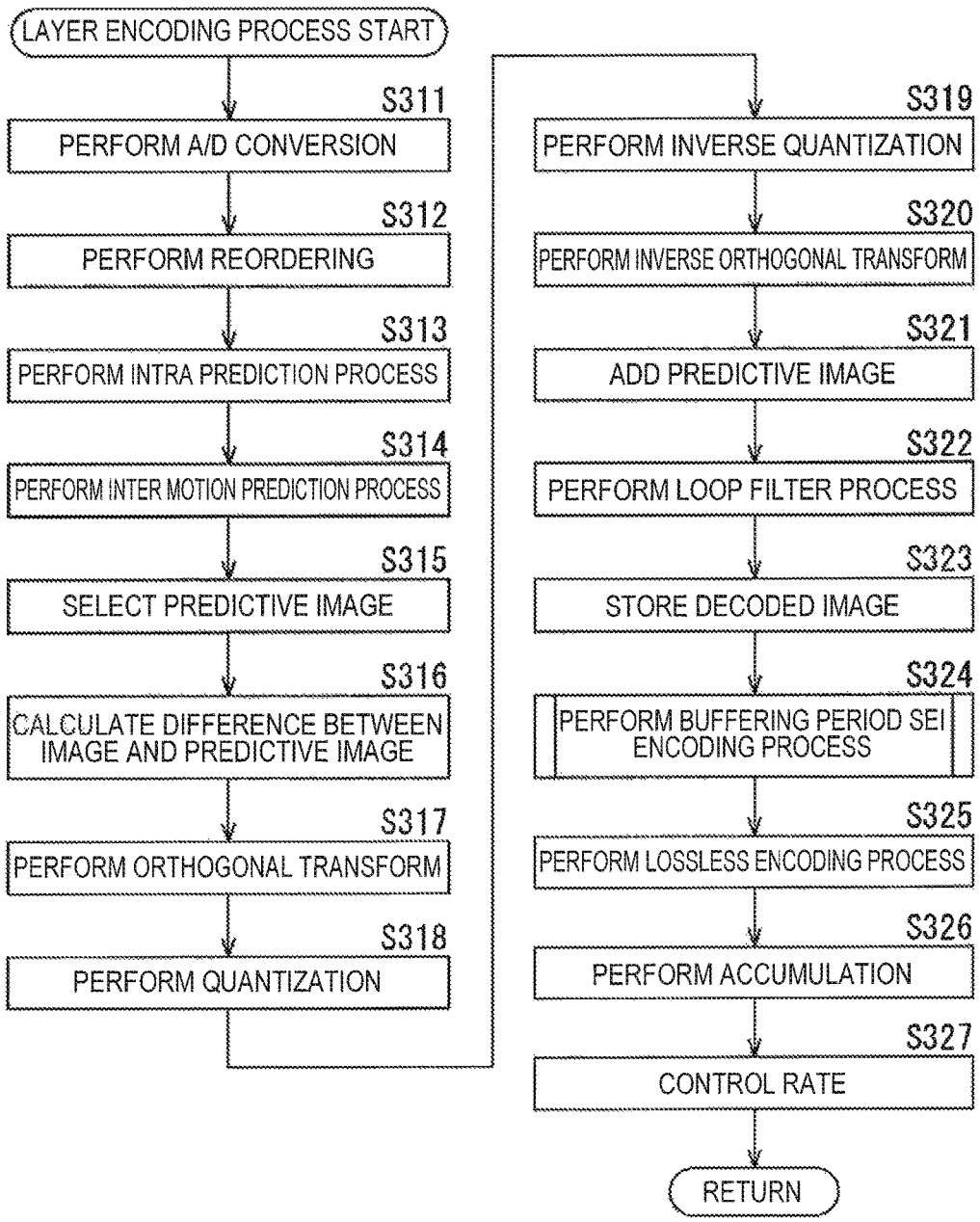
FIG. 38 is a flowchart for describing an example of a layer encoding process.

Next, the layer encoding process in step S102 of FIG. 14 will be described with reference to a flowchart of FIG. 38. In steps S311 to S323, S326, and S327 of FIG. 38, basically the same processes as in steps Sill to S123, S126, and S127 of FIG. 15 are performed, and thus a description thereof is omitted.

In other words, in step S324, the buffering period SEI setting section 302 performs a buffering period SEI encoding process. The buffering period SEI encoding process will be described later with reference to FIG. 39, and through this process, the respective parameters are set, and information of buffering_period_SEI and layer_buffering_period_SEI including the set parameters is encoded and supplied to the lossless encoding section 301.

In step S325, the lossless encoding section 301 encodes the coefficients quantized in the process of step S318. In other words, lossless coding such as variable length coding or arithmetic coding is performed on data corresponding to a differential image.

At this time, the lossless encoding section 301 encodes the information related to the prediction mode of the predictive image selected in the process of step S315, and adds the encoded information to the encoded data obtained by encoding the differential image. In other words, the lossless encoding section 301 also encode, for example, information according to the optimal intra prediction mode information supplied from the intra prediction section 124 or the optimal inter prediction mode supplied from the motion prediction/compensation section 125, and adds the encoded information to the encoded data. Further, the lossless encoding section 301 also encodes, for example, the encoded information (syntax) of buffering_period_SEI and layer_buffering_period_SEI supplied in the process of step S324 according to a certain encoding scheme, and adds the encoded information to the encoded data.

<Flow of Buffering Period SEI Setting Process>

Next, the buffering period SEI encoding process of step S324 of FIG. 38 will be described with reference to a flowchart of FIG. 39.

For example, the layer set buffer 312 accumulates the information related to the layer set, and supplies the information related to the layer set to the layer buffering period SEI setting section 313 at a certain timing.

In step S331, the associated parameter set setting section 311 designates an associated parameter set according to the user's operation. In other words, the user designates which of a VPS (flag=0) and an SPS (flag=1) is associated with buffering_period_SEI.

In step S332, the associated parameter set setting section 311 determines whether or not the associated parameter set is a VPS. When the associated parameter set is determined to be a VPS in step S332, the process proceeds to step S333.

In step S333, the associated parameter set setting section 311 designates a parameter of each layer set. In other words, the associated parameter set setting section 311 designates a value of associated_parameter_set_flag (flag=0), and supplies the designated value to the lossless encoding section 301 and the layer buffering period SEI setting section 313.

At this time, the information related to the layer set stored in the VPS of the enhancement layer image compression information is supplied to and accumulated in the layer set buffer 312 through the lossless encoding section 301. Then, the layer buffering period SEI setting section 313 sets a parameter of each layer set based on the information related to the layer set supplied from the layer set buffer 312 with reference to the buffer management information supplied from the lossless encoding section 301 (the lower layer) of the base layer image encoding section 101-1.

Meanwhile, when the associated parameter set is determined not to be a VPS in step S332, the process proceeds to step S334.

In step S334, the associated parameter set setting section 311 designates a parameter of a sequence. In other words, the associated parameter set setting section 311 designates a value of associated_parameter_set_flag (flag=1), and supplies the designated value to the lossless encoding section 301 and the layer buffering period SEI setting section 313.

The layer buffering period SEI setting section 313 sets a parameter of a sequence with reference to the buffer management information supplied from the lossless encoding section 301 (the lower layer) of the base layer image encoding section 101-1.

In step S335, the layer parameter transmission designating section 314 sets layer_specific_parameters_present_flag according to the user's operation. In other words, the user designates a value of layer_specific_parameters_present_flag indicating whether or not setting of a parameter of each layer is performed.

The layer parameter transmission designating section 314 supplies the set value of layer_specific_parameters_present_flag to the lossless encoding section 301 and the layer buffering period SEI setting section 313.

In step S336, the layer buffering period SEI setting section 313 determines whether or not a value of layer_specific_parameters_present_flag is 1. When a value of layer_specific_parameters_present_flag is determined to be 1 in step S336, the process proceeds to step S337.

In step S337, the layer buffering period SEI setting section 313 sets a parameter of each layer.

Further, when a value of layer_specific_parameters_present_flag is determined to be 0 in step S336, the process of step S337 is skipped.

In step S338, the layer buffering period SEI setting section 313 encodes buffering_period_SEI and layer_buffering_period_SEI including the parameters set as described above, and supplies the encoded information to the lossless encoding section 301.

Since buffering_period_SEI is associated with a VPS as well as an SPS as described above, when schedule management of an accumulation buffer by buffering period_SEI is performed, it is possible to manage a layer set as well as a single layer.

Further, since a parameter of each layer is transmitted, it is possible to perform a schedule management both when all layers included in a layer set are decoded by a single decoding device and when respective layers are decoded by separate decoding devices.

<Scalable Decoding Device>

A configuration of a scalable decoding device in the case of buffering_period_SEI is basically the same as in the case of the HRD parameter. Thus, an example of a configuration of a scalable decoding device in the case of buffering_period_SEI will be described with reference to FIG. 20.

In other words, as in the case of the HRD parameter, the base layer image decoding section 201-1 is an image decoding section corresponding to the base layer image encoding section 101-1 of FIG. 10, and acquires, for example, the base layer encoded data obtained by encoding the base layer image information through the base layer image encoding section 101-1. The base layer image decoding section 201-1 decodes the base layer encoded data without referring to other layers, reconstructs the base layer image information, and outputs the base layer image information.

The enhancement layer image decoding section 201-2 is an image decoding section corresponding to the enhancement layer image encoding section 101-2, and acquires, for example, the enhancement layer encoded data obtained by encoding the enhancement layer image information through the enhancement layer image encoding section 101-2 as in the case of the HRD parameter. The enhancement layer image decoding section 201-2 decodes the enhancement layer encoded data. At this time, the enhancement layer image decoding section 201-2 performs the inter-layer prediction with reference to information related to decoding of the base layer as necessary.

Further, unlike the case of the HRD parameter, buffering period_SEI of FIG. 33 and layer_buffering_period_SEI of FIGS. 34 and 35 are added to each encoded data (bitstream) and transmitted. Unlike the case of the HRD parameter, the enhancement layer image decoding section 201-2 acquires information related to an associated parameter set from buffering_period_SEI, and decodes a parameter of each layer set or a parameter for a sequence according to a parameter set indicated by the acquired information.

Further, unlike the case of the HRD parameter, the enhancement layer image decoding section 201-2 receives layer_specific_parameters_present_flag from layer_buffering_period_SEI, and decodes a parameter of each layer according to a value of layer_specific_parameters_present_flag. Then, the enhancement layer image decoding section 201-2 monitors the accumulation buffer based on the decoded parameters.

Further, in the case of the parameter that is not a parameter of each layer, that is, the parameter accumulated from the lower layer, the enhancement layer image decoding section 201-2 monitors the accumulation buffer with reference to the buffer management information supplied from a lossless decoding section 351 of the base layer image decoding section 201-1.

Through the decoding, the enhancement layer image decoding section 201-2 decodes the encoded data of the enhancement layer, reconstructs the enhancement layer image information, and outputs the enhancement layer image information.

As in the case of the HRD parameter, the decoding control section 202 controls the decoding process of the layer image decoding sections 201, for example, in view of the reference relation of the layer image decoding sections 201.

<Example of a Configuration of Layer Image Decoding Section>

Figure 40:
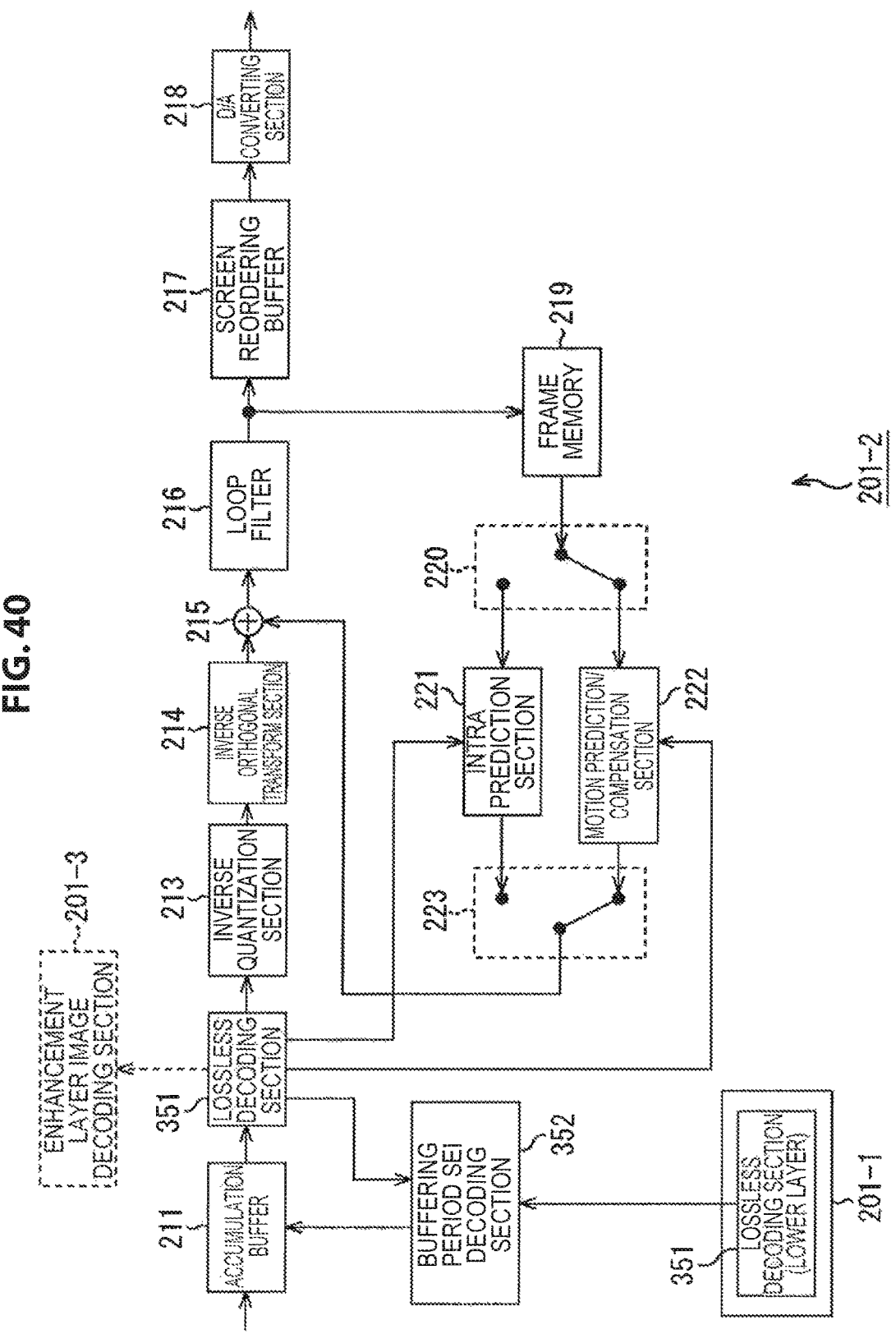
FIG. 40 is a block diagram illustrating another example of a main configuration of an enhancement layer image decoding section.

FIG. 40 is a block diagram illustrating an example of a main configuration of the enhancement layer image decoding section 201-2 in the case of buffering_period_SEI.

The base layer image decoding section 201-1 in the case of buffering_period_SEI has basically the same configuration as the enhancement layer image decoding section 201-2 of FIG. 40 except that a type of an image serving as a target is different. For the sake of description, in the example of FIG. 40, a configuration of the enhancement layer image decoding section 201-2 will be described as an example.

The enhancement layer image decoding section 201-2 of FIG. 40 differs from the enhancement layer image decoding section 201-2 of FIG. 21 in that the lossless decoding section 212 is replaced with the lossless decoding section 351, the HRD type decoding section 224 is not provided, and a buffering period SEI decoding section 352 is added.

In other words, the enhancement layer image decoding section 201-2 includes an accumulation buffer 211, a lossless decoding section 351, an inverse quantization section 213, an inverse orthogonal transform section 214, an operation section 215, a loop filter 216, a screen reordering buffer 217, and a D/A converting section 218. The enhancement layer image decoding section 201-2 further includes a frame memory 219, a selecting section 220, an intra prediction section 221, a motion prediction/compensation section 222, and a selecting section 223. The enhancement layer image decoding section 201-2 further includes the buffering period SEI decoding section 352.

The accumulation buffer 211 is a receiving section that receives the transmitted enhancement layer encoded data. Information necessary for decoding such as the prediction mode information is added to the enhancement layer encoded data. buffering_period_SEI of FIG. 33 and layer_buffering_period_SEI of FIGS. 34 and 35 are added to the enhancement layer encoded data. The accumulation buffer 211 receives and accumulates the transmitted enhancement layer encoded data, and supplies the encoded data to the lossless decoding section 212 at a certain timing.

Further, the accumulation buffer 211 receives layer_buffering_period_SEI decoded information supplied from the buffering period SEI decoding section 352, and performs buffer management based on the layer_buffering_period_SEI decoded information.

Like the lossless decoding section 212 of FIG. 21, the lossless decoding section 351 decodes the information that has been encoded by the lossless encoding section 301 and supplied from the accumulation buffer 211 according to a scheme corresponding to the encoding scheme of the lossless encoding section 301. The lossless decoding section 351 supplies quantized coefficient data of a differential image obtained by the decoding to the inverse quantization section 213.

Further, like the lossless decoding section 212, the lossless decoding section 351 appropriately extracts and acquires the NAL unit including the video parameter set (VPS), the sequence parameter set (SPS), the picture parameter set (PPS), and the like which are included in the enhancement layer encoded data. Like the lossless decoding section 212, the lossless decoding section 351 extracts the information related to the optimal prediction mode from the information, determines which of the intra prediction mode and the inter prediction mode has been selected as the optimal prediction mode based on the information, and supplies the information related to the optimal prediction mode to one of the intra prediction section 221 and the motion prediction/compensation section 222 that corresponds to the mode determined to have been selected.

In other words, for example, in the enhancement layer image decoding section 201-2, when the intra prediction mode is selected as the optimal prediction mode, the information related to the optimal prediction mode is supplied to the intra prediction section 221. Further, for example, in the enhancement layer image decoding section 201-2, when the inter prediction mode is selected as the optimal prediction mode, the information related to the optimal prediction mode is supplied to the motion prediction/compensation section 222.

Further, similarly to the lossless decoding section 212, the lossless decoding section 351 extracts, for example, information necessary for inverse quantization such as the quantization matrix or the quantization parameter from the NAL unit or the like, and supplies the extracted information to the inverse quantization section 213. Further, unlike the lossless decoding section 212, the lossless decoding section 351 parses and separates, for example, buffering_period_SEI of FIG. 33 and layer_buffering_period_SET of FIGS. 34 and 35, and supplies buffering_period_SEI of FIG. 33 and layer_buffering_period_SEI of FIGS. 34 and 35 to the buffering period SEI decoding section 352.

The buffering period SEI decoding section 352 decodes a parameter of each layer set or a parameter for a sequence according to associated_parameter_set_flag of buffering_period_SEI supplied from the lossless decoding section 351. In other words, when a value of associated_parameter_set_flag is 0 (=VPS), the layer buffering period SEI decoding section 352 receives the parameter of each layer set based on the information related to the layer set supplied from the layer set buffer 312. Then, the layer buffering period SEI decoding section 352 decodes the received parameter of each layer set with reference to the base layer buffer management information supplied from the lossless decoding section (the lower layer) 351 of the base layer image decoding section 201-1.

Further, when a value of associated_parameter_set_flag is 1 (=SPS), the layer buffering period SEI setting section 313 receives a parameter for a sequence. Then, the layer buffering period SEI decoding section 352 decodes the received parameter for the sequence with reference to the base layer buffer management information of the lossless decoding section (the lower layer) 351 of the base layer image decoding section 201-1.

Further, the buffering period SEI decoding section 352 receives layer_specific_parameters_present_flag of layer_buffering_period_SEI supplied from the lossless decoding section 351, and receives and decodes a parameter of each layer according to a value of layer_specific_parameters_present_flag, that is, when a value of layer_specific_parameters_present_flag is 1. Then, the layer buffering period SEI decoding section 352 supplies the layer_buffering_period_SEI decoded information decoded according to associated_parameter_set_flag and layer_specific_parameters_present_flag to the accumulation buffer 211.

Further, for example, when there is an enhancement layer image decoding section 201-3 of an upper layer as indicated by a dotted line, and there is a request from its buffering period SEI decoding section 352, the lossless decoding section 351 supplies the management information of the accumulation buffer 211 to the enhancement layer image decoding section 201-3 of the upper layer.

<Example of Configuration of Buffering Period SEI Decoding Section>

Figure 41:
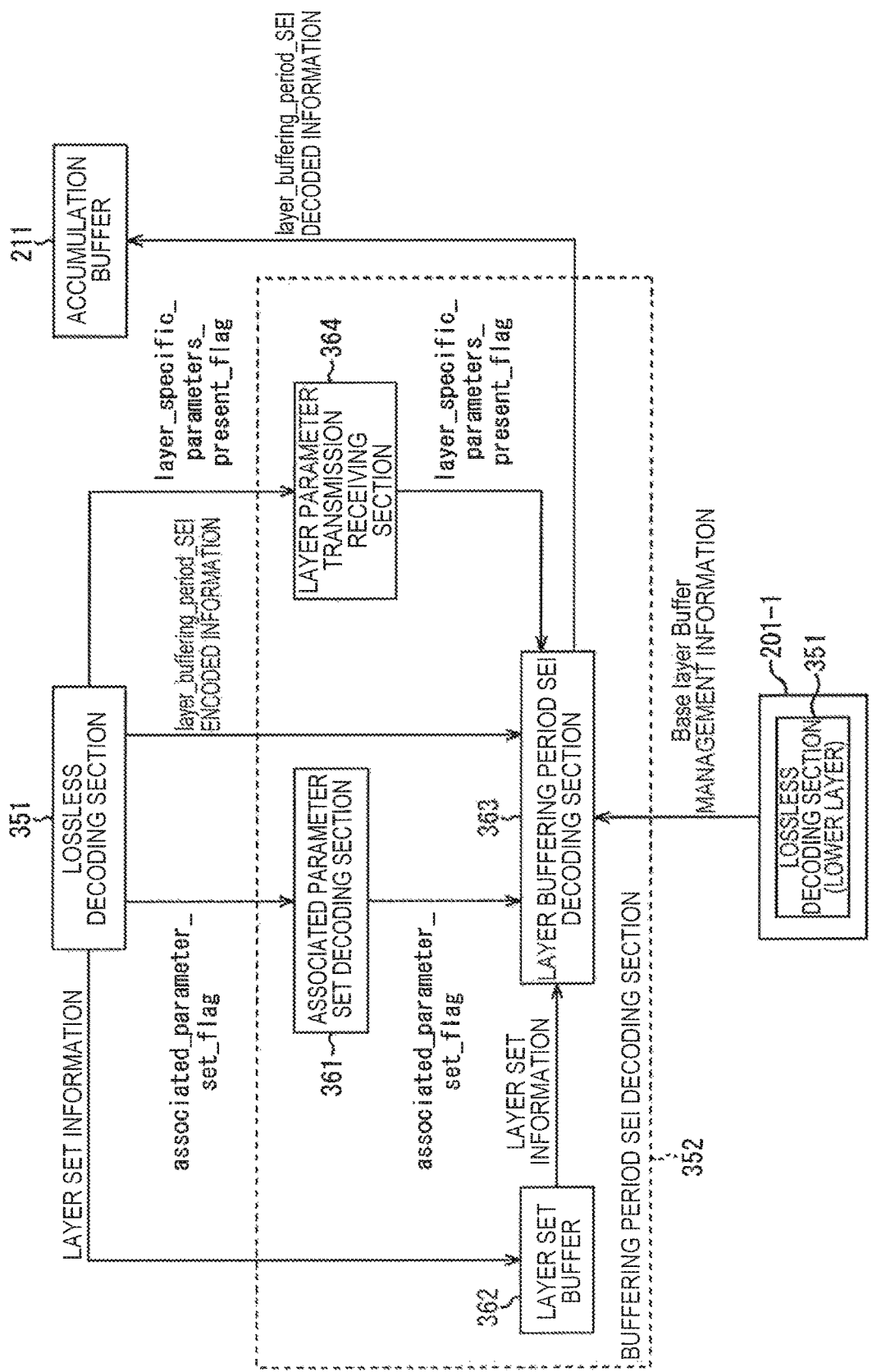
FIG. 41 is a block diagram illustrating an example of a configuration of a buffering period SEI decoding section.

FIG. 41 is a block diagram illustrating an example of a configuration of the buffering period SEI decoding section of FIG. 40.

In an example of FIG. 41, the buffering period SEI decoding section 352 is configured to include an associated parameter set decoding section 361, a layer set buffer 362, a layer buffering period SEI decoding section 363, and a layer parameter transmission receiving section 364.

The lossless decoding section 351 parses and separates buffering_period_SEI and layer_buffering_period_SEI, and supplies buffering_period_SEI encoded information and associated_parameter_set_flag therein to the associated parameter set decoding section 361. Further, the lossless decoding section 351 supplies layer_buffering_period_SEI encoded information to the layer buffering period SEI decoding section 363, and supplies layer_specific_parameters_present_flag therein to the layer parameter transmission receiving section 364.

The associated parameter set decoding section 361 receives associated_parameter_set_flag supplies from the lossless decoding section 351, and analyzes the buffering_period_SEI encoded information according to a value thereof. In other words, the associated parameter set decoding section 361 acquires necessary information from the buffering_period_SEI encoded information according to a value of associated_parameter_set_flag, and supplies the acquired information to the layer buffering period SEI decoding section 363.

In the case of associated_parameter_set_flag=0, that is, when buffering_period_SEI is associated with a VPS, the lossless decoding section 351 supplies the information related to the layer set stored in the VPS of the enhancement layer image compression information to the layer set buffer 362. The layer set buffer 362 accumulates the information related to the layer set, and supplies the information related to the layer set to the layer buffering period SEI decoding section 363 at a certain timing.

The layer buffering period SEI decoding section 363 analyzes the layer_buffering_period_SEI encoded information according to associated_parameter_set_flag supplied from the associated parameter set decoding section 361 with respect to the base layer buffer management information of the lossless decoding section (the lower layer) 351 of the base layer image decoding section 201-1. Then, the layer buffering period SEI decoding section 363 decodes the parameter of each layer set or the parameter for the sequence using the analyzed encoded information.

In other words, when a value of associated_parameter_set_flag is 1 (=VPS), the layer buffering period SEI decoding section 363 decodes the parameter of each layer set based on the information related to the layer set supplied from the layer set buffer 362. Further, when a value of associated_parameter_set_flag is 0 (=SPS), the layer buffering period SEI decoding section 363 decodes the parameter for the sequence.

Further, the layer buffering period SEI decoding section 363 receives layer_specific_parameters_present_flag supplied from the layer parameter transmission receiving section 364, and analyzes the layer_buffering_period_SEI encoded information according to a value thereof. When a value of layer_specific_parameters_present_flag is 1, the layer buffering period SEI decoding section 363 decodes the parameter of each layer.

Then, the layer buffering period SEI decoding section 363 supplies the layer_buffering_period_SEI decoded information decoded according to associated_parameter_set_flag and layer_specific_parameters_present_flag to the accumulation buffer 211.

The layer parameter transmission receiving section 364 analyzes a value of layer_specific_parameters_present_flag, and supplies the analyzed value of layer_specific_parameters_present_flag to the layer buffering period SEI decoding section 363.

<Flow of Decoding Process>

Next, the flow of the process performed by the scalable decoding device 200 in the case of buffering_period_SEI will be described. The flow of the decoding process is basically the same as the flow of the decoding process described above with reference to FIG. 23, and thus a description thereof is omitted.

<Flow of Layer Decoding Process>

Figure 42:
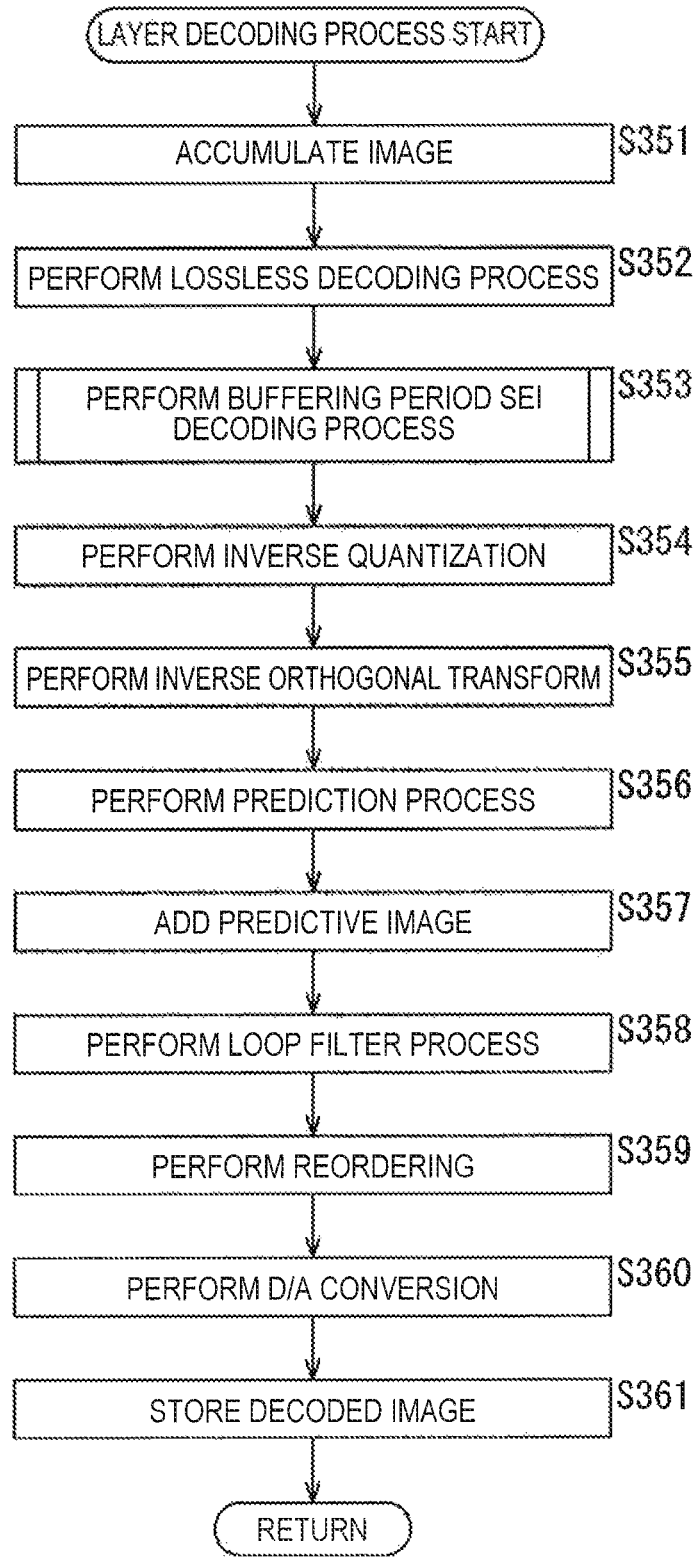
FIG. 42 is a flowchart for describing an example of a layer decoding process.

Next, the layer decoding process in step S202 of FIG. 23 will be described with reference to a flowchart of FIG. 42. In steps S351 and S354 to S361 of FIG. 42, basically the same processes as in steps S211 and S214 to S221 of FIG. 24 are performed, and thus a description thereof is omitted.

In other words, in step S352, the lossless decoding section 351 decodes the bitstream (the encoded differential image information) of the enhancement layer supplied from the accumulation buffer 211. In other words, the I picture, the P picture, and the B picture encoded by the lossless encoding section 301 are decoded. At this time, various kinds of information other than the differential image information included in the bitstream, such as the header information, are also decoded. For example, the lossless decoding section 351 parses and separates buffering_period_SEI and layer_buffering_period_SEI, and supplies buffering_period_SEI and layer_buffering_period_SEI to the buffering period SEI decoding section 352.

In step S353, the buffering period SEI decoding section 352 performs a buffering period SEI decoding process. The buffering period SEI decoding process will be described later with reference to FIG. 43.

layer_buffering_period_SEI is decoded in step S353, and the layer_buffering_period_SEI decoded information is supplied to the accumulation buffer 211. Then, the accumulation buffer 211 performs the buffer management based on the layer_buffering_period_SEI decoded information.

<Flow of Buffering Period SEI Decoding Process>

Figure 43:
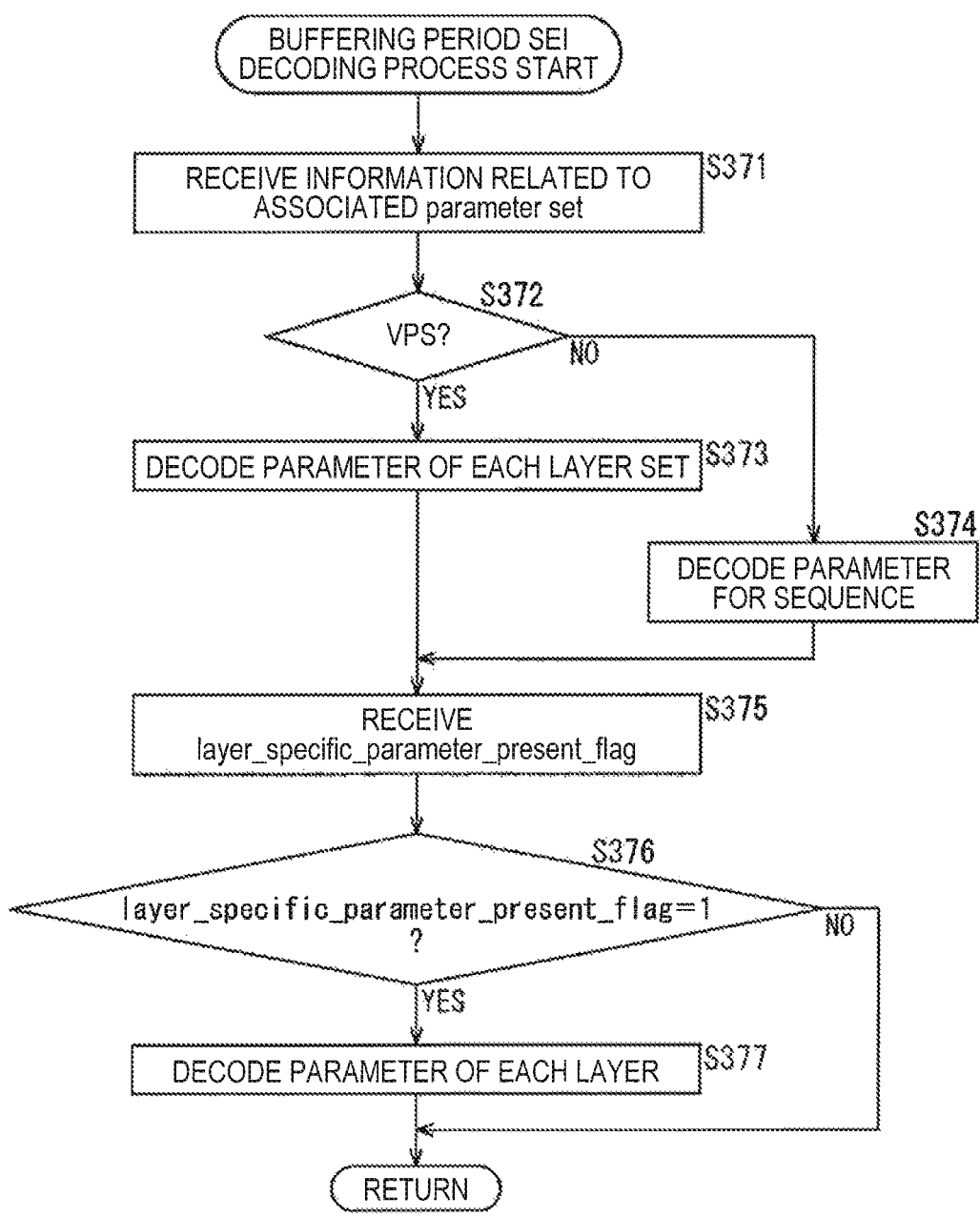
FIG. 43 is a flowchart for describing an example of a buffering period SEI decoding process.

Next, the buffering period SEI decoding process of step S353 of FIG. 42 will be described with reference to a flowchart of FIG. 43.

The lossless decoding section 351 parses and separates buffering_period_SEI and layer_buffering_period_SEI, and supplies the buffering_period_SEI encoded information and associated_parameter_set_flag therein to the associated parameter set decoding section 361. Further, the lossless decoding section 351 supplies the layer_buffering_period_SEI encoded information to the layer buffering period SEI decoding section 363, and supplies layer_specific_parameters_present_flag therein to the layer parameter transmission receiving section 364.

In step S371, the associated parameter set decoding section 361 receives associated_parameter_set_flag serving as the information related to the associated parameter set supplied from the lossless decoding section 351. In step S372, the associated parameter set decoding section 361 determines whether or not the associated parameter set is the VPS with reference to the value of associated_parameter_set_flag supplied from the lossless decoding section 351.

When a value of associated_parameter_set_flag is determined to be 0 in step S372, that is, when the associated parameter set is determined to be the VPS, the process proceeds to step S373. At this time, the associated parameter set decoding section 361 acquires necessary information (information related to the parameter of each layer set) from the buffering_period_SEI encoded information, and supplies the acquired information to the layer buffering period SEI decoding section 363.

In response to this, the layer buffering period SEI decoding section 363 analyzes the layer_buffering_period_SEI encoded information according to associated_parameter_set_flag=1 supplied from the associated parameter set decoding section 361 with reference to the necessary information obtained from the buffering_period_SEI encoded information and the base layer buffer management information of the lossless decoding section (the lower layer) 351 of the base layer image decoding section 201-1. Then, in step S373, the layer buffering period SEI decoding section 363 decodes the parameter of each layer set using the analyzed encoded information. The layer buffering period SEI decoding section 363 supplies the layer_buffering_period_SEI decoded information obtained by decoding the parameter of each layer set to the accumulation buffer 211.

Further, when a value of associated_parameter_set_flag is determined to be 1 in step S372, that is, when an associated parameter set is determined to be the SPS other than the VPS, the process proceeds to step S374. At this time, the associated parameter set decoding section 361 acquires necessary information (information related to the parameter for the sequence) from the buffering_period_SEI encoded information, and supplies the acquired information to the layer buffering period SEI decoding section 363.

In response to this, the layer buffering period SEI decoding section 363 analyzes the layer_buffering_period_SEI encoded information according to associated_parameter_set_flag=0 supplied from the associated parameter set decoding section 361 with reference to the necessary information obtained from the buffering_period_SEI encoded information and the base layer buffer management information of the lossless decoding section (the lower layer) 351 of the base layer image decoding section 201-1. Then, in step S374, the layer buffering period SEI decoding section 363 decodes the parameter for the sequence using the analyzed encoded information. The layer buffering period SEI decoding section 363 supplies the layer_buffering_period_SEI decoded information obtained by decoding the parameter for the sequence to the accumulation buffer 211.

In step S375, the layer parameter transmission receiving section 364 receives layer_specific_parameters_present_flag supplied from the lossless decoding section 351. The layer parameter transmission receiving section 364 analyzes a value of layer_specific_parameters_present_flag, and supplies the analyzed value of layer_specific_parameters_present_flag to the layer buffering period SEI decoding section 363.

In step S376, the layer buffering period SEI decoding section 363 determines whether or not a value of layer_specific_parameters_present_flag is 1. When a value of layer_specific_parameters_present_flag is determined to be 1 in step S376, the process proceeds to step S377.

In step S377, the layer buffering period SEI decoding section 363 analyzes the layer_buffering_period_SEI encoded information, and decodes the parameter of each layer. The layer buffering period SEI decoding section 363 supplies the layer_buffering_period_SEI decoded information obtained by decoding the parameter of each layer to the accumulation buffer 211.

Further, when a value of layer_specific_parameters_present_flag is determined to be 0 in step S376, step S377 is skipped.

Since buffering_period_SEI is associated with a VPS as well as an SPS as described above, when schedule management of an accumulation buffer by buffering_period_SEI is performed, it is possible to manage a layer set as well as a single layer.

Further, since a parameter of each layer is transmitted, it is possible to perform a schedule management both when all layers included in a layer set are decoded by a single decoding device and when respective layers are decoded by separate decoding devices.

<5. Fifth Embodiment>
<About AVC Flag>

Meanwhile, a technique of defining a parameter for the case of ex12 for performing a decoding process of decoding respective layers including a layer to be referred to through separate decoding devices in addition to the case of ex11 of performing a decoding process by a single decoding device as a parameter for buffer management by hdr_parameters( ) in image compression information or sub image compression information as described above with reference to FIG. 6 has been proposed.

However, when the base layer (BL) serving as the lower layer is encoded by the AVC and the enhancement layer (EL) serving as the upper layer is encoded by the HEVC, it is difficult to implement an example of processing the BL and the EL by a single decoding device.

In this regard, in Vps_extention( ), avc_base_layer_flag serving as a flag indicating that the base layer is encoded by the AVC is transmitted. Then, when avc_base_layer_flag=1, parameter transmission of the example of ex11 is prohibited. This is implemented by a semantic restriction. Hereinafter, avc_base_layer_flag is also referred to as an "AVC flag."

<HRD Parameter Encoding Process in Case of AVC Flag>

Figure 44:
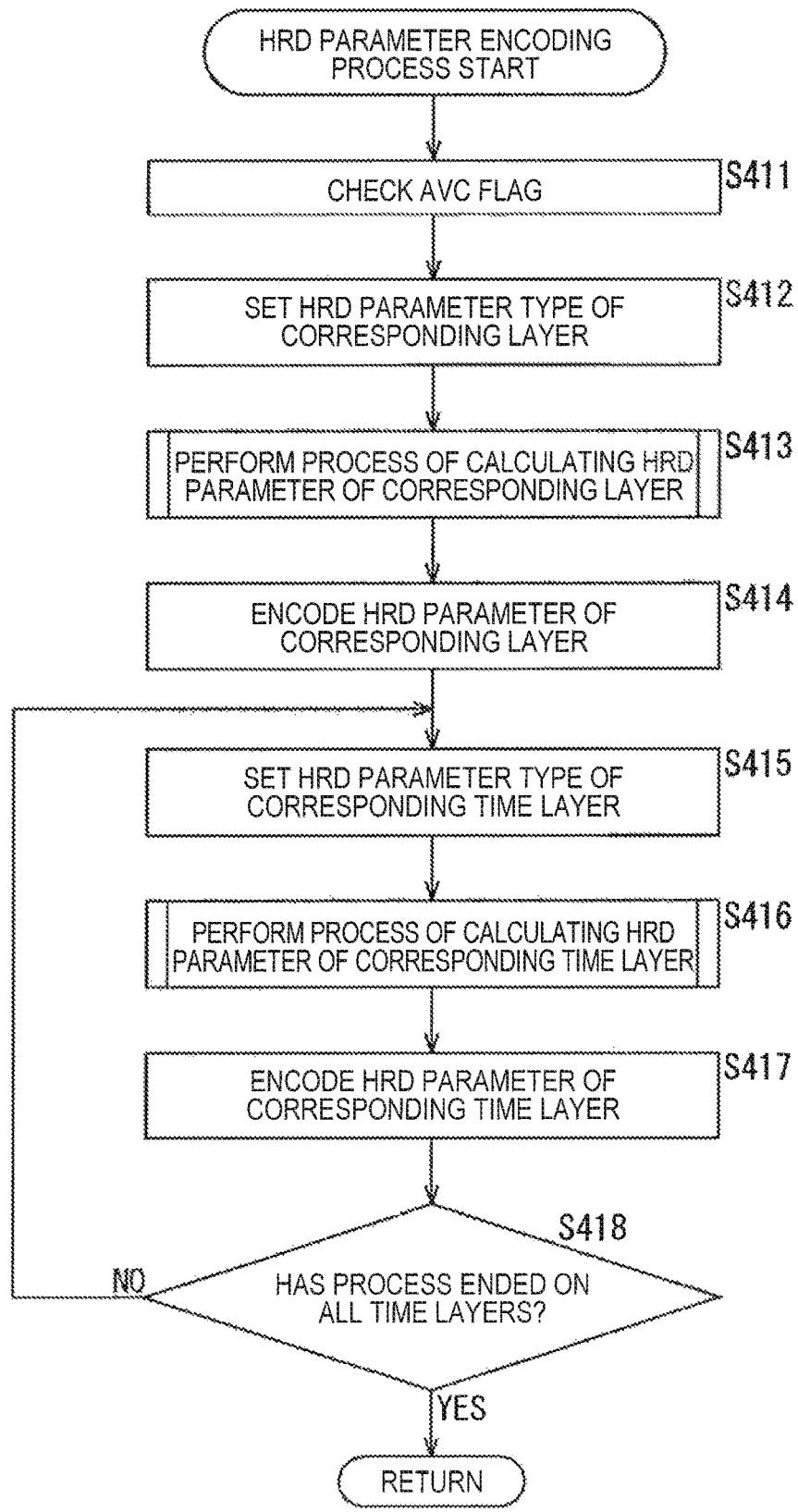
FIG. 44 is a flowchart for describing an example of an HRD parameter encoding process in the case of an AVC flag.

Next, another example of the HRD parameter encoding process of step S124 of FIG. 15 will be described with reference to a flowchart of FIG. 44. In steps S413 to S418 of FIG. 44, basically the same processes as in steps S132 to S137 of FIG. 16 are performed, and thus duplicate description is omitted.

For example, the lossless encoding section 116 of FIG. 12 supplies avc_base_layer_flag of Vps_extention to the HRD parameter type setting section 143.

In step S411, the HRD parameter type setting section 143 checks a value of avc_base_layer_flag (AVC flag) supplied from the lossless encoding section 116.

In step S412, the HRD parameter type setting section 143 sets the HRD parameter type. At this time, when a value of avc_base_layer flag (AVC flag) checked in step S411 is 1, it indicates that the base layer is encoded by the AVC, and a process of performing a decoding process of a corresponding layer and a lower layer is prohibited. Thus, the HRD parameter type setting section 143 sets the HRD parameter type to 1 serving as a value for performing a decoding process of only a corresponding layer.

When a value of avc_base_layer_flag (AVC flag) checked in step S411 is 0, similarly to step S131 of FIG. 16, the HRD parameter type setting section 143 sets the HRD parameter type according to the user's instruction.

The HRD parameter type setting section 143 supplies the flag indicating the set HRD parameter type to the lossless encoding section 116 and the layer HRD parameter calculating section 141.

As described above, in Vps_extention( ), when avc_base layer_flag=1 indicating that the base layer is encoded by the AVC, the HRD parameter type is set to 1 serving as a value for performing a decoding process of only a corresponding layer. Thus, when the base layer is encoded by the AVC, since a process of performing a decoding process of a corresponding layer and a lower layer is prohibited at the decoding side, the decoding side is prevented from receiving an illegal bitstream.

The above semantics can be applied even to the case of buffering_period_SEI.

<Buffering Period SEI Encoding Process in Case of AVC Flag>

Figure 45:
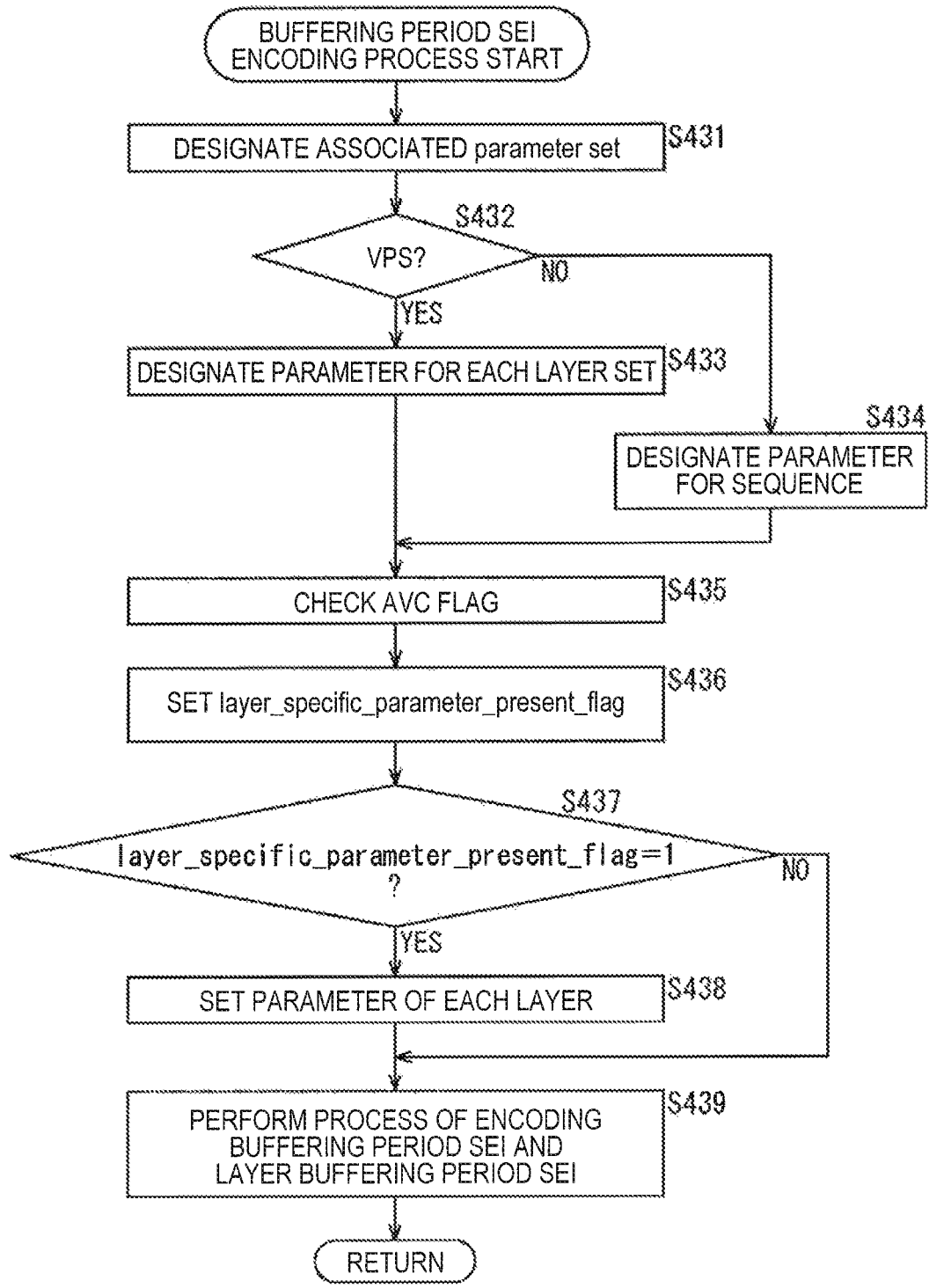
FIG. 45 is a flowchart for describing an example of a buffering period SEI encoding process in the case of an AVC flag.

Next, another example of the buffering period SEI encoding process of step S324 of FIG. 38 will be described with reference to a flowchart of FIG. 45. In steps S431 to S434 and steps S437 to S439 of FIG. 45, basically the same processes as in steps S331 to S334 and S336 to S338 of FIG. 39 are performed, and thus duplicate description is omitted.

For example, the lossless encoding section 301 of FIG. 37 supplies avc_base_layer_flag of Vps_extention to the layer parameter transmission designating section 314.

In step S435, the layer parameter transmission designating section 314 checks a value of avc_base_layer_flag (AVC flag) supplied from the lossless encoding section 301.

In step S436, the layer parameter transmission designating section 314 sets layer_specific_parameters_present_flag. At this time, when a value of avc_base_layer_flag (AVC flag) checked in step S435 is 1, it indicates that the base layer is encoded by the AVC, and a process of performing a decoding process of a corresponding layer and a lower layer is prohibited. Thus, the layer parameter transmission designating section 314 sets layer_specific_parameters_present_flag to 1 serving as a value indicating that a parameter of each layer is set. Further, when layer_specific_parameters_present_flag=1, a parameter accumulated from a lower layer may not be set.

Figure 39:
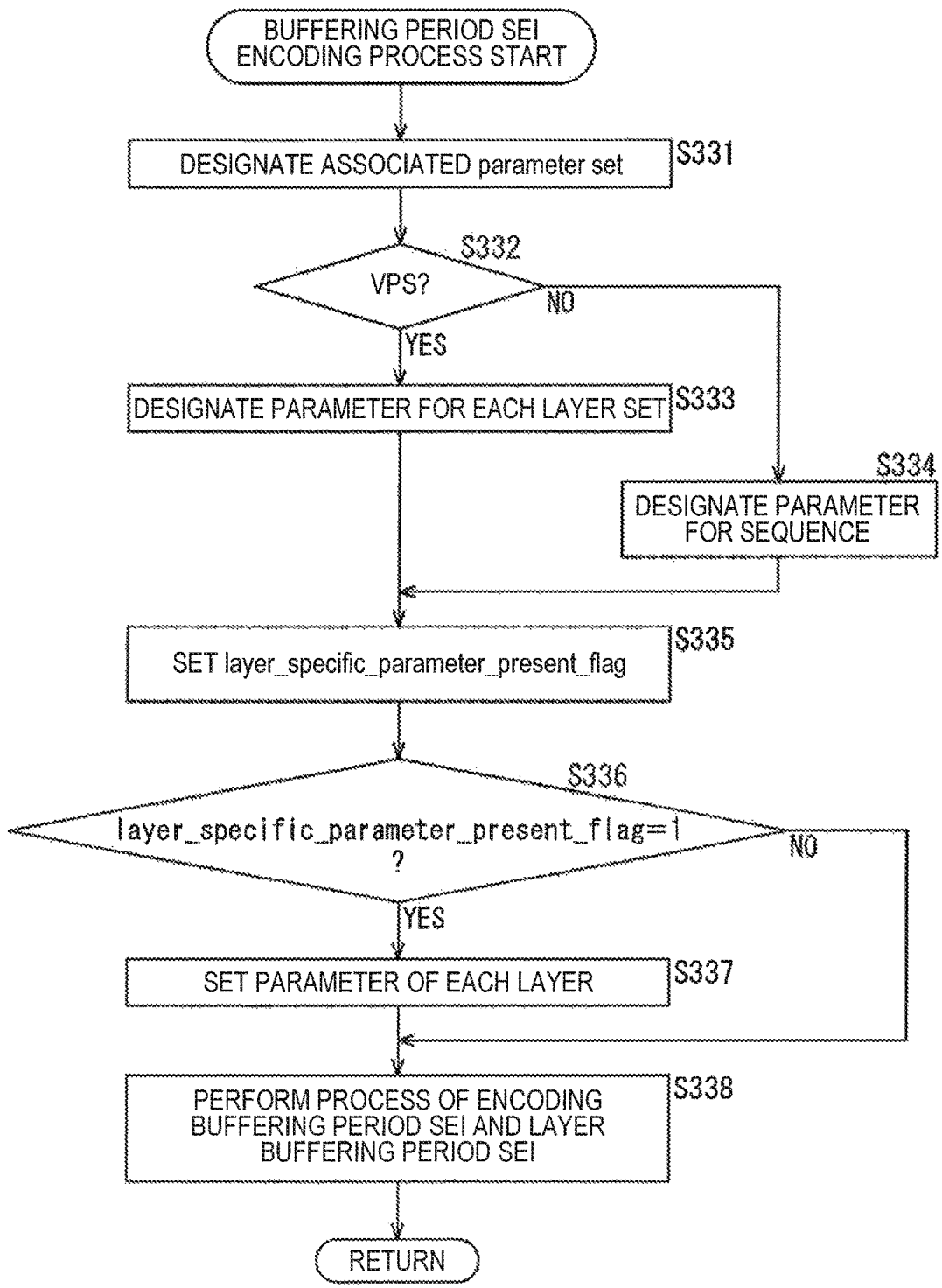
FIG. 39 is a flowchart for describing an example of a buffering period SEI encoding process.

When a value of avc_base_layer flag (AVC flag) checked in step S435 is 0, similarly to step S335 of FIG. 39, the layer parameter transmission designating section 314 sets layer_specific_parameters_present_flag according to the user's operation.

The layer parameter transmission designating section 314 supplies the set value of layer_specific_parameters_present_flag to the lossless encoding section 301 and the layer buffering period SEI setting section 313. Further, the buffer management information in the base layer is supplied from the lossless encoding section 301 of the base layer image encoding section 101-1 to the layer buffering period SEI setting section 313.

As described above, in Vps_extention( ), when avc_base_layer flag=1, layer_specific_parameters_present_flag is set to 1 serving as a value indicating that a parameter of each layer is set. Thus, when the base layer is encoded by the AVC, since a process of performing a decoding process of a corresponding layer and a lower layer is prohibited at the decoding side, the decoding side is prevented from receiving an illegal bitstream.

Although the example in which image data is hierarchized into a plurality of layers by scalable video coding has been described above, the number of layers is arbitrary. For example, some pictures may be hierarchized. Further, although the example in which the enhancement layer is processed with reference to the base layer at the time of encoding and decoding has been described above, the present technology is not limited to this example, and the enhancement layer may be processed with reference to any other processed enhancement layer.

Figure 46:
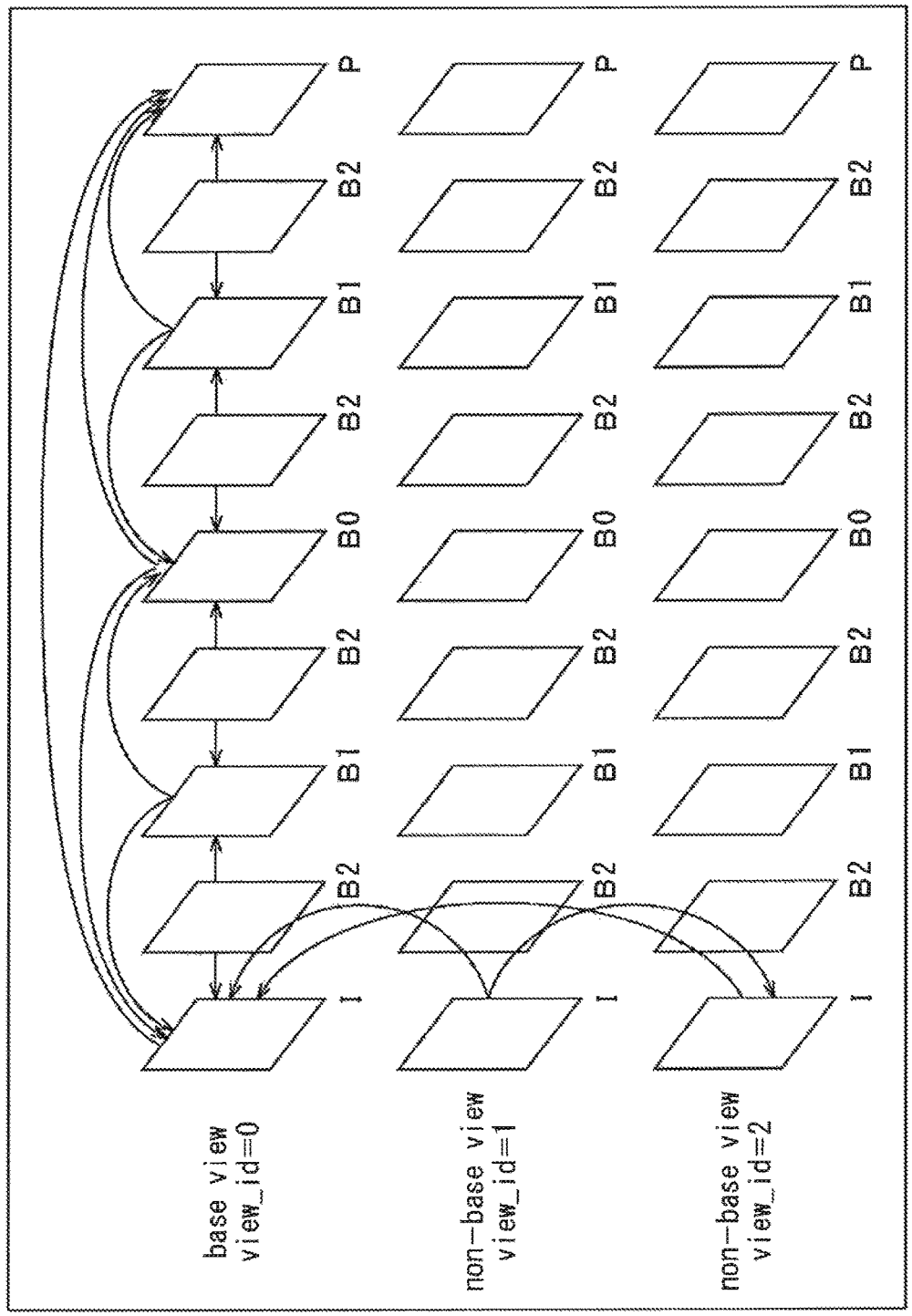
FIG. 46 is a diagram illustrating an example of a multi-view image encoding scheme.

Further, a view in multi-view image encoding and decoding is also included as a layer described above. In other words, the present technology can be applied to multi-view image encoding and multi-view image decoding. FIG. 46 illustrates an example of a multi-view image encoding scheme.

<6. Sixth Embodiment>
[Application to Multi-View Image Encoding and Multi-View Image Decoding]

The above-described series of processes can be applied to multi-view image encoding and multi-view image decoding. FIG. 46 illustrates an example of a multi-view image encoding scheme.

As illustrated in FIG. 46, a multi-view image includes images of a plurality of views. A plurality of views of the multi-view image includes a base view in which encoding and decoding are performed using an image of its own view without using an image of another view and a non-base view in which encoding and decoding are performed using an image of another view. As a non-base view, an image of a base view may be used, and an image of another non-base view may be used.

When the multi-view image of FIG. 46 is encoded or decoded, an image of each view is encoded or decoded, but the methods according to the first and second embodiments may be applied to encoding or decoding of each view. As a result, it is possible to perform a decoding process at a proper timing.

Further, the flags or the parameters used in the methods according to the first and second embodiments may be shared in encoding and decoding of each view. As a result, it is possible to suppress transmission of redundant information and reduce an amount of information to be transmitted (a coding amount) (that is, it is possible to suppress a reduction in encoding efficiency).

More specifically, for example, the HRD parameter type flag, the HRD parameter, or buffering_period_SEI and layer_buffering_period_SEI may be shared in encoding and decoding of each view.

Of course, any other necessary information may also be shared in encoding and decoding of each view.

[Multi-view Image Encoding Device]

Figure 47:
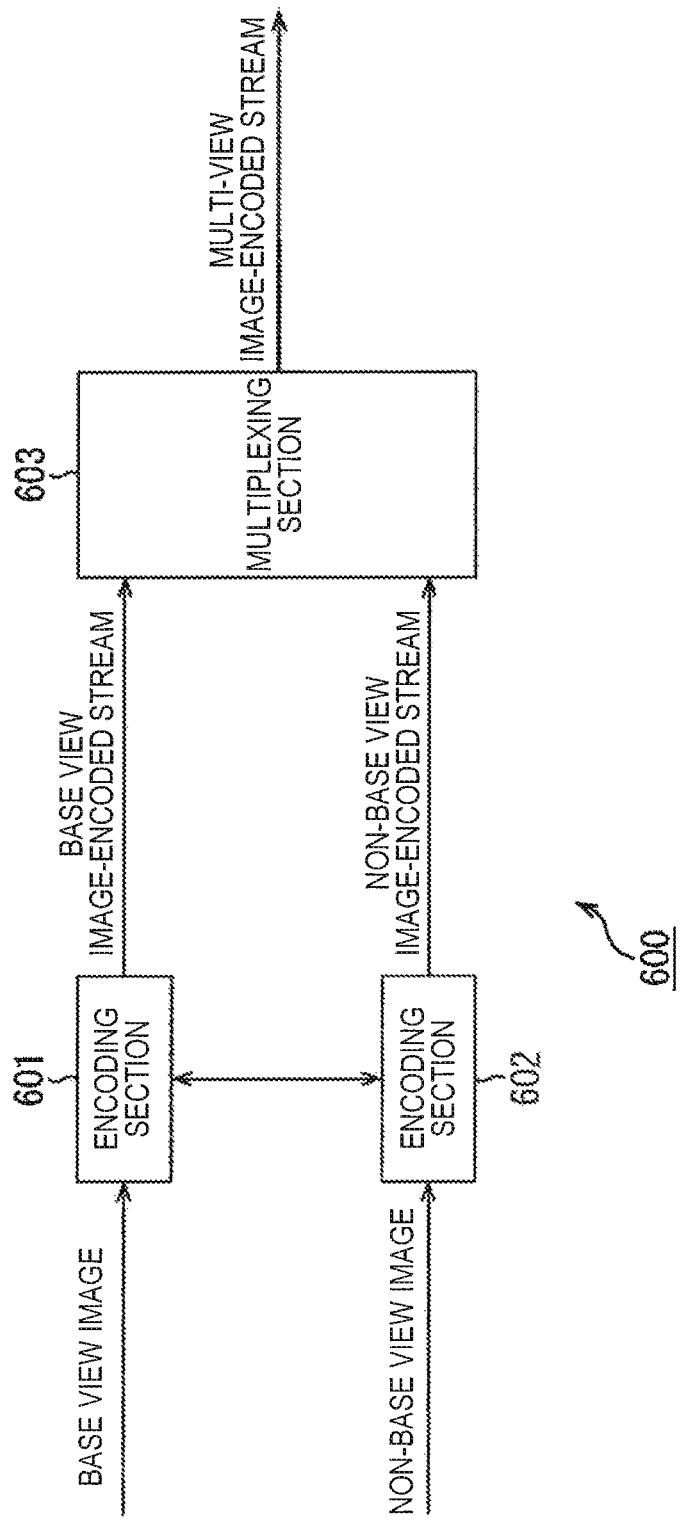
FIG. 47 is a diagram illustrating an example of a main configuration of a multi-view image encoding device to which the present disclosure is applied.

FIG. 47 is a diagram illustrating a multi-view image encoding device which performs the above-described multi-view image encoding. As illustrated in FIG. 47, the multi-view image encoding device 600 has an encoding section 601, an encoding section 602, and a multiplexing section 603.

The encoding section 601 encodes a base view image and generates a base view image encoded stream. The encoding section 602 encodes a non-base view image and generates a non-base view image encoded stream. The multiplexing section 603 multiplexes the base view image encoded stream generated in the encoding section 601 and the non-base view image encoded stream generated in the encoding section 602, and generates a multi-view image encoded stream.

The scalable encoding device 100 (FIG. 10) can be applied to the encoding section 601 and the encoding section 602 of the multi-view image encoding device 600. In other words, it is possible to set the HRD parameter type flag or the HRD parameter for each view in encoding of each view, and it is possible to perform a decoding process at a proper timing. Further, since the encoding section 601 and the encoding section 602 can use the same HRD parameter type flag or the same HRD parameter (that is, can share the flag or the parameter), it is possible to suppress a reduction in encoding efficiency, and it is possible to perform a decoding process at a proper timing. Furthermore, since the same applies to buffering_period_SEI and layer_buffering_period_SEI, it is similarly possible to suppress a reduction in encoding efficiency, and it is possible to perform a decoding process at a proper timing.

[Configuration Example of Multi-view Image Decoding Device]

Figure 48:
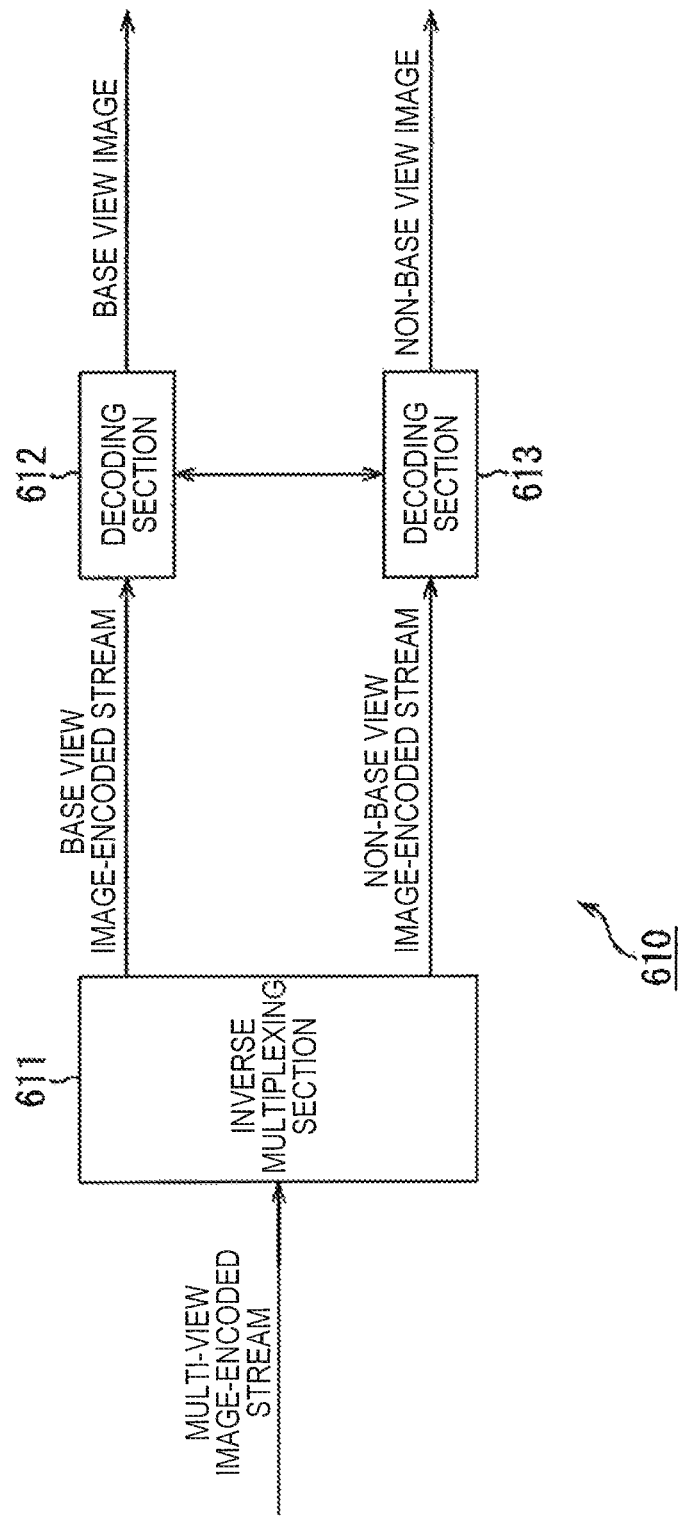
FIG. 48 is a diagram illustrating an example of a main configuration of a multi-view image decoding device to which the present disclosure is applied.

FIG. 48 is a diagram illustrating the multi-view image decoding device for performing the above-described multi-view image decoding. As illustrated in FIG. 39, the multi-view image decoding device 610 has an inverse multiplexing section 611, a decoding section 612, and a decoding section 613.

The inverse multiplexing section 611 inversely multiplexes a multi-view image encoded stream in which a base view image encoded stream and a non-base view image encoded stream are multiplexed, and extracts the base view image encoded stream and the non-base view image encoded stream. The decoding section 612 decodes the base view image encoded stream extracted by the inverse multiplexing section 611 and obtains a base view image. The decoding section 613 decodes the non-base view image encoded stream extracted by the inverse multiplexing section 611 and obtains a non-base view image.

The scalable decoding device 200 (FIG. 20) can be applied to the decoding section 612 and the decoding section 613 of the multi-view image decoding device 610. In other words, it is possible to set the HRD parameter type flag or the HRD parameter for each view in encoding of each view, and it is possible to perform a decoding process at a proper timing. Further, since the decoding section 612 and the decoding section 613 can use the same HRD parameter type flag or the same HRD parameter (that is, can share the flag or the parameter), it is possible to suppress a reduction in encoding efficiency, and it is possible to perform a decoding process at a proper timing. Furthermore, since the same applies to buffering_period_SEI and layer_buffering_period_SEI, it is similarly possible to suppress a reduction in encoding efficiency, and it is possible to perform a decoding process at a proper timing.

As described above, the present technology can be applied to all image encoding devices and all image decoding devices based on scalable encoding and decoding.

For example, the present technology can be applied to an image encoding device and an image decoding device used when image information (bitstream) compressed by an orthogonal transform such as a discrete cosine transform and motion compensation as in MPEG and H.26x is received via a network medium such as satellite broadcasting, cable television, the Internet, or a mobile telephone. Further, the present technology can be applied to an image encoding device and an image decoding device used when processing is performed on a storage medium such as an optical disc, a magnetic disk, or a flash memory. Furthermore, the present technology can be applied even to an orthogonal transform device or an inverse orthogonal transform device equipped in the image encoding device, the image decoding device, or the like.

<7. Seventh Embodiment>

[Computer]

The above described series of processes can be executed by hardware or can be executed by software. When the series of processes are to be performed by software, the programs forming the software are installed into a computer. Here, a computer includes a computer which is incorporated in dedicated hardware or a general-purpose personal computer (PC) which can execute various functions by installing various programs into the computer, for example.

Figure 49:
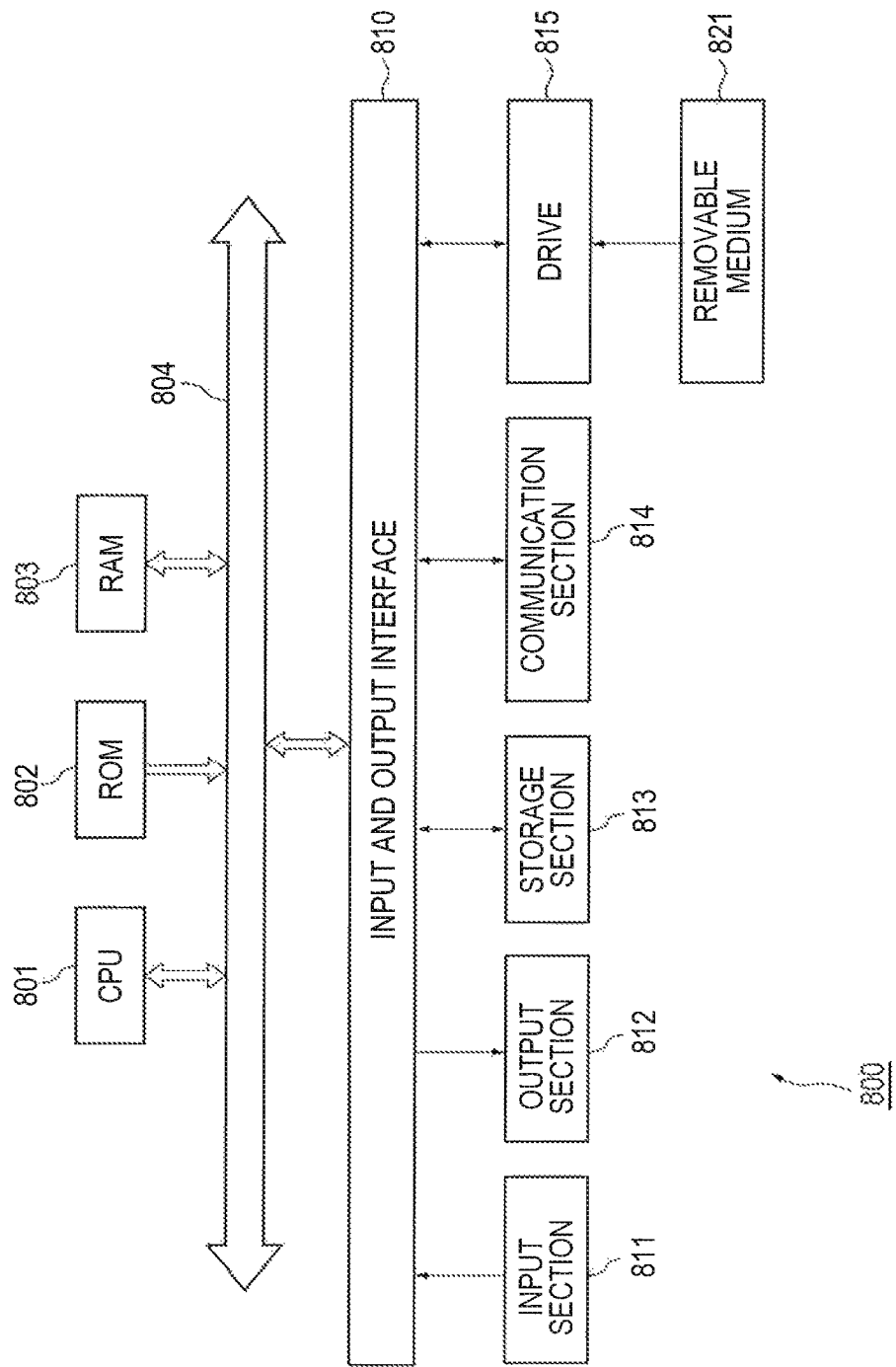
FIG. 49 is a block diagram illustrating an example of a main configuration of a computer.

FIG. 49 is a block diagram illustrating a configuration example of hardware of a computer for executing the above-described series of processes through a program.

In a computer 800 shown in FIG. 49, a central processing unit (CPU) 801, a read only memory (ROM) 802, and a random access memory (RAM) 803 are connected to one another by a bus 804.

An input and output interface (I/F) 810 is further connected to the bus 804. An input section 811, an output section 812, a storage section 813, a communication section 814, and a drive 815 are connected to the input and output I/F 810.

The input section 811 is formed with a keyboard, a mouse, a microphone, a touch panel, an input terminal, and the like. The output section 812 is formed with a display, a speaker, an output terminal, and the like. The storage section 813 is formed with a hard disk, a nonvolatile memory, or the like. The communication section 814 is formed with a network interface or the like. The drive 815 drives a removable medium 821 such as a magnetic disk, an optical disk, a magneto-optical disk, or a semiconductor memory.

In the computer configured as described above, the CPU 801 loads the programs stored in the storage section 813 into the RAM 803 via the input and output I/F 810 and the bus 804, and executes the programs, so that the above described series of processes are performed. The RAM 803 also stores data necessary for the CPU 801 to execute the various processes.

The program executed by the computer 800 (the CPU 801) may be provided by being recorded on the removable medium 821 as a packaged medium or the like. The program can also be applied via a wired or wireless transfer medium, such as a local area network, the Internet, or a digital satellite broadcast.

In the computer, by loading the removable medium 821 into the drive 815, the program can be installed into the storage section 813 via the input and output I/F 810. It is also possible to receive the program from a wired or wireless transfer medium using the communication section 814 and install the program into the storage section 813. As another alternative, the program can be installed in advance into the ROM 802 or the storage section 813.

It should be noted that the program executed by a computer may be a program that is processed in time series according to the sequence described in this specification or a program that is processed in parallel or at necessary timing such as upon calling.

In the present disclosure, steps of describing the program to be recorded on the recording medium may include processing performed in time-series according to the description order and processing not processed in time-series but performed in parallel or individually.

In addition, in this disclosure, a system means a set of a plurality of elements (devices, modules (parts), or the like) regardless of whether or not all elements are arranged in a single housing. Thus, both a plurality of devices that are accommodated in separate housings and connected via a network and a single device in which a plurality of modules are accommodated in a single housing are systems.

Further, an element described as a single device (or processing unit) above may be divided and configured as a plurality of devices (or processing units). On the contrary, elements described as a plurality of devices (or processing units) above may be configured collectively as a single device (or processing unit). Further, an element other than those described above may be added to each device (or processing unit). Furthermore, a part of an element of a given device (or processing unit) may be included in an element of another device (or another processing unit) as long as the configuration or operation of the system as a whole is substantially the same.

The preferred embodiments of the present disclosure have been described above with reference to the accompanying drawings, whilst the present invention is not limited to the above examples, of course. A person skilled in the art may find various alterations and modifications within the scope of the appended claims, and it should be understood that they will naturally come under the technical scope of the present disclosure.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

The image encoding device and the image decoding device according to the embodiment may be applied to various electronic devices such as transmitters and receivers for satellite broadcasting, cable broadcasting such as cable TV, distribution on the Internet, distribution to terminals via cellular communication and the like, recording devices that record images in a medium such as optical discs, magnetic disks and flash memory, and reproduction devices that reproduce images from such storage medium. Four applications will be described below.

<8. Applications>

[First Application: Television Receivers]

Figure 50:
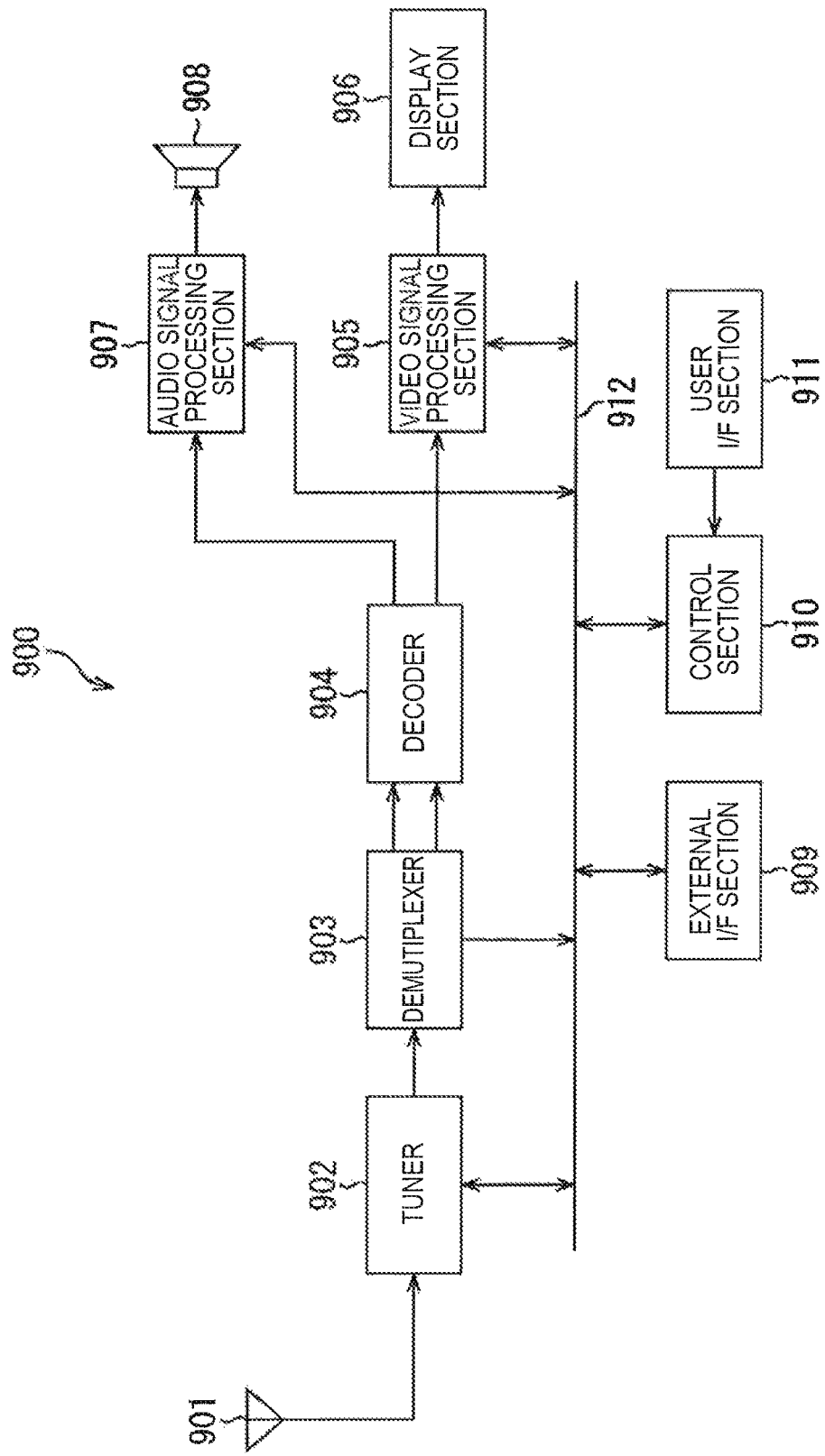
FIG. 50 is a block diagram illustrating an example of a schematic configuration of a television device.

FIG. 50 illustrates an example of a schematic configuration of a television device to which the embodiment is applied. A television device 900 includes an antenna 901, a tuner 902, a demultiplexer 903, a decoder 904, an video signal processing section 905, a display section 906, an audio signal processing section 907, a speaker 908, an external I/F 909, a control section 910, a user I/F 911, and a bus 912.

The tuner 902 extracts a signal of a desired channel from broadcast signals received via the antenna 901, and demodulates the extracted signal. The tuner 902 then outputs an encoded bitstream obtained through the demodulation to the demultiplexer 903. That is, the tuner 902 serves as a transmission unit of the television device 900 for receiving an encoded stream in which an image is encoded.

The demultiplexer 903 demultiplexes the encoded bitstream to obtain a video stream and an audio stream of a program to be viewed, and outputs each stream obtained through the demultiplexing to the decoder 904. The demultiplexer 903 also extracts auxiliary data such as electronic program guides (EPGs) from the encoded bitstream, and supplies the extracted data to the control section 910. Additionally, the demultiplexer 903 may perform descrambling when the encoded bitstream has been scrambled.

The decoder 904 decodes the video stream and the audio stream input from the demultiplexer 903. The decoder 904 then outputs video data generated in the decoding process to the video signal processing section 905. The decoder 904 also outputs the audio data generated in the decoding process to the audio signal processing section 907.

The video signal processing section 905 reproduces the video data input from the decoder 904, and causes the display section 906 to display the video. The video signal processing section 905 may also cause the display section 906 to display an application screen supplied via a network. Further, the video signal processing section 905 may perform an additional process such as noise removal, for example, on the video data in accordance with the setting. Furthermore, the video signal processing section 905 may generate an image of a graphical user I/F (GUI) such as a menu, a button and a cursor, and superimpose the generated image on an output image.

The display section 906 is driven by a drive signal supplied from the video signal processing section 905, and displays a video or an image on a video screen of a display device (e.g. liquid crystal display, plasma display, organic electroluminescence display (OLED), etc.).

The audio signal processing section 907 performs a reproduction process such as D/A conversion and amplification on the audio data input from the decoder 904, and outputs a sound from the speaker 908. The audio signal processing section 907 may also perform an additional process such as noise removal on the audio data.

The external I/F 909 is an I/F for connecting the television device 900 to an external device or a network. For example, a video stream or an audio stream received via the external I/F 909 may be decoded by the decoder 904. That is, the external I/F 909 also serves as a transmission unit of the television device 900 for receiving an encoded stream in which an image is encoded.

The control section 910 includes a processor such as a central processing unit (CPU), and a memory such as random access memory (RAM) and read only memory (ROM). The memory stores a program to be executed by the CPU, program data, EPG data, data acquired via a network, and the like. The program stored in the memory is read out and executed by the CPU at the time of activation of the television device 900, for example. The CPU controls the operation of the television device 900, for example, in accordance with an operation signal input from the user I/F 911 by executing the program.

The user I/F 911 is connected to the control section 910. The user I/F 911 includes, for example, a button and a switch used for a user to operate the television device 900, and a receiving section for a remote control signal. The user I/F 911 detects an operation of a user via these structural elements, generates an operation signal, and outputs the generated operation signal to the control section 910.

The bus 912 connects the tuner 902, the demultiplexer 903, the decoder 904, the video signal processing section 905, the audio signal processing section 907, the external I/F 909, and the control section 910 to each other.

The decoder 904 has a function of the scalable decoding device 200 according to the embodiment in the television device 900 configured in this manner. Thus, when an image is decoded in the television device 900, it is possible to perform a decoding process at a proper timing.

[Second Application: Mobile Phones]

Figure 51:
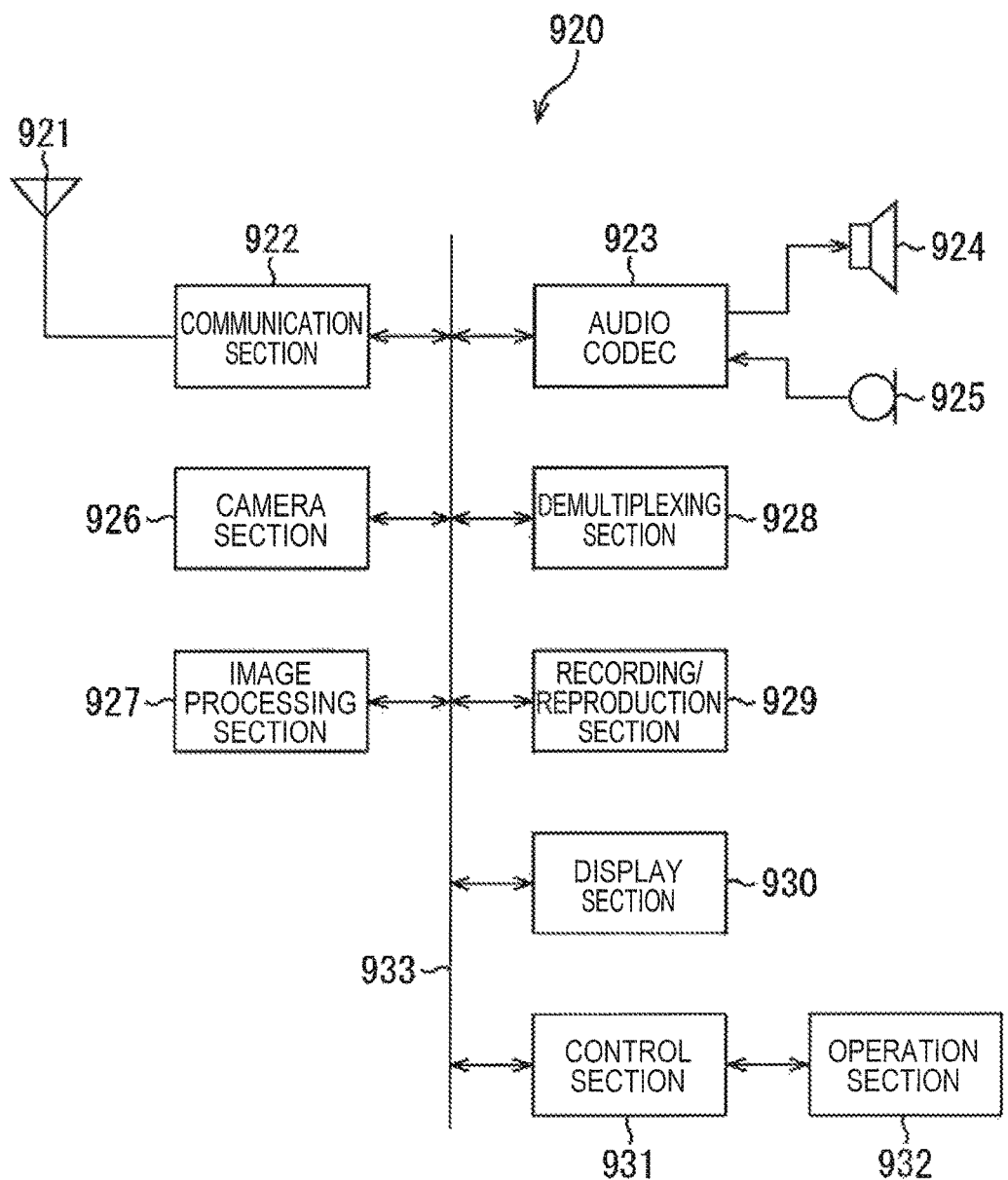
FIG. 51 is a block diagram illustrating an example of a schematic configuration of a mobile phone.

FIG. 51 illustrates an example of a schematic configuration of a mobile phone to which the embodiment is applied. A mobile phone 920 includes an antenna 921, a communication section 922, an audio codec 923, a speaker 924, a microphone 925, a camera section 926, an image processing section 927, a demultiplexing section 928, a recording/reproduction section 929, a display section 930, a control section 931, an operation section 932, and a bus 933.

The antenna 921 is connected to the communication section 922. The speaker 924 and the microphone 925 are connected to the audio codec 923. The operation section 932 is connected to the control section 931. The bus 933 connects the communication section 922, the audio codec 923, the camera section 926, the image processing section 927, the demultiplexing section 928, the recording/reproduction section 929, the display section 930, and the control section 931 to each other.

The mobile phone 920 performs an operation such as transmission and reception of an audio signal, transmission and reception of email or image data, image capturing, and recording of data in various operation modes including an audio call mode, a data communication mode, an image capturing mode, and a videophone mode.

An analogue audio signal generated by the microphone 925 is supplied to the audio codec 923 in the audio call mode. The audio codec 923 converts the analogue audio signal into audio data, has the converted audio data subjected to the A/D conversion, and compresses the converted data. The audio codec 923 then outputs the compressed audio data to the communication section 922. The communication section 922 encodes and modulates the audio data, and generates a transmission signal. The communication section 922 then transmits the generated transmission signal to a base station (not illustrated) via the antenna 921. The communication section 922 also amplifies a wireless signal received via the antenna 921 and converts the frequency of the wireless signal to acquire a received signal. The communication section 922 then demodulates and decodes the received signal, generates audio data, and outputs the generated audio data to the audio codec 923. The audio codec 923 extends the audio data, has the audio data subjected to the D/A conversion, and generates an analogue audio signal. The audio codec 923 then supplies the generated audio signal to the speaker 924 to output a sound.

The control section 931 also generates text data in accordance with an operation made by a user via the operation section 932, the text data, for example, composing email. Moreover, the control section 931 causes the display section 930 to display the text. Furthermore, the control section 931 generates email data in accordance with a transmission instruction from a user via the operation section 932, and outputs the generated email data to the communication section 922. The communication section 922 encodes and modulates the email data, and generates a transmission signal. The communication section 922 then transmits the generated transmission signal to a base station (not illustrated) via the antenna 921. The communication section 922 also amplifies a wireless signal received via the antenna 921 and converts the frequency of the wireless signal to acquire a received signal. The communication section 922 then demodulates and decodes the received signal to restore the email data, and outputs the restored email data to the control section 931. The control section 931 causes the display section 930 to display the content of the email, and also causes the storage medium of the recording/reproduction section 929 to store the email data.

The recording/reproduction section 929 includes a readable and writable storage medium. For example, the storage medium may be a built-in storage medium such as RAM and flash memory, or an externally mounted storage medium such as hard disks, magnetic disks, magneto-optical disks, optical discs, universal serial bus (USB) memory, and memory cards.

Furthermore, the camera section 926, for example, captures an image of a subject to generate image data, and outputs the generated image data to the image processing section 927 in the image capturing mode. The image processing section 927 encodes the image data input from the camera section 926, and causes the storage medium of the storage/reproduction section 929 to store the encoded stream.

Furthermore, the demultiplexing section 928, for example, multiplexes a video stream encoded by the image processing section 927 and an audio stream input from the audio codec 923, and outputs the multiplexed stream to the communication section 922 in the videophone mode. The communication section 922 encodes and modulates the stream, and generates a transmission signal. The communication section 922 then transmits the generated transmission signal to a base station (not illustrated) via the antenna 921. The communication section 922 also amplifies a wireless signal received via the antenna 921 and converts the frequency of the wireless signal to acquire a received signal. These transmission signal and received signal may include an encoded bitstream. The communication section 922 then demodulates and decodes the received signal to restore the stream, and outputs the restored stream to the demultiplexing section 928. The demultiplexing section 928 demultiplexes the input stream to obtain a video stream and an audio stream, and outputs the video stream to the image processing section 927 and the audio stream to the audio codec 923. The image processing section 927 decodes the video stream, and generates video data. The video data is supplied to the display section 930, and a series of images is displayed by the display section 930. The audio codec 923 extends the audio stream, has the audio stream subjected to the D/A conversion, and generates an analogue audio signal. The audio codec 923 then supplies the generated audio signal to the speaker 924, and causes a sound to be output.

The image processing section 927 has functions of the scalable encoding device 100 and the scalable decoding device 200 according to the embodiment in the mobile phone 920 configured in this manner. Thus, when an image is encoded or decoded in the mobile phone 920, it is possible to perform a decoding process at a proper timing.

[Third Application: Recording/Reproduction Device]

Figure 52:
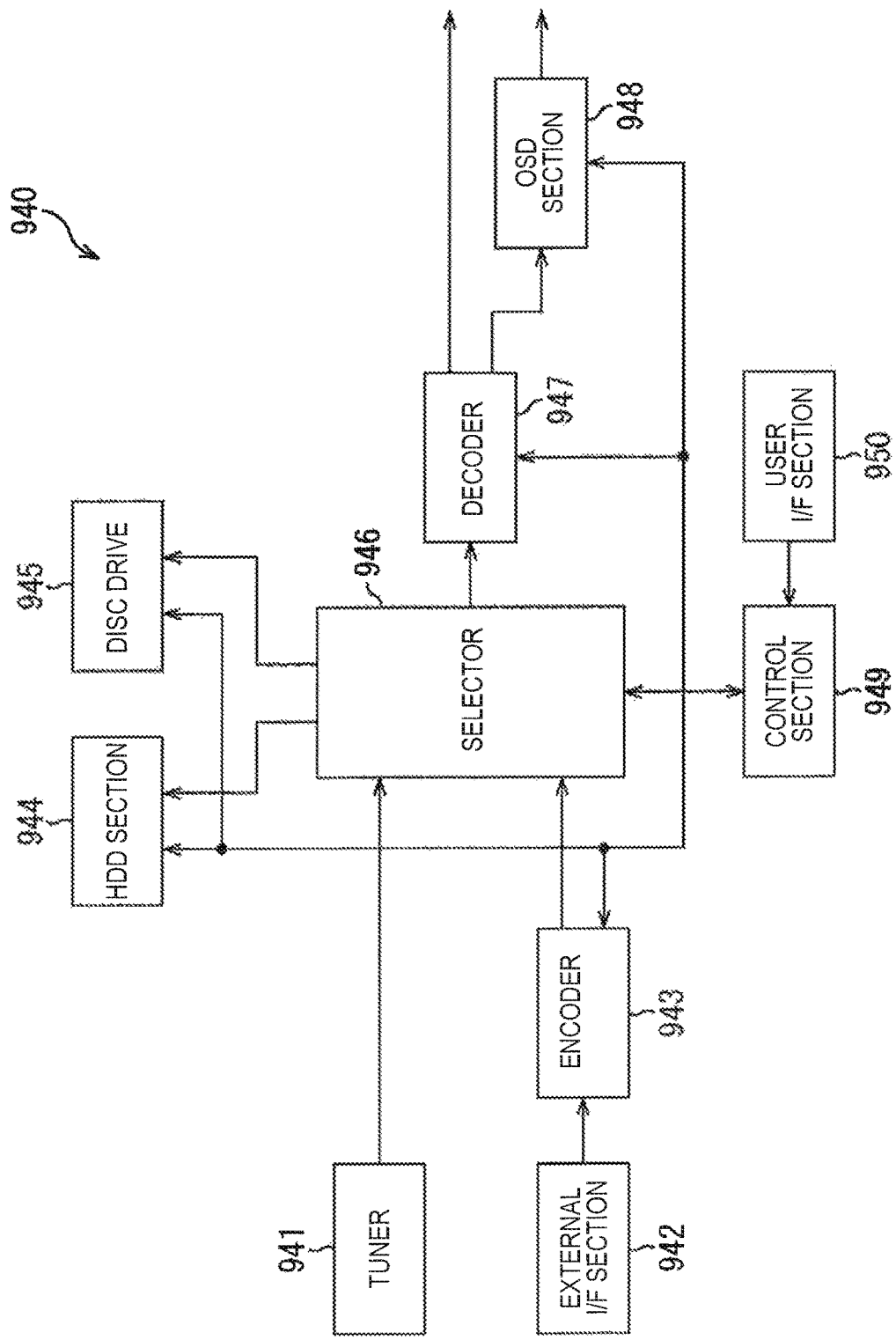
FIG. 52 is a block diagram illustrating an example of a schematic configuration of a recording/reproduction device.

FIG. 52 illustrates an example of a schematic configuration of a recording/reproduction device to which the embodiment is applied. A recording/reproduction device 940, for example, encodes audio data and video data of a received broadcast program and records the encoded audio data and the encoded video data in a recording medium. For example, the recording/reproduction device 940 may also encode audio data and video data acquired from another device and record the encoded audio data and the encoded video data in a recording medium. Furthermore, the recording/reproduction device 940, for example, uses a monitor or a speaker to reproduce the data recorded in the recording medium in accordance with an instruction of a user. At this time, the recording/reproduction device 940 decodes the audio data and the video data.

The recording/reproduction device 940 includes a tuner 941, an external I/F 942, an encoder 943, a hard disk drive (HDD) 944, a disc drive 945, a selector 946, a decoder 947, an on-screen display (OSD) 948, a control section 949, and a user I/F 950.

The tuner 941 extracts a signal of a desired channel from broadcast signals received via an antenna (not shown), and demodulates the extracted signal. The tuner 941 then outputs an encoded bitstream obtained through the demodulation to the selector 946. That is, the tuner 941 serves as a transmission unit of the recording/reproduction device 940.

The external I/F 942 is an I/F for connecting the recording/reproduction device 940 to an external device or a network. For example, the external I/F 942 may be an Institute of Electrical and Electronics Engineers (IEEE) 1394 I/F, a network I/F, an USB I/F, a flash memory I/F, or the like. For example, video data and audio data received via the external I/F 942 are input to the encoder 943. That is, the external I/F 942 serves as a transmission unit of the recording/reproduction device 940.

When the video data and the audio data input from the external I/F 942 have not been encoded, the encoder 943 encodes the video data and the audio data. The encoder 943 then outputs an encoded bitstream to the selector 946.

The HDD 944 records, in an internal hard disk, the encoded bitstream in which content data of a video and a sound is compressed, various programs, and other pieces of data. The HDD 944 also reads out these pieces of data from the hard disk at the time of reproducing a video or a sound.

The disc drive 945 records and reads out data in a recording medium that is mounted. The recording medium that is mounted on the disc drive 945 may be, for example, a DVD disc (DVD-Video, DVD-RAM, DVD-R, DVD-RW, a DVD+R, DVD+RW, etc.), a Blu-ray (registered trademark) disc, or the like.

The selector 946 selects, at the time of recording a video or a sound, an encoded bitstream input from the tuner 941 or the encoder 943, and outputs the selected encoded bitstream to the HDD 944 or the disc drive 945. The selector 946 also outputs, at the time of reproducing a video or a sound, an encoded bitstream input from the HDD 944 or the disc drive 945 to the decoder 947.

The decoder 947 decodes the encoded bitstream, and generates video data and audio data. The decoder 947 then outputs the generated video data to the OSD 948. The decoder 904 also outputs the generated audio data to an external speaker.

The OSD 948 reproduces the video data input from the decoder 947, and displays a video. The OSD 948 may also superimpose an image of a GUI such as a menu, a button, and a cursor on a displayed video.

The control section 949 includes a processor such as a CPU, and a memory such as RAM and ROM. The memory stores a program to be executed by the CPU, program data, and the like. For example, a program stored in the memory is read out and executed by the CPU at the time of activation of the recording/reproduction device 940. The CPU controls the operation of the recording/reproduction device 940, for example, in accordance with an operation signal input from the user I/F 950 by executing the program.

The user I/F 950 is connected to the control section 949. The user I/F 950 includes, for example, a button and a switch used for a user to operate the recording/reproduction device 940, and a receiving section for a remote control signal. The user I/F 950 detects an operation made by a user via these structural elements, generates an operation signal, and outputs the generated operation signal to the control section 949.

The encoder 943 has a function of the scalable encoding device 100 according to the embodiment in the recording/reproduction device 940 configured in this manner. The decoder 947 also has a function of the scalable decoding device 200 according to the embodiment. Thus, when an image is encoded or decoded in the recording/reproduction device 940, it is possible to perform a decoding process at a proper timing.

[Fourth Application: Image Capturing Device]

Figure 53:
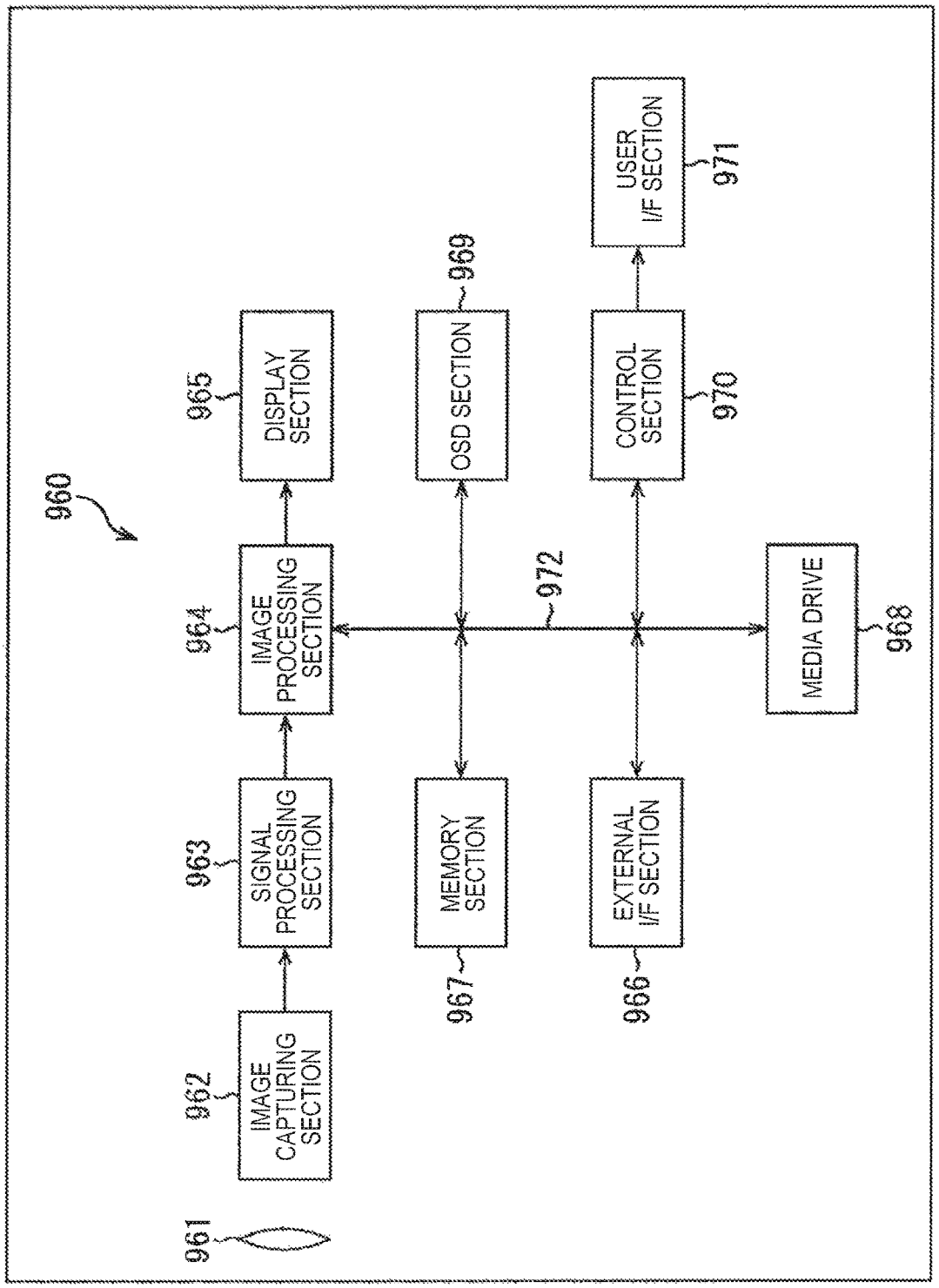
FIG. 53 is a block diagram illustrating an example of a schematic configuration of an image capturing device.

FIG. 53 illustrates an example of a schematic configuration of an image capturing device to which the embodiment is applied. An image capturing device 960 captures an image of a subject to generate an image, encodes the image data, and records the image data in a recording medium.

The image capturing device 960 includes an optical block 961, an image capturing section 962, a signal processing section 963, an image processing section 964, a display section 965, an external I/F 966, a memory 967, a media drive 968, an OSD 969, a control section 970, a user I/F 971, and a bus 972.

The optical block 961 is connected to the image capturing section 962. The image capturing section 962 is connected to the signal processing section 963. The display section 965 is connected to the image processing section 964. The user I/F 971 is connected to the control section 970. The bus 972 connects the image processing section 964, the external I/F 966, the memory 967, the media drive 968, the OSD 969, and the control section 970 to each other.

The optical block 961 includes a focus lens, an aperture stop mechanism, and the like. The optical block 961 forms an optical image of a subject on an image capturing surface of the image capturing section 962. The image capturing section 962 includes an image sensor such as a charge coupled device (CCD) and a complementary metal oxide semiconductor (CMOS), and converts the optical image formed on the image capturing surface into an image signal which is an electrical signal through photoelectric conversion. The image capturing section 962 then outputs the image signal to the signal processing section 963.

The signal processing section 963 performs various camera signal processes such as knee correction, gamma correction, and color correction on the image signal input from the image capturing section 962. The signal processing section 963 outputs the image data subjected to the camera signal process to the image processing section 964.

The image processing section 964 encodes the image data input from the signal processing section 963, and generates encoded data. The image processing section 964 then outputs the generated encoded data to the external I/F 966 or the media drive 968. The image processing section 964 also decodes encoded data input from the external I/F 966 or the media drive 968, and generates image data. The image processing section 964 then outputs the generated image data to the display section 965. The image processing section 964 may also output the image data input from the signal processing section 963 to the display section 965, and cause the image to be displayed. Furthermore, the image processing section 964 may superimpose data for display acquired from the OSD 969 on an image to be output to the display section 965.

The OSD 969 generates an image of a GUI such as a menu, a button, and a cursor, and outputs the generated image to the image processing section 964.

The external I/F 966 is configured, for example, as an USB input and output terminal. The external I/F 966 connects the image capturing device 960 and a printer, for example, at the time of printing an image. A drive is further connected to the external I/F 966 as needed. A removable medium such as magnetic disks and optical discs is mounted on the drive, and a program read out from the removable medium may be installed in the image capturing device 960. Furthermore, the external I/F 966 may be configured as a network IF to be connected to a network such as a LAN and the Internet. That is, the external I/F 966 serves as a transmission unit of the image capturing device 960.

A recording medium to be mounted on the media drive 968 may be a readable and writable removable medium such as magnetic disks, magneto-optical disks, optical discs, and semiconductor memory. The recording medium may also be fixedly mounted on the media drive 968, configuring a non-transportable storage section such as built-in hard disk drives or a solid state drives (SSDs).

The control section 970 includes a processor such as a CPU, and a memory such as RAM and ROM. The memory stores a program to be executed by the CPU, program data, and the like. A program stored in the memory is read out and executed by the CPU, for example, at the time of activation of the image capturing device 960. The CPU controls the operation of the image capturing device 960, for example, in accordance with an operation signal input from the user I/F 971 by executing the program.

The user I/F 971 is connected to the control section 970. The user I/F 971 includes, for example, a button, a switch, and the like used for a user to operate the image capturing device 960. The user I/F 971 detects an operation made by a user via these structural elements, generates an operation signal, and outputs the generated operation signal to the control section 970.

The image processing section 964 has a function of the scalable encoding device 100 and the scalable decoding device 200 according to the embodiment in the image capturing device 960 configured in this manner. Thus, when an image is encoded is decoded in the image capturing device 960, it is possible to perform a decoding process at a proper timing.

<9. Application Example of Scalable Video Coding>

[First System]

Next, a specific example of using scalable encoded data, in which a scalable video coding (hierarchical coding) is performed, will be described. The scalable video coding, for example, is used for selection of data to be transmitted as examples illustrated in FIG. 54.

Figure 54:
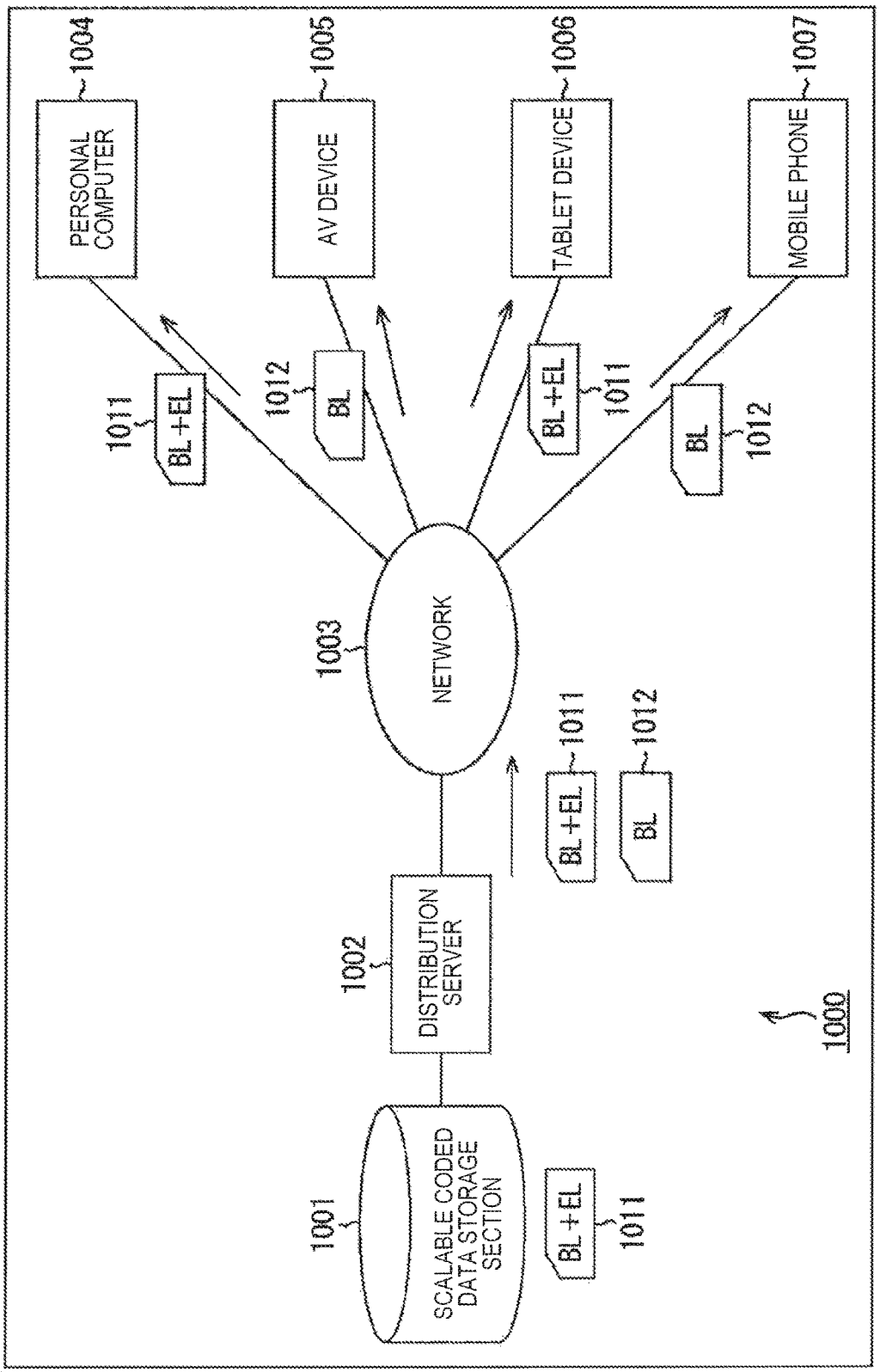
FIG. 54 is a block diagram illustrating an example of using scalable video coding.

In a data transmission system 1000 illustrated in FIG. 54, a distribution server 1002 reads scalable encoded data stored in a scalable encoded data storage section 1001, and distributes the scalable encoded data to a terminal device such as a PC 1004, an AV device 1005, a tablet device 1006, or a mobile phone 1007 via a network 1003.

At this time, the distribution server 1002 selects and transmits encoded data having proper quality according to capability of the terminal device, communication environment, or the like. Even when the distribution server 1002 transmits unnecessarily high-quality data, a high-quality image is not necessarily obtainable in the terminal device and it may be a cause of occurrence of a delay or an overflow. In addition, a communication band may be unnecessarily occupied or a load of the terminal device may be unnecessarily increased. In contrast, even when the distribution server 1002 transmits unnecessarily low quality data, an image with a sufficient quality may not be obtained. Thus, the distribution server 1002 appropriately reads and transmits the scalable encoded data stored in the scalable encoded data storage section 1001 as the encoded data having a proper quality according to the capability of the terminal device, the communication environment, or the like.

For example, the scalable encoded data storage section 1001 is configured to store scalable encoded data (BL+EL) 1011 in which the scalable video coding is performed. The scalable encoded data (BL+EL) 1011 is encoded data including both a base layer and an enhancement layer, and is data from which a base layer image and an enhancement layer image can be obtained by performing decoding.

The distribution server 1002 selects an appropriate layer according to the capability of the terminal device for transmitting data, the communication environment, or the like, and reads the data of the selected layer. For example, with respect to the PC 1004 or the tablet device 1006 having high processing capability, the distribution server 1002 reads the scalable encoded data (BL+EL) 1011 from the scalable encoded data storage section 1001, and transmits the scalable encoded data (BL+EL) 1011 without change. On the other hand, for example, with respect to the AV device 1005 or the mobile phone 1007 having low processing capability, the distribution server 1002 extracts the data of the base layer from the scalable encoded data (BL+EL) 1011, and transmits the extracted data of the base layer as low quality scalable encoded data (BL) 1012 that is data having the same content as the scalable encoded data (BL+EL) 1011 but has lower quality than the scalable encoded data (BL+EL) 1011.

Because an amount of data can easily be adjusted by employing the scalable encoded data, the occurrence of the delay or the overflow can be suppressed or the unnecessary increase of the load of the terminal device or the communication media can be suppressed. In addition, because a redundancy between the layers is reduced in the scalable encoded data (BL+EL) 1011, it is possible to further reduce the amount of data than when the encoded data of each layer is treated as the individual data. Therefore, it is possible to more efficiently use the storage region of the scalable encoded data storage section 1001.

Because various devices such as the PC 1004 to the mobile phone 1007 are applicable as the terminal device, the hardware performance of the terminal devices differs according to the device. In addition, because there are various applications which are executed by the terminal device, the software performance thereof also varies. Further, because all the communication networks including a wired, wireless, or both such as the Internet and the local area network (LAN) are applicable as the network 1003 serving as a communication medium, the data transmission performance thereof varies. Further, the data transmission performance may vary by other communications, or the like.

Therefore, the distribution server 1002 may perform communication with the terminal device which is the data transmission destination before starting the data transmission, and then obtain information related to the terminal device performance such as hardware performance of the terminal device, or the application (software) performance which is executed by the terminal device, and information related to the communication environment such as an available bandwidth of the network 1003. Then, distribution server 1002 may select an appropriate layer based on the obtained information.

Also, the extraction of the layer may be performed in the terminal device. For example, the PC 1004 may decode the transmitted scalable encoded data (BL+EL) 1011 and display the image of the base layer or display the image of the enhancement layer. In addition, for example, the PC 1004 may be configured to extract the scalable encoded data (BL) 1012 of the base layer from the transmitted scalable encoded data (BL+EL) 1011, store the extracted scalable encoded data (BL) 1012 of the base layer, transmit to another device, or decode and display the image of the base layer.

Of course, the number of the scalable encoded data storage sections 1001, the distribution servers 1002, the networks 1003, and the terminal devices are optional. In addition, although the example of the distribution server 1002 transmitting the data to the terminal device is described above, the example of use is not limited thereto. The data transmission system 1000 is applicable to any system which selects and transmits an appropriate layer according to the capability of the terminal device, the communication environment, or the like when the scalable encoded data is transmitted to the terminal device.

[Second System]

Figure 55:
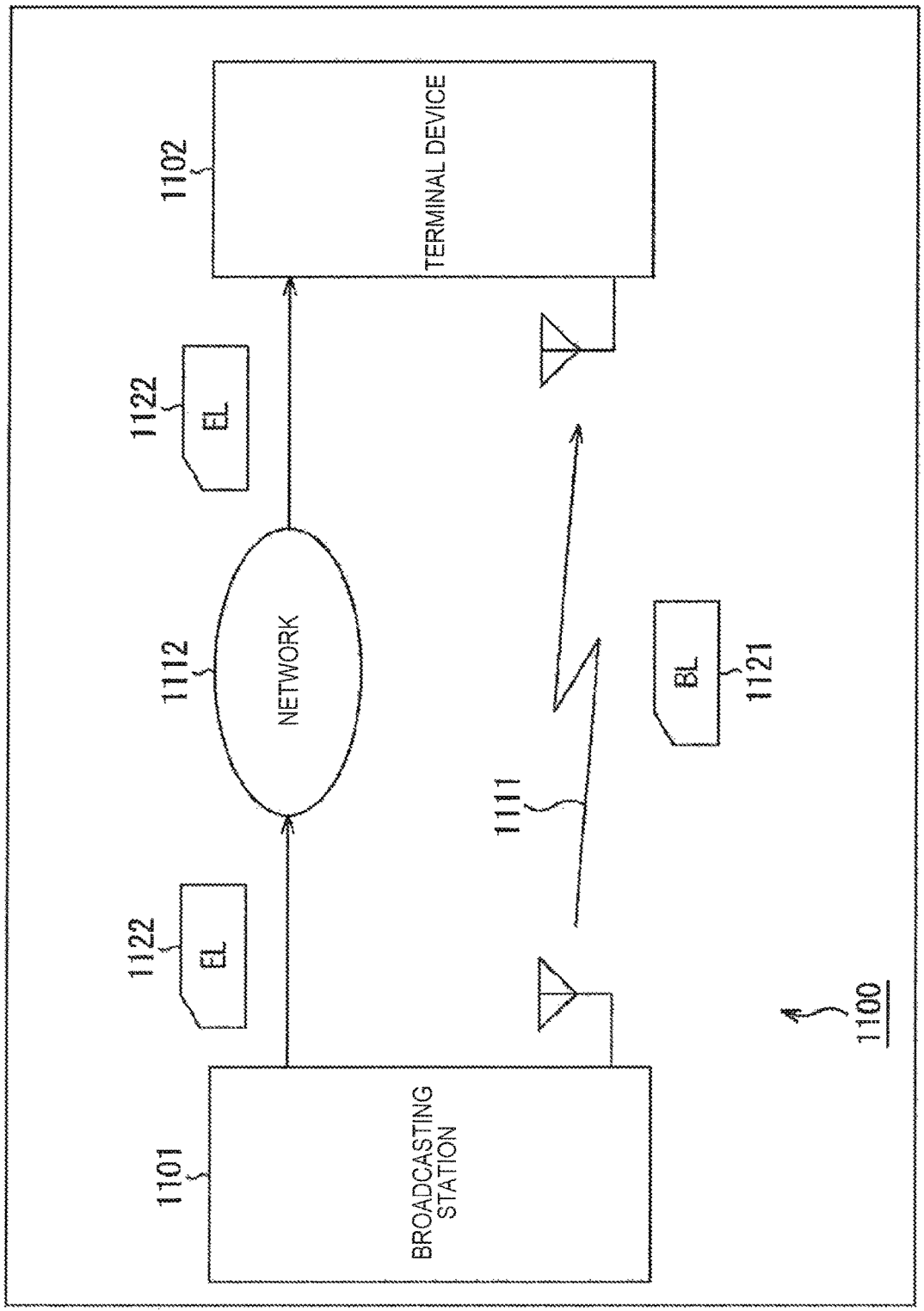
FIG. 55 is a block diagram illustrating another example of using scalable video coding.

In addition, the scalable video coding, for example, is used for transmission via a plurality of communication media as in an example illustrated in FIG. 55.

In a data transmission system 1100 illustrated in FIG. 55, a broadcasting station 1101 transmits scalable encoded data (BL) 1121 of the base layer by terrestrial broadcasting 1111. In addition, the broadcasting station 1101 transmits scalable encoded data (EL) 1122 of the enhancement layer via any arbitrary network 1112 made of a communication network that is wired, wireless, or both (for example, the data is packetized and transmitted).

A terminal device 1102 has a function of receiving the terrestrial broadcasting 1111 that is broadcast by the broadcasting station 1101 and receives the scalable encoded data (BL) 1121 of the base layer transmitted via the terrestrial broadcasting 1111. In addition, the terminal device 1102 further has a communication function by which the communication is performed via the network 1112, and receives the scalable encoded data (EL) 1122 of the enhancement layer transmitted via the network 1112.

For example, according to a user's instruction or the like, the terminal device 1102 decodes the scalable encoded data (BL) 1121 of the base layer acquired via the terrestrial broadcasting 1111, thereby obtaining or storing the image of the base layer or transmitting the image of the base layer to other devices.

In addition, for example, according to the user's instruction, the terminal device 1102 combines the scalable encoded data (BL) 1121 of the base layer acquired via the terrestrial broadcasting 1111 and the scalable encoded data (EL) 1122 of the enhancement layer acquired via the network 1112, thereby obtaining the scalable encoded data (BL+EL), obtaining or storing the image of the enhancement layer by decoding the scalable encoded data (BL+EL), or transmitting the image of the enhancement layer to other devices.

As described above, the scalable encoded data, for example, can be transmitted via the different communication medium for each layer. Therefore, it is possible to disperse the load and suppress the occurrence of the delay or the overflow.

In addition, according to the situation, the communication medium used for the transmission for each layer may be configured to be selected. For example, the scalable encoded data (BL) 1121 of the base layer in which the amount of data is comparatively large may be transmitted via the communication medium having a wide bandwidth, and the scalable encoded data (EL) 1122 of the enhancement layer in which the amount of data is comparatively small may be transmitted via the communication media having a narrow bandwidth. In addition, for example, whether the communication medium that transmits the scalable encoded data (EL) 1122 of the enhancement layer is the network 1112 or the terrestrial broadcasting 1111 may be switched according to the available bandwidth of the network 1112. Of course, the same is true for data of an arbitrary layer.

By controlling in this way, it is possible to further suppress the increase of the load in the data transmission.

Of course, the number of the layers is optional, and the number of communication media used in the transmission is also optional. In addition, the number of terminal devices 1102 which are the destination of the data distribution is also optional. Further, although the example of the broadcasting from the broadcasting station 1101 has been described above, the use example is not limited thereto. The data transmission system 1100 can be applied to any system which divides the scalable encoded data using a layer as a unit and transmits the scalable encoded data via a plurality of links.

[Third System]

Figure 56:
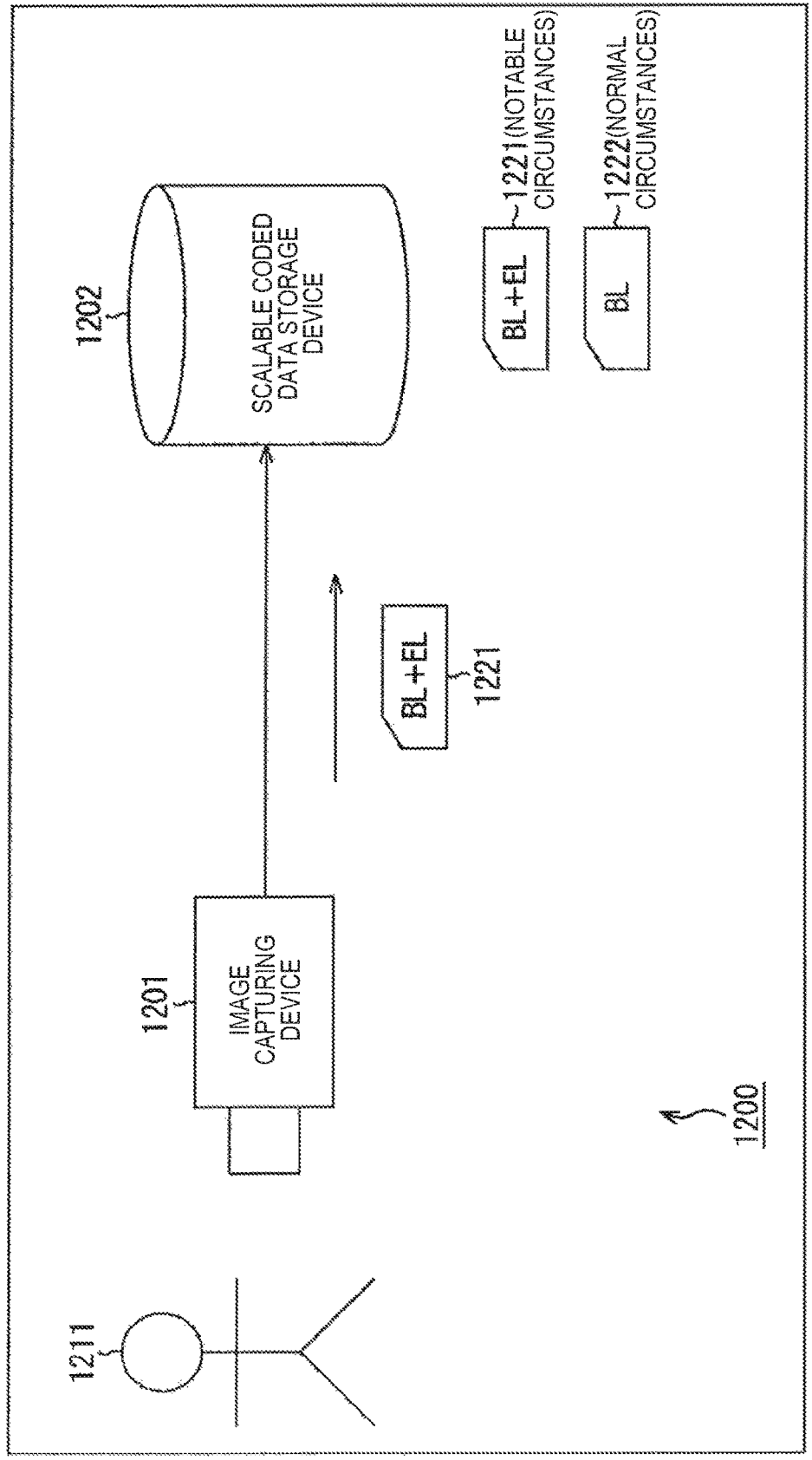
FIG. 56 is a block diagram illustrating another example of using scalable video coding.

In addition, the scalable video coding is used in the storage of the encoded data as an example illustrated in FIG. 56.

In an image capturing system 1200 illustrated in FIG. 56, an image capturing device 1201 performs scalable video coding on image data obtained by capturing an image of a subject 1211, and supplies a scalable video result as the scalable encoded data (BL+EL) 1221 to a scalable encoded data storage device 1202.

The scalable encoded data storage device 1202 stores the scalable encoded data (BL+EL) 1221 supplied from the image capturing device 1201 in quality according to the situation. For example, in the case of normal circumstances, the scalable encoded data storage device 1202 extracts data of the base layer from the scalable encoded data (BL+EL) 1221, and stores the extracted data as scalable encoded data (BL) 1222 of the base layer having a small amount of data at low quality. On the other hand, for example, in the case of notable circumstances, the scalable encoded data storage device 1202 stores the scalable encoded data (BL+EL) 1221 having a large amount of data at high quality without change.

In this way, because the scalable encoded data storage device 1202 can save the image at high quality only in a necessary case, it is possible to suppress the decrease of the value of the image due to the deterioration of the image quality and suppress the increase of the amount of data, and it is possible to improve the use efficiency of the storage region.

For example, the image capturing device 1201 is assumed to be a motoring camera. Because content of the captured image is unlikely to be important when a monitoring subject (for example, an invader) is not shown in the imaged image (in the case of the normal circumstances), the priority is on the reduction of the amount of data, and the image data (scalable encoded data) is stored at low quality. On the other hand, because the content of the imaged image is likely to be important when a monitoring target is shown as the subject 1211 in the imaged image (in the case of the notable circumstances), the priority is on the image quality, and the image data (scalable encoded data) is stored at high quality.

For example, whether the case is the case of the normal circumstances or the notable circumstances may be determined by the scalable encoded data storage device 1202 by analyzing the image. In addition, the image capturing device 1201 may be configured to make the determination and transmit the determination result to the scalable encoded data storage device 1202.

A determination criterion of whether the case is the case of the normal circumstances or the notable circumstances is optional and the content of the image which is the determination criterion is optional. Of course, a condition other than the content of the image can be designated as the determination criterion. For example, switching may be configured to be performed according to the magnitude or waveform of recorded sound, by a predetermined time interval, or by an external instruction such as the user's instruction.

In addition, although the two states of the normal circumstances and the notable circumstances have been described above, the number of the states is optional, and for example, switching may be configured to be performed among three or more states such as normal circumstances, slightly notable circumstances, notable circumstances, and highly notable circumstances. However, the upper limit number of states to be switched depends upon the number of layers of the scalable encoded data.

In addition, the image capturing device 1201 may determine the number of layers of the scalable video coding according to the state. For example, in the case of the normal circumstances, the image capturing device 1201 may generate the scalable encoded data (BL) 1222 of the base layer having a small amount of data at low quality and supply the data to the scalable encoded data storage device 1202. In addition, for example, in the case of the notable circumstances, the image capturing device 1201 may generate the scalable encoded data (BL+EL) 1221 of the base layer having a large amount of data at high quality and supply the data to the scalable encoded data storage device 1202.

Although the monitoring camera has been described above as the example, the usage of the image capturing system 1200 is optional and is not limited to the monitoring camera.

Further, the present technology can also be applied to HTTP streaming such as MPEG DASH in which appropriate encoded data is selected in units of segments from among a plurality of pieces of encoded data having different solutions that are prepared in advance and used. In other words, a plurality of pieces of encoded data can share information related to encoding or decoding.

Further, in this specification, the example in which various kinds of information such as the HRD parameter type flag, the HRD parameter, or buffering_period_SEI and layer_buffering_period_SEI are multiplexed into an encoded stream and transmitted from the encoding side to the decoding side has been described. However, a technique of transmitting the information is not limited to this example. For example, the information may be transmitted or recorded as individual data associated with an encoded bitstream without being multiplexed in the encoded stream. Here, the term "associate" refers to that an image included in the bitstream (which may be part of an image such a slice or a block) and information corresponding to the image is configured to be linked at the time of decoding. That is, the information may be transmitted on a separate transmission path from an image (or bitstream). In addition, the information may be recorded on a separate recording medium (or a separate recording area of the same recording medium) from the image (or bitstream). Further, the information and the image (or the bitstream), for example, may be associated with each other in an arbitrary unit such as a plurality of frames, one frame, or a portion within the frame.

The preferred embodiments of the present disclosure have been described above with reference to the accompanying drawings, whilst the present invention is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

An image processing device including:

a receiving section configured to receive a bitstream obtained by encoding an image having at least one layer and buffer management parameter information of each layer indicating at least one of that a parameter for managing a decoder buffer is a parameter for performing a decoding process of only a corresponding layer and that the parameter for managing the decoder buffer is a parameter for performing a decoding process of a corresponding layer and a lower layer; and a decoding section configured to decode the bitstream received by the receiving section and generate an image.

(2)

The image processing device according to (1), wherein the layer includes a layer and a sublayer.

(3)

The image processing device according to (1) or (2), wherein the layer is a view of multi-view coding.

(4)

The image processing device according to (1) or (2), wherein the layer is a layer of scalable video coding.

(5)

The image processing device according to any one of (1) to (4), wherein the buffer management parameter information is described in supplemental enhancement information (SEI).

(6)

The image processing device according to any one of (1) to (5), wherein the buffer management parameter information is described in buffering_period_SE.

(7)

The image processing device according to any one of (1) to (4), wherein parameter presence/absence information indicating a presence or absence of the parameter for managing the decoder buffer serving as the parameter for performing the decoding process of only the corresponding layer is described in a vps (video parameter set)_extension.

(8)

The image processing device according to any one of (1) to (7), wherein the receiving section receives an AVC flag indicating that a layer lower than the corresponding layer is encoded by MPEG-4 Part10 Advanced Video Coding (AVC) and the buffer management parameter information of each layer indicating that the parameter for managing the decoder buffer is the parameter for performing the decoding process of only the corresponding layer.

(9)

An image processing method including:

receiving, by an image processing device, a bitstream obtained by encoding an image having at least one layer and buffer management parameter information of each layer indicating at least one of that a parameter for managing a decoder buffer is a parameter for performing a decoding process of only a corresponding layer and that the parameter for managing the decoder buffer is a parameter for performing a decoding process of a corresponding layer and a lower layer, and decoding, by the image processing device, the received bitstream and generating an image.

(10)

An image processing device including:

a setting section configured to set buffer management parameter information of each layer indicating at least one of that a parameter for managing a decoder buffer is a parameter for performing a decoding process of only a corresponding layer and that the parameter for managing the decoder buffer is a parameter for performing a decoding process of a corresponding layer and a lower layer;

an encoding section configured to encode an image having at least one layer and generate a bitstream; and a transmitting section configured to transmit the buffer management parameter information set by the setting section and the bitstream generated by the encoding section.

(11)

The image processing device according to (10), wherein the layer includes a layer and a sublayer.

(12)

The image processing device according to (10) or (11), wherein the layer is a view of multi-view coding.

(13)

The image processing device according to (10) or (11), wherein the layer is a layer of scalable video coding.

(14)

The image processing device according to any one of (10) to (13), wherein the buffer management parameter information is described in supplemental enhancement information (SEI).

(15) The image processing device according to any one of (10) to (14),
wherein the buffer management parameter information is described in buffering_period_SEI.

(16) The image processing device according to any one of (10) to (13),
wherein parameter presence/absence information indicating a presence or absence of the parameter for managing the decoder buffer serving as the parameter for performing the decoding process of only the corresponding layer is described in a vps (video parameter set)_extension.

(17) The image processing device according to any one of (10) to (16), wherein the setting section sets an AVC flag indicating that a layer lower than the corresponding layer is encoded by MPEG-4 Part10 Advanced Video Coding (AVC) and the buffer management parameter information of each layer indicating that the parameter for managing the decoder buffer is the parameter for performing the decoding process of only the corresponding layer.

(18) An image processing method including:
setting, by an image processing device, buffer management parameter information of each layer indicating at least one of that a parameter for managing a decoder buffer is a parameter for performing a decoding process of only a corresponding layer and that the parameter for managing the decoder buffer is a parameter for performing a decoding process of a corresponding layer and a lower layer;
encoding, by the image processing device, an image having at least one layer and generating a bitstream; and
transmitting, by the image processing device, the set buffer management parameter information and the generated bitstream.

REFERENCE SIGNS LIST 100 scalable encoding device
101 layer image encoding section
101-1 base layer image encoding section
101-2,101-3 enhancement layer image encoding section
102 encoding control section
116 lossless encoding section
117 accumulation buffer
127 HRD type setting section
131 partial accumulation buffer
132 whole accumulation buffer
141 layer HRD parameter calculating section
142 time layer HRD parameter calculating section
143 HRD parameter type setting section
144 time HRD parameter type setting section
200 scalable decoding device
201 layer image decoding section
201-1 base layer image decoding section
201-2,201-3 enhancement layer image decoding section
202 decoding control section
211 accumulation buffer
212 lossless decoding section
224 HRD type decoding section
231 partial accumulation buffer
232 whole accumulation buffer
241 layer HRD parameter monitoring section
242 time layer HRD parameter monitoring section
243 HRD parameter type decoding section
244 time HRD parameter type decoding section
301 lossless encoding section
302 buffering period SEI setting section
311 associated parameter set setting section
312 layer set buffer
313 layer buffering period SEI setting section
314 layer parameter transmission designating section
351 lossless decoding section
352 buffering period SEI decoding section
361 associated parameter set decoding section
362 layer set buffer
363 layer buffering period SEI decoding section
364 layer parameter transmission receiving section

The invention claimed is:

1. An image processing device comprising:
a receiving section configured to receive a bitstream, the bitstream being obtained by encoding an image having a plurality of layers, and a buffer management parameter indicating that a decoder buffer is managed for performing a decoding process of only a corresponding layer of the bitstream or that the decoder buffer is managed for performing a decoding process of the corresponding layer and a lower layer of the bitstream; and
a decoding section configured to decode the bitstream received by the receiving section and generate an image,
wherein the receiving section and the decoding section are each implemented via at least one processor.

2. The image processing device according to claim 1, wherein the plurality of layers includes a layer and a sublayer.

3. The image processing device according to claim 2, wherein the layer is a view of multi-view coding.

4. The image processing device according to claim 2, wherein the layer is a layer of scalable video coding.

5. The image processing device according to claim 1, wherein the buffer management parameter information is described in supplemental enhancement information (SEI).

6. The image processing device according to claim 5, wherein the buffer management parameter information is described in buffering_period_SEI.

7. The image processing device according to claim 1, wherein parameter presence/absence information indicating a presence or absence of the parameter for managing the decoder buffer serving as the parameter for performing the decoding process of only the corresponding layer is described in a vps (video parameter set)_extension.

8. The image processing device according to claim 1, wherein the receiving section receives an AVC flag indicating that a layer lower than the corresponding layer is encoded by MPEG-4 Part10 Advanced Video Coding (AVC) and the buffer management parameter of each corresponding layer indicates whether the parameter for managing the decoder buffer is the parameter for performing the decoding process of only the corresponding layer.

9. An image processing method comprising:
receiving, by an image processing device, a bitstream, the bitstream being obtained by encoding an image having a plurality of layers, and a buffer management parameter indicating that a decoder buffer is managed for performing a decoding process of only a corresponding layer of the bitstream or that the decoder buffer is managed for performing a decoding process of the corresponding layer and a lower layer of the bitstream; and decoding, by the image processing device, the received bitstream and generating an image.

10. The image processing device according to claim 1, wherein the buffer management parameter determines whether a separate corresponding decoding device is configured to perform the decoding process for each corresponding layer or whether a single decoding device is configured to perform the decoding process for multiple layers of the plurality of layers.

11. The image processing method according to claim 9, wherein the buffer management parameter determines whether a separate corresponding decoding device is configured to perform the decoding process for each corresponding layer or whether a single decoding device is configured to perform the decoding process for multiple layers of the plurality of layers.

12. The image processing device according to claim 1, wherein the buffer management parameter indicates whether separately decodable layers are present in the bitstream.

13. The image processing method according to claim 9, wherein the buffer management parameter indicates whether separately decodable layers are present in the bitstream.

* * * * *